(12) United States Patent
Mikami

(10) Patent No.: US 9,800,102 B2
(45) Date of Patent: Oct. 24, 2017

(54) DUAL ROTOR CORE MOTOR WITH REDUCED FLUX LEAKAGE

(71) Applicant: ASMO CO., LTD., Shizuoka-ken (JP)

(72) Inventor: Koji Mikami, Kosai (JP)

(73) Assignee: ASMO CO., LTD., Shizuoka-ken (JP)

( * ) Notice: Subject to any disclaimer, the term of this patent is extended or adjusted under 35 U.S.C. 154(b) by 643 days.

(21) Appl. No.: 14/195,295

(22) Filed: Mar. 3, 2014

(65) Prior Publication Data

US 2014/0252904 A1    Sep. 11, 2014

(30) Foreign Application Priority Data

| Mar. 6, 2013 | (JP) | 2013-044195 |
| Mar. 21, 2013 | (JP) | 2013-058144 |
| Aug. 8, 2013 | (JP) | 2013-165213 |
| Oct. 2, 2013 | (JP) | 2013-207559 |
| Oct. 23, 2013 | (JP) | 2013-220186 |
| Oct. 24, 2013 | (JP) | 2013-221611 |
| Dec. 4, 2013 | (JP) | 2013-251451 |
| Feb. 25, 2014 | (JP) | 2014-033882 |

(51) Int. Cl.

| *H02K 1/24* | (2006.01) |
| *H02K 1/27* | (2006.01) |
| *H02K 5/04* | (2006.01) |
| *H02K 1/22* | (2006.01) |

(52) U.S. Cl.
CPC ............ *H02K 1/243* (2013.01); *H02K 1/226* (2013.01); *H02K 1/2726* (2013.01); *H02K 5/04* (2013.01); *H02K 2213/03* (2013.01)

(58) Field of Classification Search
CPC ........ H02K 1/223; H02K 1/226; H02K 1/243; H02K 5/00–5/26

USPC .................................. 310/89, 156.01–156.84
See application file for complete search history.

(56) References Cited

U.S. PATENT DOCUMENTS

| 6,104,117 A | 8/2000 | Nakamura et al. |
| 6,144,138 A | 11/2000 | Ragaly |
| 2011/0309707 A1* | 12/2011 | Kato ...................... H02K 1/146 310/156.54 |

(Continued)

FOREIGN PATENT DOCUMENTS

| JP | S56-81070 A | 7/1981 |
| JP | 5-43749 U | 6/1993 |

(Continued)

OTHER PUBLICATIONS

Japanese Office Action of JP 2013-058144, dated Jun. 21, 2016 along with its English Translation.

*Primary Examiner* — Thomas Truong
(74) *Attorney, Agent, or Firm* — Christensen, Fonder, Dardi & Herbert PLLC

(57) ABSTRACT

A motor includes a stator, a rotor and a case. The rotor includes a first rotor core, a second rotor core, and a field magnet. Each of the first rotor core and the second rotor core includes a core base and a plurality of claw poles. The field magnet is located between the core bases. The case includes a cylindrical yoke housing and a lid. To balance magnetic flux from the first rotor core with magnetic flux from the second rotor core, the distance between the rotor and the stator is varied from the distance between the rotor and the yoke housing or the teeth of the stator are shaped to enable magnetic saturation.

6 Claims, 41 Drawing Sheets

(56) References Cited

U.S. PATENT DOCUMENTS

2013/0106208 A1     5/2013  Yamada et al.
2013/0300242 A1*   11/2013  Yamada ............... H02K 21/044
                                                    310/156.08
2014/0252904 A1     9/2014  Mikami et al.

FOREIGN PATENT DOCUMENTS

| JP | H05-276724 A | 10/1993 | | |
|----|---|---|---|---|
| JP | H06-105490 A | 4/1994 | | |
| JP | H09-149616 A | 6/1997 | | |
| JP | H 10-42531 A | 2/1998 | | |
| JP | H10-136623 A | 5/1998 | | |
| JP | H 11-18326 A | 1/1999 | | |
| JP | 2003-61272 A | 2/2003 | | |
| JP | 2004-274963 A | 9/2004 | | |
| JP | 2007-124819 A | 5/2007 | | |
| JP | 2009-201215 A | 9/2009 | | |
| JP | 2012-5252 A | 1/2012 | | |
| JP | WO 2012067223 A1 * | 5/2012 | ........... | H02K 21/044 |
| JP | 2012-115085 A | 6/2012 | | |
| JP | 2013-099105 A | 5/2013 | | |
| JP | 2015-035878 A | 2/2015 | | |
| WO | WO 2008/050637 A1 | 5/2008 | | |

* cited by examiner

DUAL ROTOR CORE MOTOR WITH REDUCED FLUX LEAKAGE

BACKGROUND OF THE INVENTION

The present invention relates to a motor including a stator, a rotor, and a case, which accommodates the stator and the rotor.

Japanese Utility Model Publication No. 5-43749 describes a rotor having the so-called permanent magnet field Lundell type structure that is known as a rotor used in a motor. The Lundell type structure rotor includes two rotor cores and a field magnet located between the two rotor cores in an axial direction of the rotor. Each of the rotor cores includes claw poles arranged in the circumferential direction of the rotor. In the Lundell type structure rotor, the claw poles alternately function as different magnetic poles.

Japanese Laid-Open Patent Publication No. 2012-115085 describes a Lundell type structure rotor including interpole magnets located between alternately located claw poles. The interpole magnets adjust a magnetic path and increase the output of the motor. Such a motor includes a case having a cylindrical yoke housing with a closed end and an end frame arranged on one end of the yoke housing. The rotor and the stator are accommodated in the case.

In each of the above-described motors, the yoke housing, which is a magnetic body, is located on one axial end of the rotor in the axial direction. The end frame, which is formed from a resin, is located on the other axial end of the rotor. In this structure, some of the magnetic flux from a field magnet of the rotor may leak toward the case (yoke housing) and adversely affect the output characteristics.

SUMMARY OF INVENTION

It is an object of the invention to provide a motor capable of limiting flux leakage and improving the output characteristics.

To achieve the above object, one aspect of the present invention includes a stator, a rotor, and a case. The stator includes a stator core and a winding. The stator core includes a plurality of teeth arranged in a circumferential direction. The winding is wound around the teeth. Each of the teeth extends in a radial direction. The rotor includes a first rotor core, a second rotor core, and a field magnet. Each of the first rotor core and the second rotor core includes a substantially disk-shaped core base. A plurality of claw poles are arranged in equal intervals on a circumferential portion of the core base. Each of the claw poles projects toward an outer side in the radial direction and extends in an axial direction. The core bases are opposed to each other, and the claw poles are alternately arranged in the circumferential direction. The field magnet is located between the core bases in the axial direction, the field magnet is magnetized in the axial direction so that the claw poles of the first rotor core function as first magnetic poles and the claw poles of the second rotor core function as second magnetic poles. The case accommodates the stator and the rotor. The case includes a cylindrical yoke housing, which has a closed end, and a lid, which closes an opening of the yoke housing. The yoke housing is formed by a magnetic body. To balance magnetic flux from the first rotor core with magnetic flux from the second rotor core, the distance between the rotor and the stator is varied from the distance between the rotor and the yoke housing or the teeth of the stator are shaped to enable magnetic saturation.

A second aspect of the present invention is a motor including a stator, a rotor, and a case. The stator includes a stator core and a winding. The stator core includes a plurality of teeth arranged in a circumferential direction, the winding is wound around the teeth. Each of the teeth extends in a radial direction. The rotor includes a first rotor core, a second rotor core, and a field magnet. Each of the first rotor core and the second rotor core includes a substantially disk-shaped core base. A plurality of claw poles are arranged in equal intervals on a circumferential portion of the core base. Each of the claw poles projects toward an outer side in the radial direction and extends in an axial direction. The core bases are opposed to each other, and the claw poles are alternately arranged in the circumferential direction. The field magnet is located between the core bases in the axial direction. The field magnet is magnetized in the axial direction so that the claw poles of the first rotor core function as first magnetic poles and the claw poles of the second rotor core function as second magnetic poles. The case accommodates the stator and the rotor. The case includes a cylindrical yoke housing, which has a closed end, and a lid, which closes an opening of the yoke housing. The yoke housing is formed by a magnetic body. To balance magnetic flux from the first rotor core with magnetic flux from the second rotor core, the first rotor core and the second rotor core have asymmetric shapes.

A third aspect of the present invention is a motor including a stator, a rotor, and a case. The stator includes a stator core and a winding. The stator core includes a plurality of teeth arranged in a circumferential direction. The winding is wound around the teeth. Each of the teeth extends in a radial direction. The rotor includes a first rotor core, a second rotor core, and a field magnet. Each of the first rotor core and the second rotor core includes a substantially disk-shaped core base. A plurality of claw poles are arranged in equal intervals on a circumferential portion of the core base. Each of the claw poles projects toward an outer side in the radial direction and extends in an axial direction. The core bases are opposed to each other, and the claw poles are alternately arranged in the circumferential direction. The field magnet is located between the core bases in the axial direction. The field magnet is magnetized in the axial direction so that the claw poles of the first rotor core function as first magnetic poles and the claw poles of the second rotor core function as second magnetic poles. The case accommodates the stator and the rotor. The case includes a cylindrical yoke housing, which has a closed end, and a lid, which closes an opening of the yoke housing. The yoke housing is formed by a magnetic body. An auxiliary, magnet is located at a predetermined position to balance magnetic flux from the first rotor core with magnetic flux from the second rotor core.

DETAILED DESCRIPTION OF PREFERRED EMBODIMENTS

A first embodiment of a motor will now be described.

Figure 1:
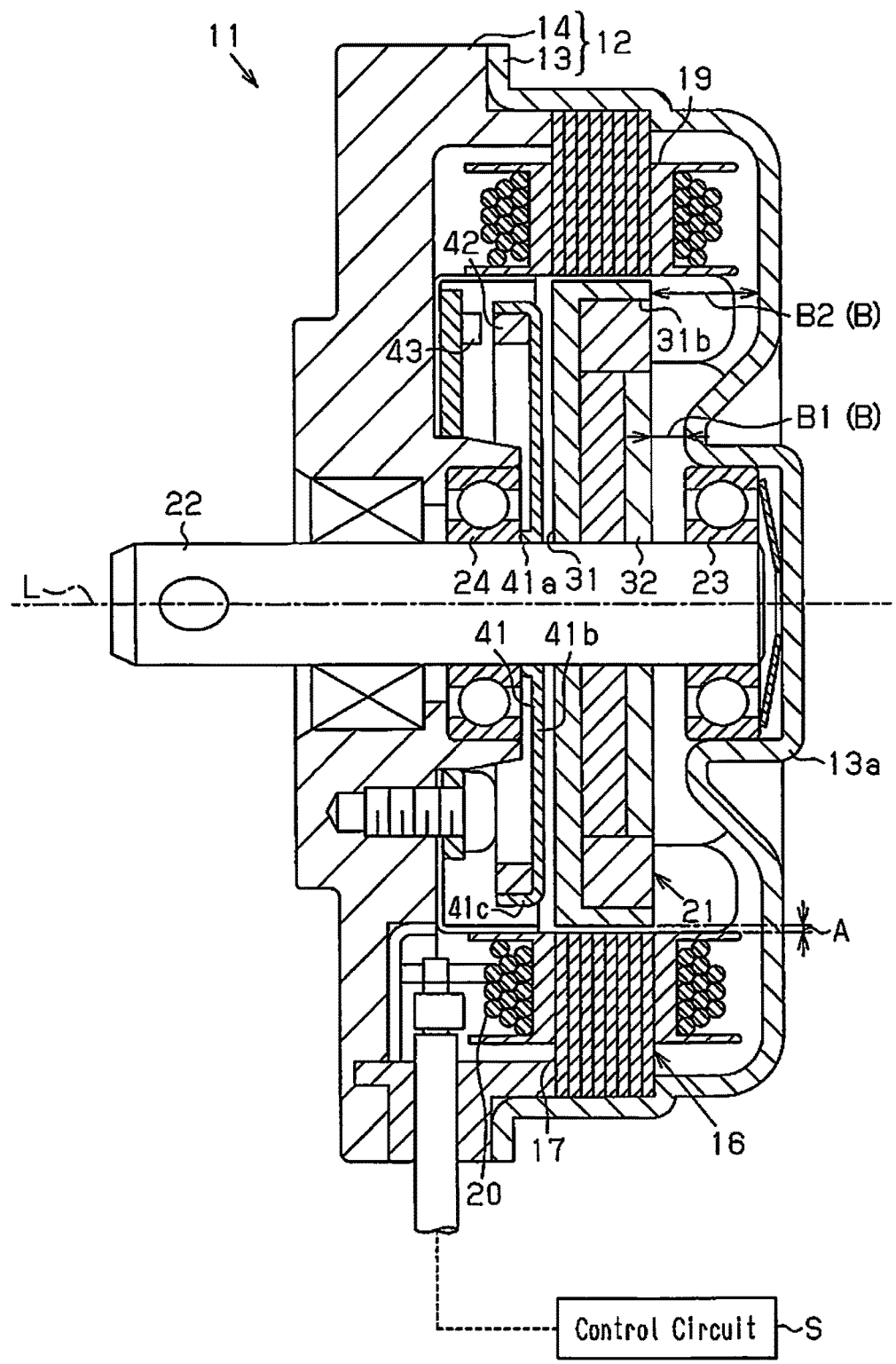
FIG. 1 is a cross-sectional view of a brushless motor according to a first embodiment of the present invention.

As shown in FIG. 1, a brushless motor 11, serving as a motor, includes a motor case 12. The motor case 12 includes a substantially cylindrical yoke housing 13, having a closed end, and an end plate 14, serving as a lid that closes a front (left in FIG. 1) opening of the yoke housing 13. The yoke housing 13 is made of magnetic iron, for example. The end plate 14 is made of non-magnetic resin material, for example.

As shown in FIG. 1, a stator 16 is fixed to an inner circumferential surface of the yoke housing 13. The stator 16 includes a stator core 17 having a plurality of teeth 17a, which extend inward in a radial direction of the brushless motor 11, and windings 20 wound around the teeth 17a of the stator core 17 with an insulator 19 arranged in between. When drive current is supplied from an external control circuit S to the windings 20, the stator 16 generates a rotating magnetic field.

Figure 2:
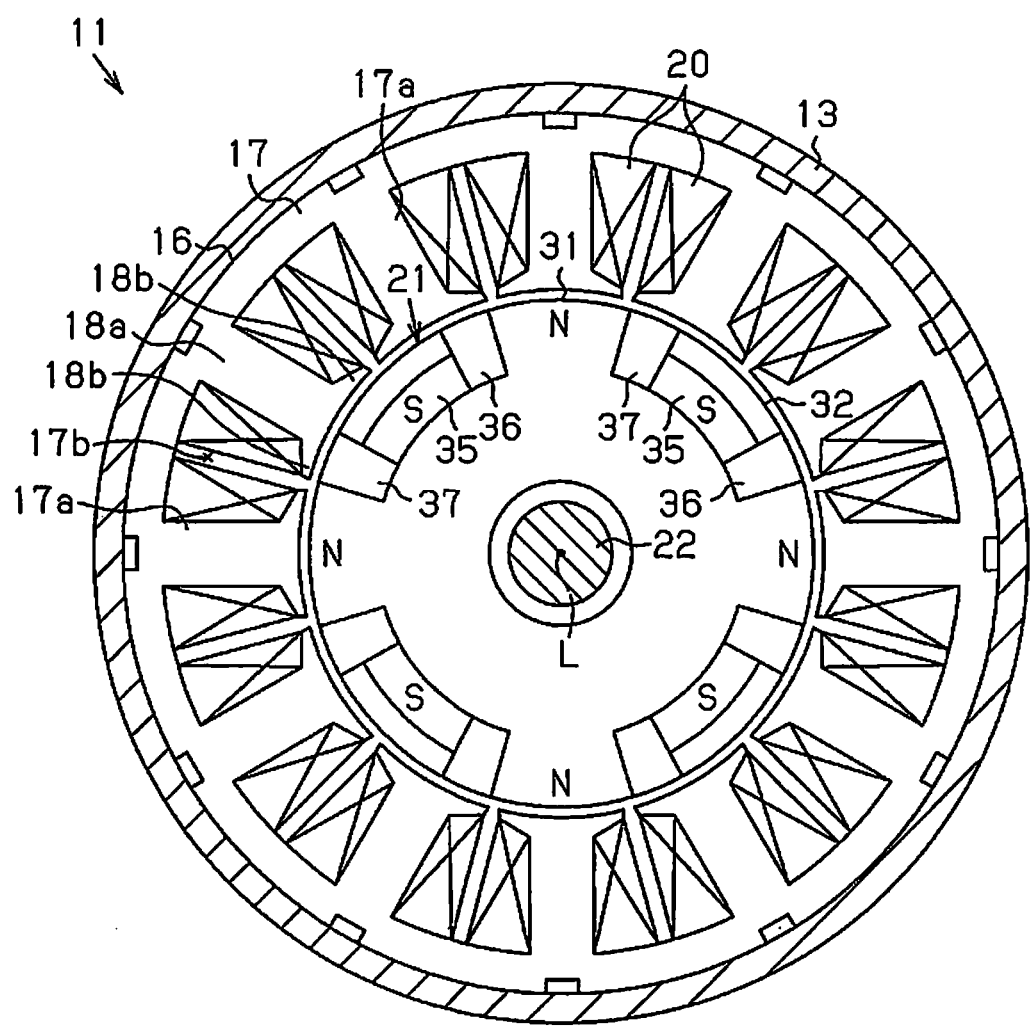
FIG. 2 is a plan view of the brushless motor shown in FIG. 1.

As shown in FIG. 2, the stator core 17 has twelve teeth 17a in total. Accordingly, the number of slots 17b formed between the teeth 17a is also twelve.

Figure 5:
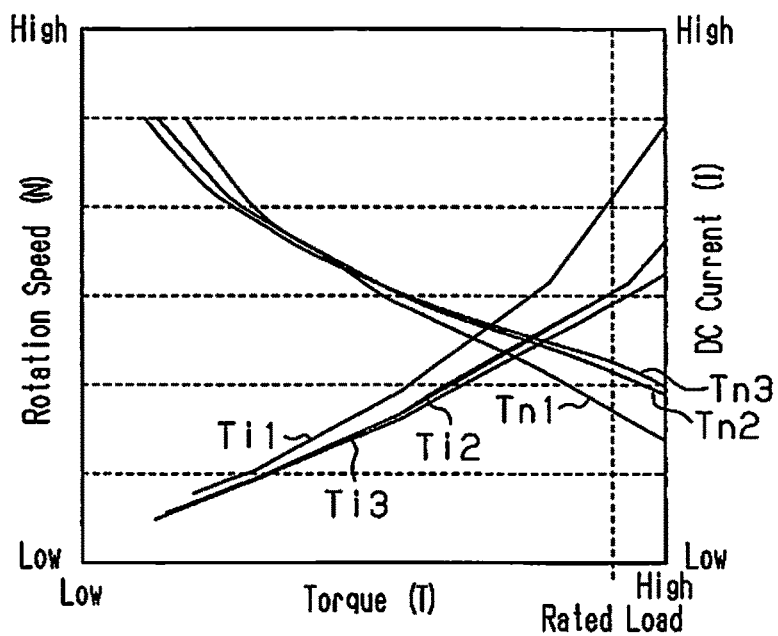
FIG. 5 is a graph showing the T-N characteristics and the T-I characteristics when changing the separated distance A between a stator and a claw pole in the radial direction to the separated distance B between a rotor core and a yoke housing in the axial direction.

As shown in FIGS. 2 and 5, each of the teeth 17a includes a winding portion 18a and a projection 18b which projects from a radially inner end of the winding portion 18a toward two circumferential sides of the brushless motor 11. U-phase, V-phase and W-phase windings 20 are wound around the winding portions 18a in concentrated windings.

As shown in FIG. 1, a rotor 21 of the brushless motor 11 includes a rotation shaft 22, and the rotor 21 is located on the inner side of the stator 16. The rotation shaft 22 is a non-magnetic metal shaft and rotatably supported by bearings 23 and 24 which are supported by a closed end 13a of the yoke housing 13 and the end plate 14.

Figure 3:
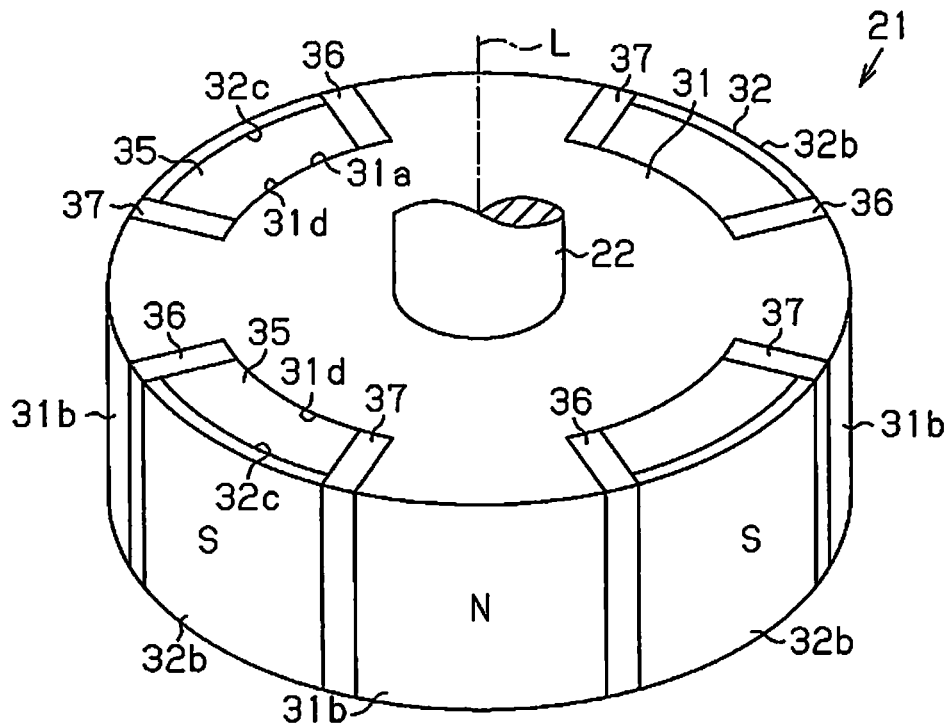
FIG. 3 is a perspective view of a rotor shown in FIG. 1.
Figure 4:
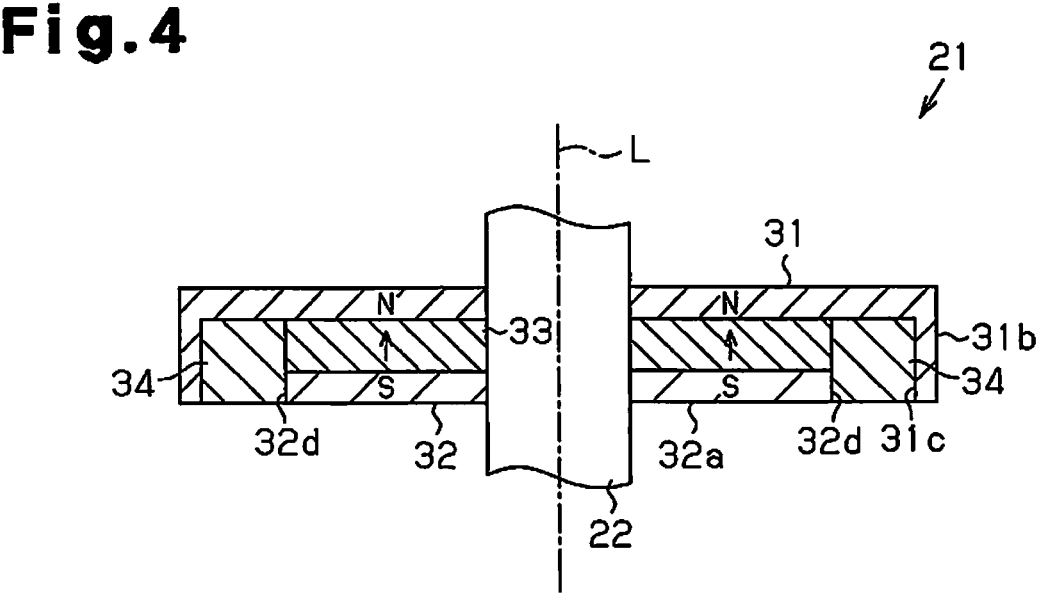
FIG. 4 is a cross-sectional view of the rotor shown in FIG. 1.

As shown in FIGS. 3 and 4, the rotor 21 includes first and second rotor cores 31 and 32, and an annular magnet 33, serving as a field magnet located between the first rotor core 31 and the second rotor core 32 in an axial direction of the brushless motor 11. The rotation shaft 22 is press-fitted into the first and second rotor cores 31 and 32. This fixes the first and second rotor cores 31 and 32 to the rotation shaft 22 while maintaining an axial distance between the first and second rotor cores 31 and 32. Further, the rotor 21 includes back surface auxiliary magnets 34 and 35 and interpole magnets 36 and 37.

As shown in FIGS. 3 and 4, the first rotor core 31 includes a substantially disk-shaped first core base 31a and a plurality of (four in first embodiment) first claw poles 31b arranged on a circumferential portion of the first core base 31a in equal intervals. Each of the first claw poles 31b projects toward the outer side in the radial direction and extends in the axial direction.

As shown in FIGS. 3 and 4, the second rotor core 32 includes a substantially disk-shaped second core base 32a, which has the same shape as the first rotor core 31, and a plurality of second claw poles 32b, which are arranged on a circumferential portion of the second core base 32a in equal intervals. Each of the second claw poles 32b projects toward the outer side in the radial direction and extends in the axial direction. The rotation shaft 22 is press-fitted into central holes of the first and second rotor cores 31 and 32. The first and second rotor cores 31 and 32 are fixed to the rotation shaft 22 so that a distance between axially outer ends (opposed end surfaces) of the first and second core bases 31a and 32a is set to a preset distance. At this time, the second rotor core 32 is coupled to the first rotor core 31 so that the second claw poles 32b are located between circumferentially adjacent first claw poles 31b and so that the annular magnet 33 is arranged (sandwiched) between the first core base 31a and the second core base 32a in the axial direction.

The annular magnet 33 is a ferrite magnet or a neodymium magnet and is formed to be annular and include a central hole. The annular magnet 33 is magnetized in the axial direction so that the first claw poles 31b function as first magnetic poles (north poles in first embodiment), and the second claw pole 32b function as second magnetic poles (south poles in first embodiment). That is, the rotor 21 in the first embodiment is a rotor of a Lundell type structure using the annular magnet 33 as a field magnet. The rotor 21 includes four first claw poles 31b, which are north poles, and four second claw poles 32b, which are south poles, and the number of poles is eight (number of pairs of poles is four). The first claw poles 31b and the second claw poles 32b are alternately arranged in the circumferential direction. That is, in the first embodiment, the number of poles of the rotor 21 is set to "eight", and the number of the teeth 17a of the stator 16 is set to "twelve". The motor is configured so that the number of poles of the rotor 21 is set to 2n (n is natural number and is four in the first embodiment), the number of slots 17b (number of slots) is set to 3n, and the ratio of the number of poles and the number of slots is 2:3.

A back surface auxiliary magnet 34 is located between a back surface 31c (radially inner side surface) of each of the first claw poles 31b and an outer circumferential surface 32d of the second core base 32a. The cross-section of the back surface auxiliary magnet 34 in a direction perpendicular to the axis is substantially sectoral-shaped. The back surface auxiliary magnet 34 is magnetized so that a portion of the first claw pole 31b abutting against the back surface 31c is the north pole, which is the same as the first claw pole 31b, and a portion of the second core base 32a abutting against the outer circumferential surface 32d is the south pole, which is the same as the second core base 32a.

Like the first claw pole 31b, a back surface auxiliary magnet 35 is located between a back surface 32c of each of the second claw poles 32b and an outer circumferential surface 31d of the first core base 31a. A cross-section of the back surface auxiliary magnet 35 in a direction perpendicular to the axis is substantially sectoral-shaped. The back surface auxiliary magnet 35 is magnetized so that a portion thereof which abuts against the back surface 32c is the south pole and a portion of the back surface auxiliary magnet 35 which abuts against the outer circumferential surface 31d of the first core base 31a is the north pole. As the back surface auxiliary magnets 34 and 35, it is possible to use ferrite magnets, for example.

As shown in FIGS. 2 and 3, interpole magnets 36 and 37 are located between the first claw pole 31b and the second claw pole 32b in the circumferential direction.

As shown in FIG. 1, the rotor 21 is separated from the first and second rotor cores 31 and 32 and the yoke housing 13 (closed end 13a) in the axial direction by a separated distance B. A radially outer separated distance B2 is greater than a radially inner separated distance B1, and separated distance B1<separated distance B2 is set. Here, the first and second claw poles 31b and 32b (first and second rotor cores 31 and 32) are separated from the stator 16 (stator core 17) in the radial direction by a predetermined distance (separated distance A). The separated distance B/separated distance A is set in a range of $5.0 \leq B/A \leq 9.0$.

As shown in FIG. 1, the rotor 21 includes a sensor magnet 42 arranged on a substantially disk-shaped magnet fixing member 41. More specifically, the magnet fixing member 41 includes a disk portion 41b, which has a central portion forming a boss portion 41a, and a cylindrical portion 41c, which extends in a cylindrical manner from an outer edge of the disk portion 41b. An annular sensor magnet 42 is fixed to the magnet fixing member 41 so that the annular sensor magnet 42 abuts against an inner circumferential surface of the cylindrical portion 41c and a surface of the disk portion 41b. The magnet fixing member 41 is fixed to the rotation shaft 22 so that the boss portion 41a is fitted onto the rotation shaft 22 proximal to the first rotor core 31.

A Hall IC 43, serving as a magnetic sensor, is located at a position of the end plate 14 opposed to the sensor magnet 42 in the axial direction. When the Hall IC 43 detects a magnetic field of north pole and south pole with the sensor magnet 42, the Hall IC 43 outputs an H level detection signal and an L level detection signal to the control circuit S.

The operation of the brushless motor 11 will now be described.

When three-phase drive current is supplied from the control circuit S to the windings 20, the stator 16 generates a rotating magnetic field that rotates and drives the rotor 21. Here, rotation of the sensor magnet 42, which is opposed to the Hall IC 43, switches the level of the detection signal output from the Hall IC 43 in accordance with a rotation angle (position) of the rotor 21. Based on the detection signal, three-phase drive current switched at the optimal timing is supplied from the control circuit S to the windings 20. This generates a rotating magnetic field in a satisfactory manner and continuously rotates and drives the rotor 21 in a satisfactory manner.

Figure 6:
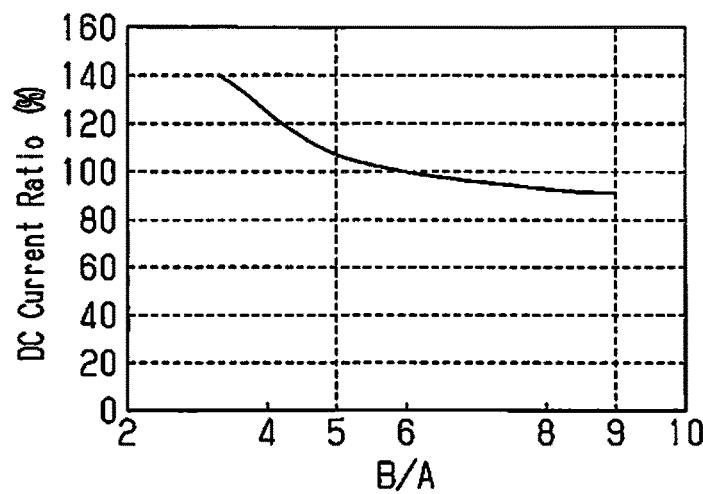
FIG. 6 is a graph showing the ratio of DC current under a rating load.

In the first embodiment, when the separated distance between the stator and the claw pole in the radial direction is expressed by A and the separated distance between the first and second rotor cores and the yoke housing in the axial direction is expressed by B, $5.0 \leq B/A \leq 9.0$ is satisfied. FIG. 5 shows the T-N characteristics (torque-rotation number characteristics) and the T-I characteristics (torque-current characteristics) when B/A is changed, and FIG. 6 shows the current ratio when B/A is changed under the rating load. In FIG. 5, a line Ti1 shows a graph of the T-I characteristics when B/A is "3", a line Ti2 shows a graph of the T-I characteristics when B/A is "6", and a line Ti3 shows the graph of T-I characteristics when B/A is "9". Further, in FIG. 5, a line Tn1 shows a graph of the T-N characteristics when B/A is "3", a line Tn2 shows a graph of the T-N characteristics when B/A is "6", and a line Tn3 shows a graph of the T-N characteristics when B/A is "9". In FIG. 6, the DC current when B/A is "6" is 100%. As apparent from FIG. 5, an increase in the B/A value increases the torque obtained with the same DC current. As apparent from FIG. 6, when B/A is less than "5", the DC current decreases rapidly. However, if B/A is greater than or equal to "5", the decreasing ratio becomes gradual. Thus, when B/A is set to "5" or greater, it is possible to sufficiently secure the separated distance B between the first and second rotor cores 31 and 32 and the yoke housing 13 in the axial direction with respect to the separated distance A between the stator 16 and the first and second claw poles 31b and 32b in the radial direction. Since this reduces the flux leakage in the axial direction, output characteristics (motor characteristics) are improved.

The magnetic (iron) yoke housing 13 is located in the vicinity of one axial end surface of the rotor 21 and the resin end plate 14 is located in the vicinity of the other axial end surface of the rotor 21. This may result in some of the magnetic flux from the annular magnet 33 of the rotor 21 leaking toward the case 12 (yoke housing 13) and causing a magnetic imbalance.

Figure 7:
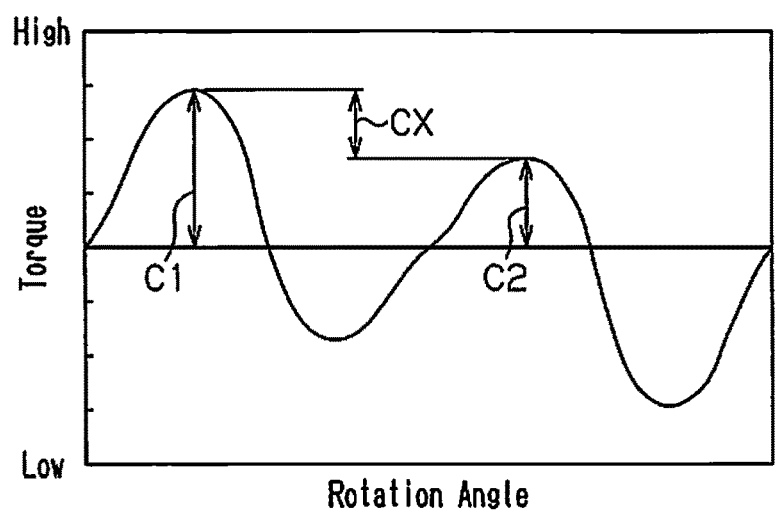
FIG. 7 is a schematic diagram illustrating the bias in detent torque.

That is, as shown in FIG. 7, the detent torque C1 generated by one of the magnetic poles and the detent torque C2 generated by the other one of the magnetic pole becomes C1>C2, and a peak difference CX (=C1−C2) is produced.

Figure 8:
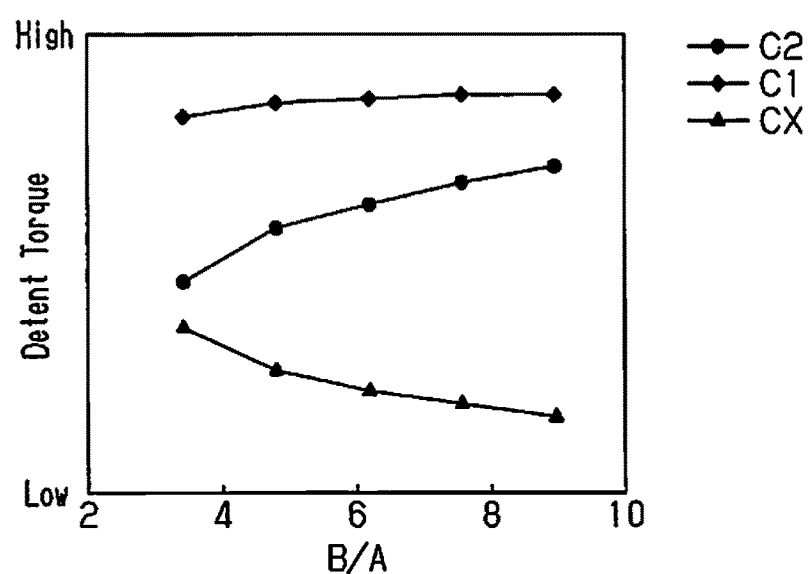
FIG. 8 is a graph showing the relationship of the detent torque and the separated distance A between the stator and the claw pole in the radial direction to the separated distance B between the rotor core and the yoke housing in the axial direction.

Hence, in the first embodiment, a range of B/A is set to "5" or greater as described above. Thus, the separated distance B between the first and second rotor cores 31 and 32 and the yoke housing 13 in the axial direction is sufficiently obtained for the separated distance A between the first and second claw poles 31b and 32b and the stator 16 in the radial direction. This limits flux leakage directed toward the yoke housing 13. As a result, the peak difference CX becomes small and the magnetic balance is enhanced as shown in FIG. 8. Further, since both detent torques C1 and C2 are generally increased, a holding force of the rotor 21 may be increased.

The advantages of the first embodiment will now be described.

(1) The distance A between the rotor 21 and the stator 16 and differs from the distance B between the rotor 21 and the yoke housing 13. In detail, the separated distance between the stator 16 and the first and second claw poles 31b and 32b in the radial direction is expressed by A and the separated distance between the first and second rotor cores 31 and 32 and the yoke housing 13 (closed end 13a) in the axial direction is expressed by B. Here, the relationship $5.0 \leq B/A$ is satisfied. This reduces flux leakage and improves the output characteristics (motor characteristics) as shown in FIGS. 5 and 6. As apparent from FIG. 8, if B/A is increased and the distance between the rotor cores 31 and 32 and the magnetic yoke housing 13 in the axial direction is increased, the flux leakage are reduced and the detent torques C1 and C2 are increased. This increases the holding force of the rotor 21.

(2) In regards to the separated distance B (B1 and B2) between the rotor cores 31 and 32 and the yoke housing 13 in the axial direction, the separated distance B2 of a radially outer portion having a larger surface area in the circumferential direction is longer than the separated distance B1 of a radially inner portion. This allows the flux leakage to be reduced in a further preferable manner.

A second embodiment of the motor will now be described. Same reference numerals are given to those components that are the same as the corresponding components of the first embodiment. Such components will not be described in detail.

Figure 10:
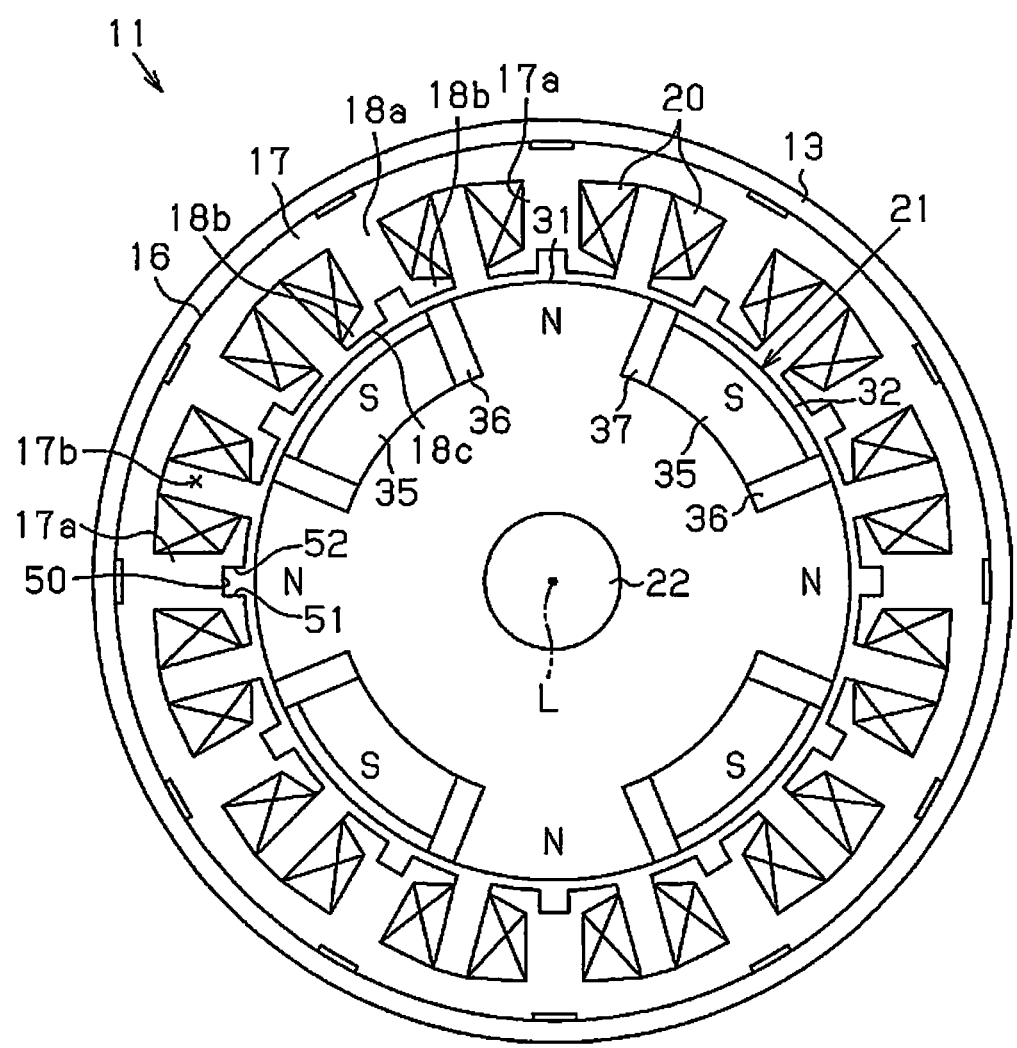
FIG. 10 is a plan view of a brushless motor according to a second embodiment of the invention.

As shown in FIG. 10, a distal end surface 18c (radially inner surface, distal end surface) of each of the teeth 17a is arcuate and extends about an axis L of a motor 11. The distal end surface 18c of each tooth 17a extends from one projections 18b to the other projection 18b.

Figure 11:
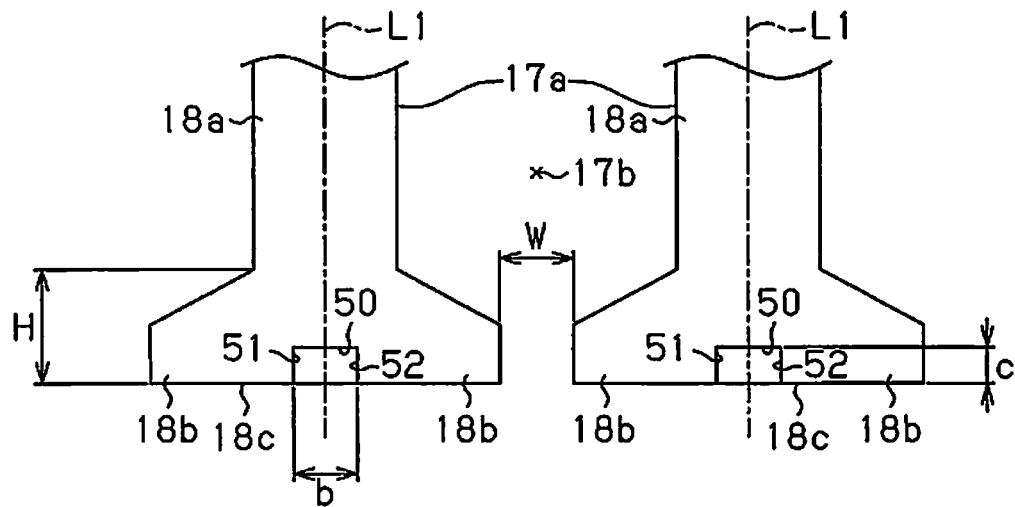
FIG. 11 is a schematic diagram illustrating teeth that are shown in FIG. 10.

As shown in FIGS. 10 and 11, one tooth groove 50 is formed in the distal end surface 18c of each of the teeth 17a. The tooth groove 50 is a groove recessed in a radial direction of the motor 11 and continuously extending in an axial direction (extending axial direction L) of the motor 11. Each tooth groove 50 is formed in the substantially center part of the corresponding tooth 17a in the circumferential direction. As shown in FIG. 11, each of the teeth 17a is formed in line symmetry relative to the circumferential center line L1.

Each of the tooth grooves 50 has two side surface portions 51 and 52 opposed to each other in a circumferential direction of the motor 11. When a length (circumferential width of tooth groove 50) between the side surface portion 51 and the side surface portion 52 of the tooth groove 50 is expressed by B and an opening width of a slot 17b is expressed by W, the tooth groove 50 is set to satisfy 1.5≤b/W≤2.0. The opening width W of the slot 17b is the circumferential length between the projections 18b, which are adjacent to each other in the circumferential direction, in the ones of the teeth 17a that are adjacent to each other in the circumferential direction.

When a radial length (depth of tooth groove 50) of the tooth groove 50 is expressed by c and a radial length (thickness) of the projection 18b serving as the distal end of the tooth 17a is expressed by H, the tooth groove 50 is set so that 0.6<c/H≤1.2 is satisfied.

The operation of the brushless motor 11 will now be described.

In the second embodiment, the magnetic (iron) yoke housing 13 is located in the vicinity of one axial end surface of the rotor 21 and the resin end plate 14 is located in the vicinity of the other axial end surface of the rotor 21. Thus, some of the magnetic flux from the annular magnet 33 of the rotor 21 leaks toward the case 12 (yoke housing 13) and causes a magnetic imbalance.

Figure 12:
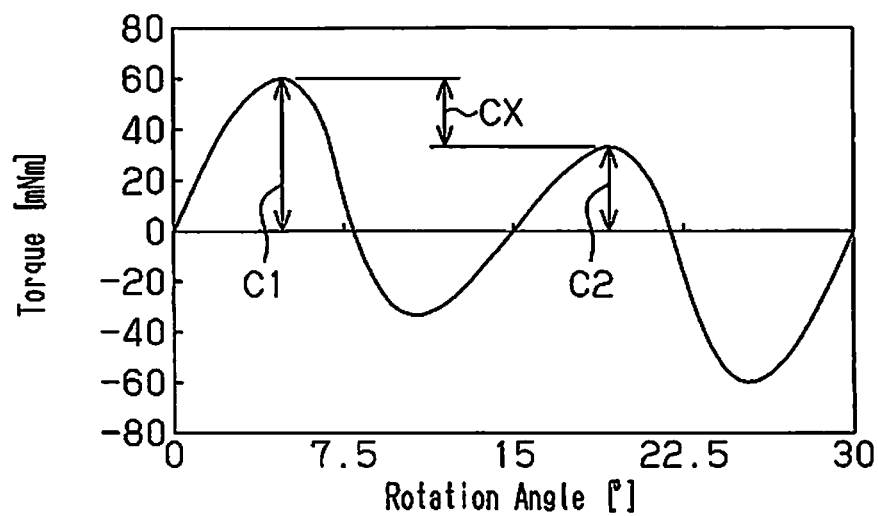
FIG. 12 is a schematic diagram illustrating the bias of cogging torque caused by the influence of a case.

More specifically, as shown in FIG. 12, the cogging torque C1 generated by one of the magnetic poles and the cogging torque C2 generated by the other magnetic pole is represented by C1>C2. This generates the cogging bias CX (=C1−C2).

Figure 13A:
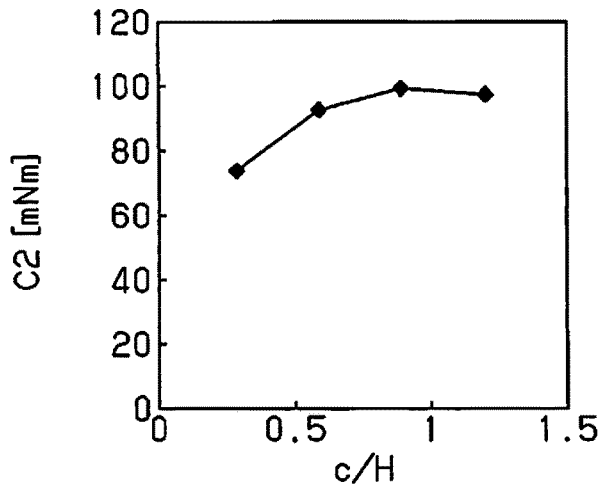
FIG. 13A is a schematic diagram illustrating changes in the cogging torque caused by differences in the radial length (depth) of a groove.
Figure 13B:
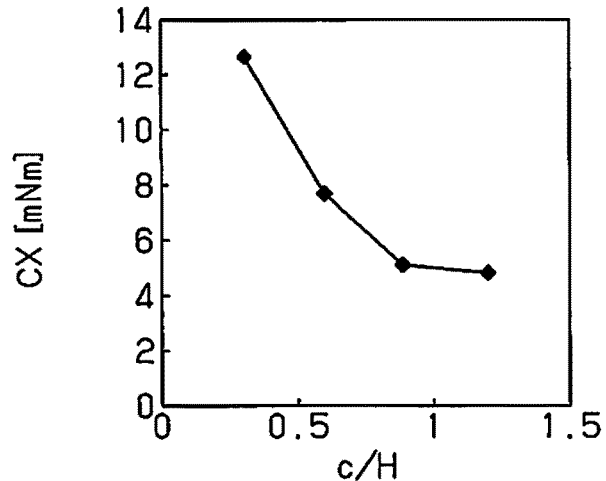
FIG. 13B is a schematic diagram illustrating variations in the cogging bias caused by differences in the radial length (depth) of the groove.
Figure 14:
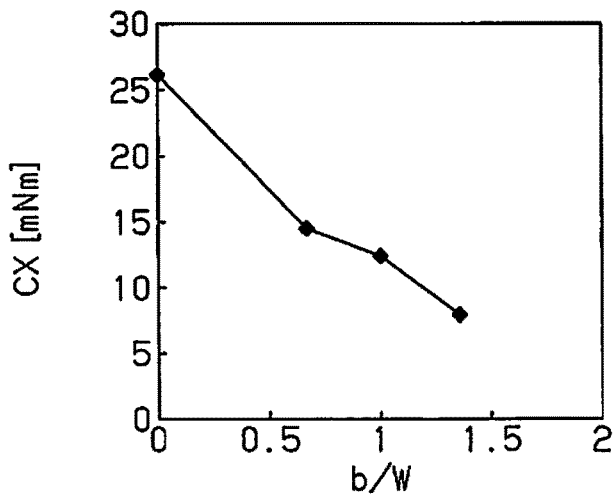
FIG. 14 is a schematic diagram illustrating variations in the cogging bias caused by differences in the circumferential width of the groove.

Hence, in the second embodiment, the tooth groove 50 is formed at a substantially circumferential center of the distal end surface of each of the teeth. By forming the tooth groove 50, the tooth 17a can be magnetically saturated to reduce the magnetic flux that leaks toward the yoke housing 13. This limits deterioration in the magnetic balance of the rotor. By increasing the depth of the groove of the tooth groove 50 to satisfy 0.6<c/H≤1.2, the cogging torque C2 may be increased and the cogging bias may be deceased as shown in FIGS. 13A and 13B. When increasing the width of the groove of the tooth groove 50 to satisfy 0.6≤b/W≤1.3, the cogging bias is reduced as shown in FIG. 14.

The advantages of the second embodiment will now be described.

(3) The tooth 17a of the stator 16 is shaped to enable magnetic saturation. More specifically, the tooth groove 50 is formed at the substantially circumferential center of the distal end surface 18c of each of the teeth 17a. The tooth groove 50 magnetically saturates the tooth 17a. This limits the leakage of magnetic flux toward the yoke housing 13. Thus, deterioration in the magnetic balance of the rotor 21 is limited.

(4) The tooth groove 50 is formed to satisfy 0.6<c/H≤1.2. This allows for an increase in the cogging torque and a decrease in the cogging bias as shown in FIGS. 13A and 13B.

(5) The tooth groove 50 is formed to satisfy 0.6≤b/W≤1.3. This allows for a decrease in the cogging bias as shown in FIG. 14.

A third embodiment of the motor will now be described. Same reference numerals are given to those components that are the same as the corresponding components of the first embodiment. Such components will not be described in detail.

Figure 16:
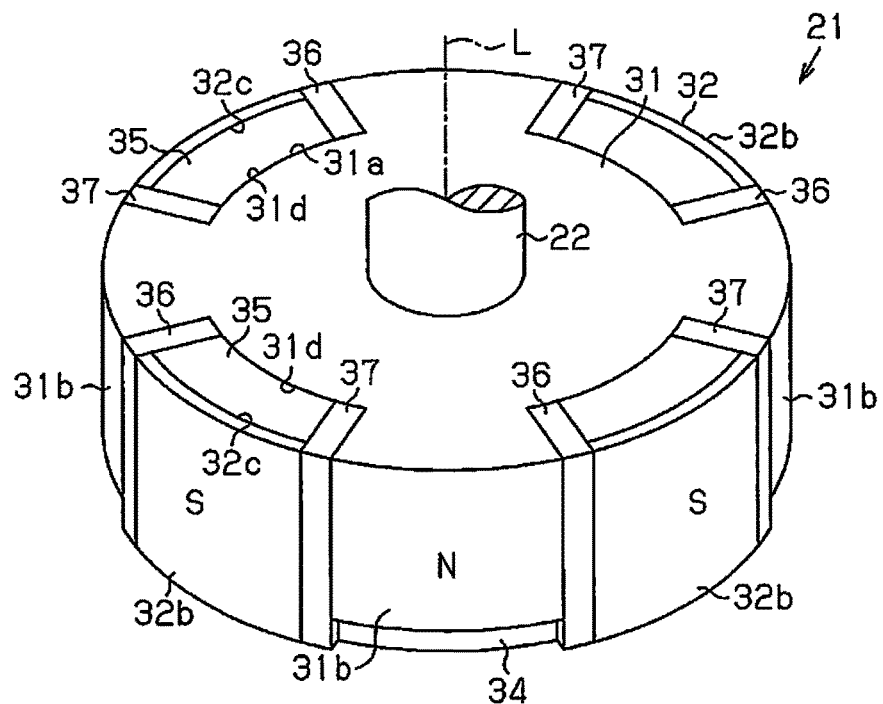
FIG. 16 is a perspective view of a rotor shown in FIG. 15.
Figure 17:
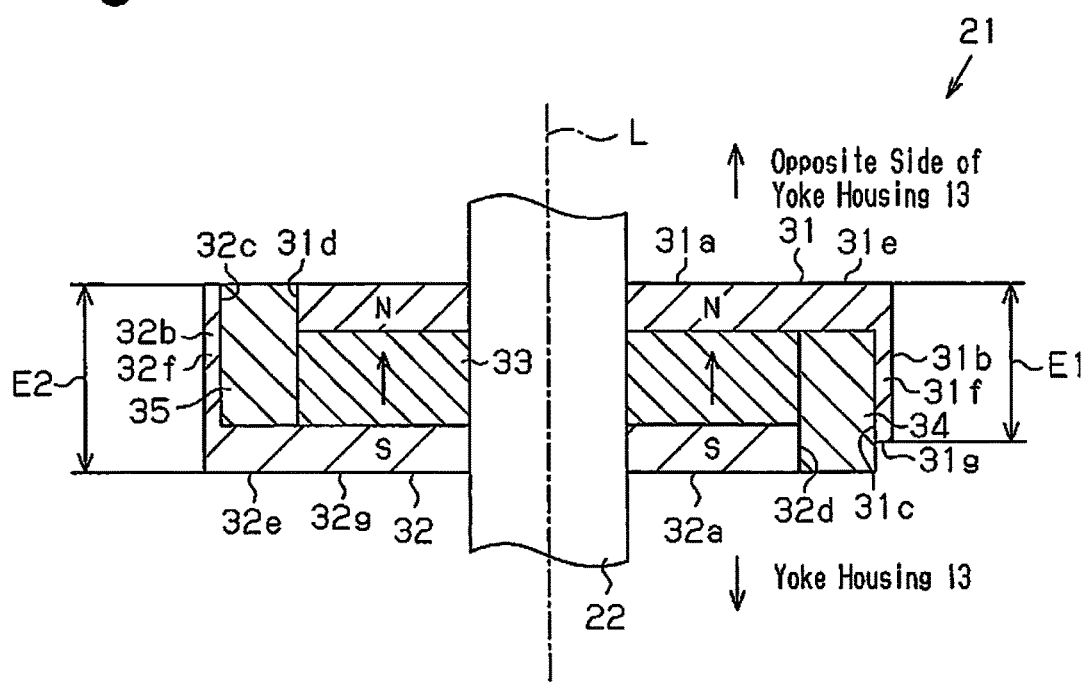
FIG. 17 is a cross-sectional view of the motor shown in FIG. 15.

As shown in FIGS. 16 and 17, each of first claw poles 31b of a first rotor core 31 includes a first projection 31e, which projects toward the outer side in a radial direction from a circumferential portion of a first core base 31a, and a first claw 31f, which is located at a distal end of the first projection 31e and extended in an axial direction. The first projection 31e is sectoral-shaped as viewed from the axial direction. A cross-section of the first claw 31f in a direction perpendicular to the axis is sectoral-shaped.

As shown in FIGS. 16 and 17, each of second claw poles 32b of a second rotor core 32 includes a second projection 32e projecting toward the outer side in the radial direction from a circumferential portion of a second core base 32a, and a second claw 32f, which is located on a distal end of the second projection 32e and extended in the axial direction. The second projection 32e is sectoral-shaped as viewed from the axial direction like the first projection 31e of the first rotor core 31. The cross-section of the second claw 32f in a direction perpendicular to the axis is sectoral-shaped. The second claw 32f of the second rotor core 32 has a greater axial length than the first claw 31f of the first rotor core 31.

In a rotor 21 having the above-described structure, the second core base 32a is located closer to a yoke housing 13 (closer to closed end 13a) than the first core base 31a in the axial direction.

As shown in FIG. 17, an axial length E2 of the second claw pole 32b of the second rotor core 32 is greater than an axial length E1 of the first claw pole 31b of the first rotor core 31. In other words, the first claw pole 31b of the first rotor core 31 is formed so that the axial length E1 is less than the axial length E2 of the second claw pole 32b of the second rotor core 32. Hence, when the first and second rotor cores 31 and 32 and the annular magnet 33 are coupled together, a distal end surface 31g of the first claw pole 31b is located at a position further toward the opposite of the yoke housing 13 (position separated from yoke housing 13) than the axial end surface 32g of the second core base 32a in the axial direction.

Figure 15:
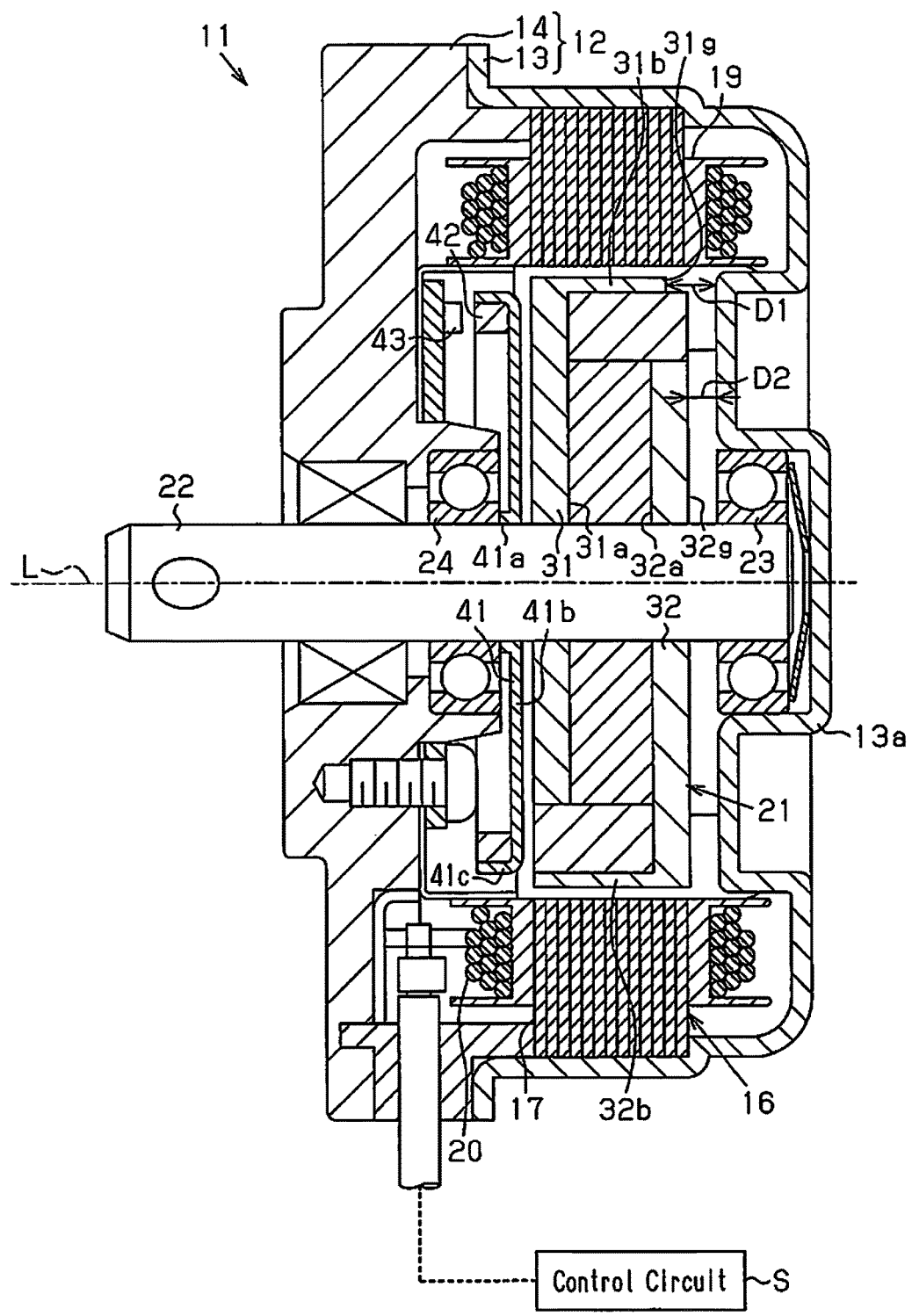
FIG. 15 is a cross-sectional view of a motor according to a third embodiment of the present invention.

As a result, as shown in FIG. 15, a separated distance D1 between the yoke housing 13 and the distal end surface 31g of the first claw pole 31b (first claw 31f) in the axial direction is greater than a separated distance D2 between the yoke housing 13 and the axial end surface 32g of the second core base 32a in the axial direction.

The operation of the brushless motor 11 will now be described.

In the third embodiment, the second claw pole 32b of the second rotor core 32 has a greater axial length than that of the first claw pole 31b of the first rotor core 31. Thus, the magnetic resistance between the second claw pole 32b and the stator 16 becomes lower than that between the first claw pole 31b and the stator 16. Here, since the second core base 32a of the second rotor core 32 is located at a position closer to the yoke housing 13 in the axial direction, magnetic flux easily leaks from the second core base 32a toward the yoke housing 13. However, the second claw pole 32b is longer in the axial direction than the first claw pole 31b as described above. Hence, the magnetic resistance of the second claw pole 32b becomes relatively low, and magnetic flux leakage toward the yoke housing 13 is reduced. The amount of magnetic flux leakage toward the yoke housing. 13 from the first rotor core 31, which is located at a position relatively far from the yoke housing 13 in the axial direction, is small. Hence, when the axial length of the second claw pole 32b is set to be equal to the axial length of the first claw pole 31b, the amount of magnetic flux between the first claw pole 31b and the stator 16 has a tendency of becoming greater than the amount of magnetic flux between the second claw pole 32b and the stator 16. That is, the magnetic flux is imbalanced between the two magnetic poles (first rotor core 31 and second rotor core 32). Thus, by decreasing the axial length of the first claw pole 31b from that of the second claw pole 32b, the magnetic resistance between the first claw pole 31b and the stator 16 increases, and an imbalance in the magnetic flux between the two magnetic poles is reduced.

The advantages of the third embodiment will now be described.

(6) When the second core base 32*a* of the second rotor core 32 is located at a position close to the magnetic yoke housing 13 in the axial direction, magnetic flux easily leaks from the second core base 32*a* of the second rotor core 32 toward the yoke housing 13. In the third embodiment, the first rotor core 31 and the second rotor core 32 have asymmetric shapes to balance the magnetic flux from the first rotor core 31 and the magnetic flux from the second rotor core 32. More specifically, the claw pole 32*b* of the second rotor core 32 has an axial length E2 that is greater than the axial length E1 of the claw pole 31*b* of the first rotor core 31. Thus, the magnetic resistance between the second claw pole 32*b* and the stator 16 is small. Hence, it is possible to reduce flux leakage directed toward the yoke housing 13. This allows for an improvement in the output characteristics.

(7) By decreasing the axial length of the first claw pole 31*b* from that of the second claw pole 32*b*, the magnetic resistance between the first claw pole 31*b* and the stator 16 increases. This allows for an imbalance in the magnetic flux between the two magnetic poles to be reduced.

(8) The axial distance between the yoke housing 13 and the distal end surface 31*g* of the first claw pole 31*b* (first claw 31*f*) may be obtained. Hence, it is possible to reduce flux leakage from the distal end surface 31*g* of the first claw pole 31*b* (first claw 31*f*) toward the yoke housing 13, and to increase the amount of interlinkage magnetic flux toward the stator 16.

A fourth embodiment of the motor will now be described. Same reference numerals are given to those components that are the same as the corresponding components of the first embodiment. Such components will not be described in detail.

As shown in FIGS. 18 to 21, each of first claw poles 31*b* of a first rotor core 31 includes a first projection 31*e*, which projects toward the outer side in a radial direction from a circumferential portion of a first core base 31*a*, and a first claw 31*f*, which is located on a distal end of the first projection 31*e* and extended in an axial direction. The first projection 31*e* is sectoral-shaped as viewed from the axial direction. The cross-section of the first claw 31*f* in a direction perpendicular to the axis is sectoral-shaped.

As shown in FIGS. 18 to 21, each, of second claw poles 32*b* of a second rotor core 32 includes a second projection 32*e* projecting toward the outer side in the radial direction from a circumferential portion of a second core base 32*a*, and a second claw 32*f* provided on a distal end of the second projection 32*e* and extended in the axial direction. The second projection 32*e* is sectoral-shaped as viewed from the axial direction like the first projection 31*e* of the first rotor core 31. The cross-section of the second claw 32*f* in a direction perpendicular to the axis is sectoral-shaped.

Figure 18:
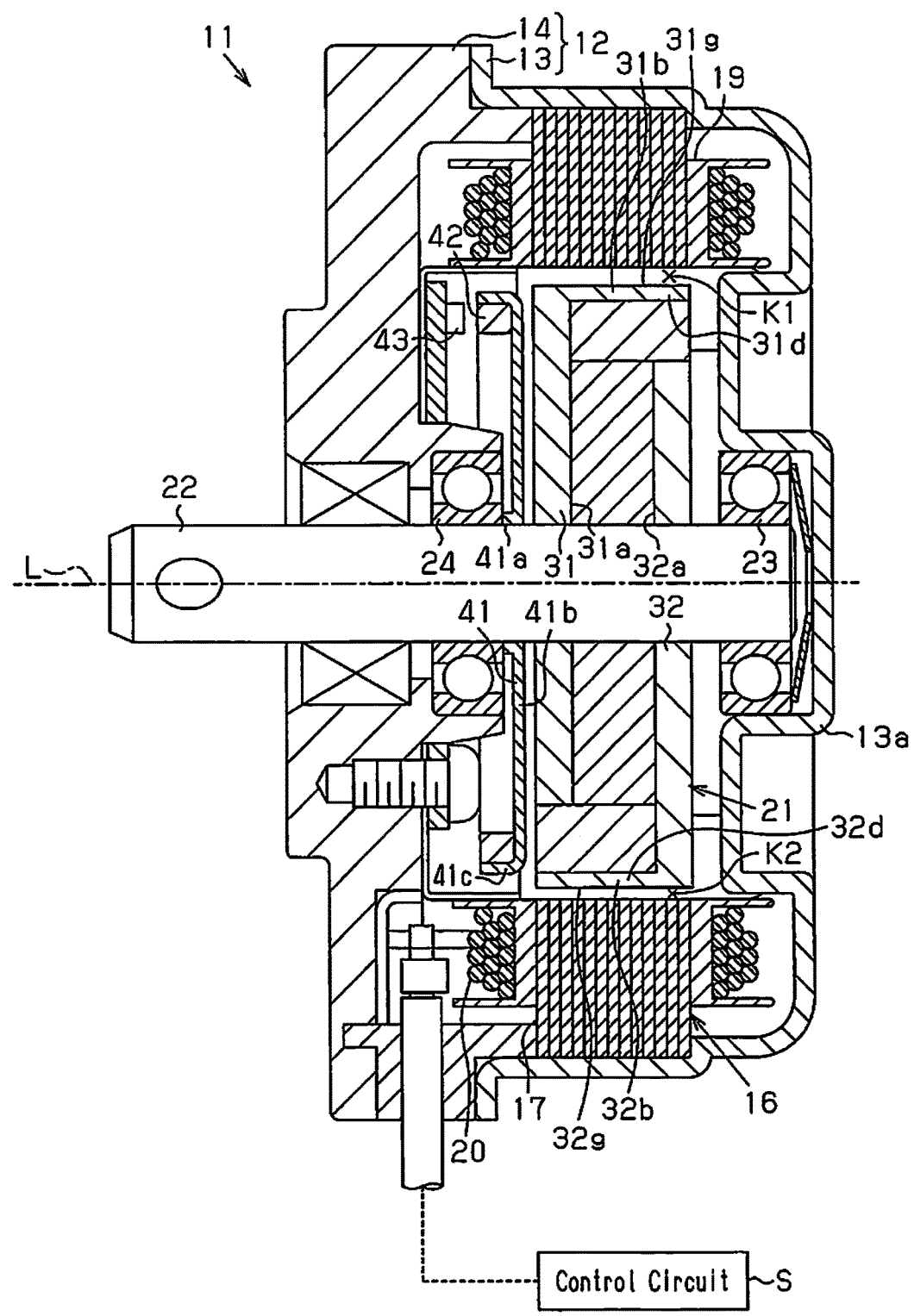
FIG. 18 is a cross-sectional view of a motor according to a fourth embodiment of the present invention.
Figure 19:
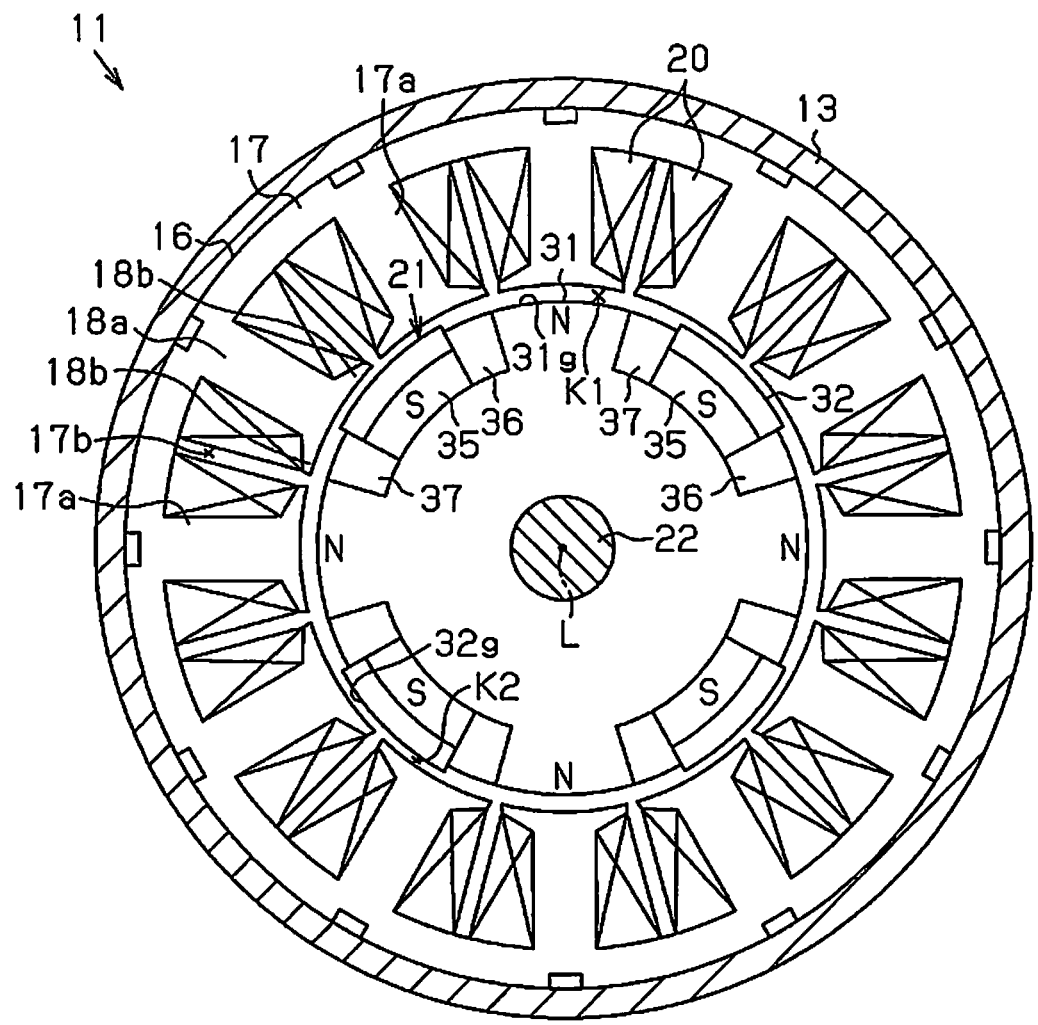
FIG. 19 is a plan view of the motor shown in FIG. 18.
Figure 20:
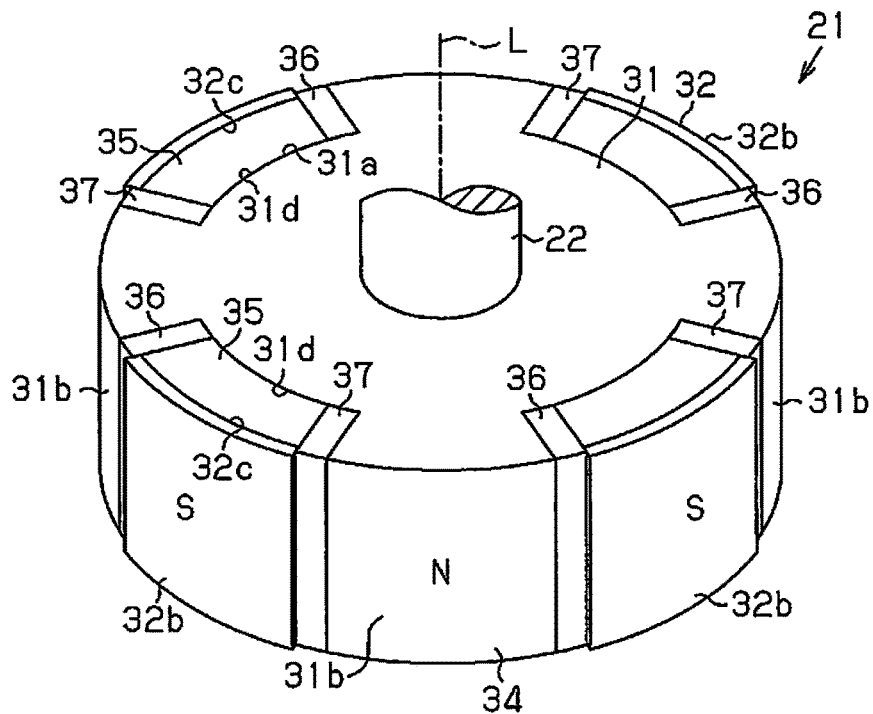
FIG. 20 is a perspective view of a rotor shown in FIG. 19.
Figure 21:
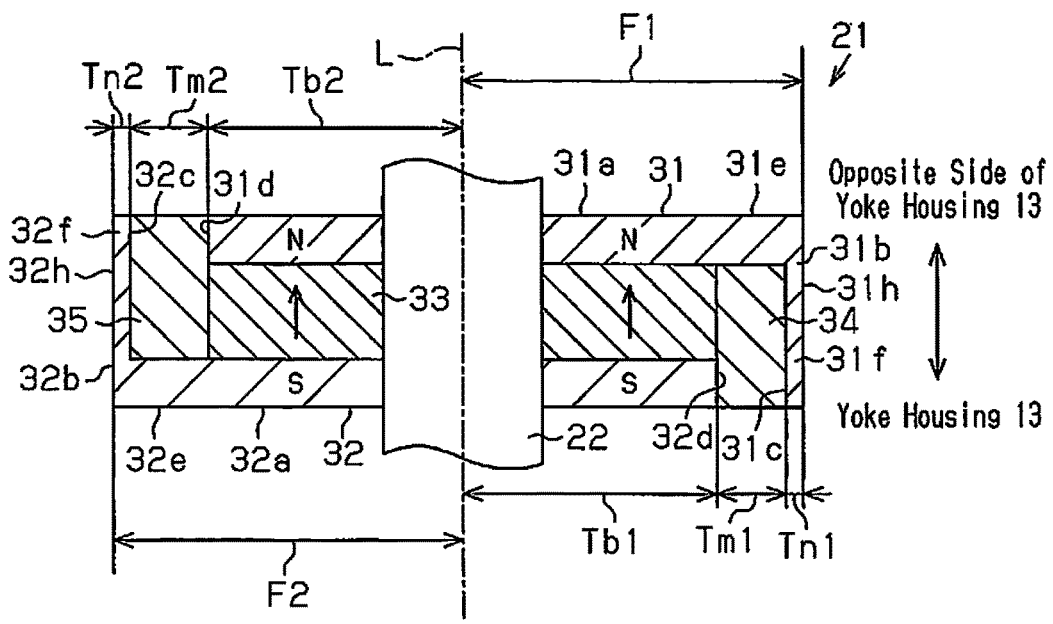
FIG. 21 is a cross-sectional view of the rotor shown in FIG. 20.

As shown in FIG. 21, a radial length Tm2 of the second projection 32*e* of the second rotor core 32 is greater than a radial length Tm1 of the first projection 31*e* of the first rotor core 31. The radial lengths Tb1 and Tb2 of the first and second core bases 31*a* and 32*a* are the same, and the radial lengths Tn1 and Tn2 (thicknesses) of the first and second claws 31*f* and 32*f* are the same. Outer circumferential surfaces 31*h* and 32*h* of the first and second claw poles 31*b* and 32*b* (first and second claws 31*f* and 32*f*) of the fourth embodiment are curved surfaces lying along concentric circles extending about the center (axis L) of the rotor. Hence, a radial length F2 (second radial length) from a radial center (axis L) of the second rotor core 32 to an outer circumferential surface 32*h* of the second claw pole 32*b* is greater than a radial length F1 (first radial length) from a radial center (axis L) of the first rotor core 31 to an outer circumferential surface 31*h* of the first claw pole 31*b* (F2>F1). As a result, as shown in FIG. 18, a gap K2 (second gap) in the radial direction between a tooth 17*a* of a stator core 17 and the outer circumferential surface 32*h* of the second claw pole 32*b*, which is opposed to the tooth 17*a*, is smaller than a gap K1 (first gap) in the radial direction between the tooth 17*a* and the outer circumferential surface 31*h* of the first claw pole 31*b*, which is opposed to the tooth 17*a* (K2<K1). That is, in the radial direction of the rotor 21, the gap K1, which serves as a first gap, is larger than the gap K2, which serves as a second gap.

In the rotor 21 having the above-described structure, the second core base 32*a* is located at a position (position close to closed end 13*a*) closer to the yoke housing 13 than the first core base 31*a* in the axial direction.

The operation of the brushless motor 11 will now be described.

In the fourth embodiment, the radial length F2 (second radial length) from the radial center (axis L) of the second rotor core 32 to the outer circumferential surface 32*h* of the second claw pole 32*b* is greater than the radial length F1 (first radial length) from the radial center (axis L) of the first rotor core 31 to the outer circumferential surface 31*h* of the first claw pole 31*b* (F2>F1). Thus, the radial distance (gap K2) between the second rotor core 32 and the stator 16 is less than the radial distance (gap K1) between the first rotor core 31 and the stator 16. Hence, the magnetic resistance between the second claw pole 32*b* and the stator 16 (tooth 17*a*) is lower than the magnetic resistance between the first claw pole 31*b* and the stator 16 (tooth 17*a*). Here, since the second core base 32*a* of the second rotor core 32 is located at a position proximal to the yoke housing 13 in the axial direction, magnetic flux easily leaks from the second core base 32*a* toward the yoke housing 13. However, since length F2>length F1 is satisfied as described above, the magnetic resistance is reduced between the second rotor core 32 and the stator 16 (tooth 17*a*). This limits the leakage of magnetic flux toward the yoke housing 13. Further, with regard to the first rotor core 31 that is relatively far from the yoke housing 13, the amount of magnetic flux leaking toward the yoke housing 13 is small. Thus, even when the first rotor core 31 is separated from the stator 16 further in the radial direction than the second rotor core 32, which is relatively close to the yoke housing 13, a sufficient amount of magnetic flux is obtained.

The advantages of the fourth embodiment will now be described.

(9) When the second core base 32*a* of the second rotor core 32 is located at a position close to the magnetic yoke housing 13 in the axial direction, magnetic flux easily leaks from the second core base 32*a* of the second rotor core 32 toward the yoke housing 13. In the fourth embodiment, the first rotor core 31 and the second rotor core 32 have asymmetric shapes to balance the magnetic flux from the first rotor core 31 and the magnetic flux from the second rotor core 32. More specifically, the radial distance (second gap) between the second rotor core 32 and the stator 16 is smaller than the radial distance (first gap) between the first rotor core 31 and the stator 16. This decreases the magnetic resistance between the stator 16 and the second claw pole 32*b* of the second rotor core 32. This allows for reduction in the flux leakage toward the yoke housing 13, and improves the output characteristics. A small amount of magnetic flux leaks toward the yoke housing 13 from the first rotor core 31, which is located at a relatively far axial position from the yoke housing 13. Hence, when the gap K2 between the tooth 17a and the second claw pole 32b of the second rotor core 32 is the same as the gap K1 between the tooth 17a and the first claw pole 31b of the first rotor core 31, the amount of magnetic flux between the tooth 17a and the first claw pole 31b of the first rotor core 31 has a tendency of becoming greater than the amount of magnetic flux between the tooth 17a and the second claw pole 32b of the second rotor core 32. This results in a magnetic flux imbalance in the two magnetic poles (first rotor core 31 and second rotor core 32). Since the radial distance between the second rotor core 32 and the stator 16 is less than the radial distance between the first rotor core 31 and the stator 16, the magnetic resistance between the tooth 17a and the first claw pole 31b of the first rotor core 31 increases, and magnetic flux imbalance is reduced between the two magnetic poles.

(10) The circumferential surface 32h of the second claw pole 32b of the second rotor core 32 may entirely be closer to the stator 16 (tooth 17a) than the entire circumferential surface 31h of the first claw pole 31b of the first rotor core 31. This allows for reduction in the flux leakage and improvement in the output characteristics.

A fifth embodiment of the motor will now be described.

In the fifth embodiment, a rotor 21 is shaped differently from the fourth embodiment, and a motor case 12 and a stator 16 have the same structures as the fourth embodiment. In the fifth embodiment, the description will focus on the differing points of the rotor 21. Same reference characters are used for the same components, and such components will not be described in detail.

Figure 23:
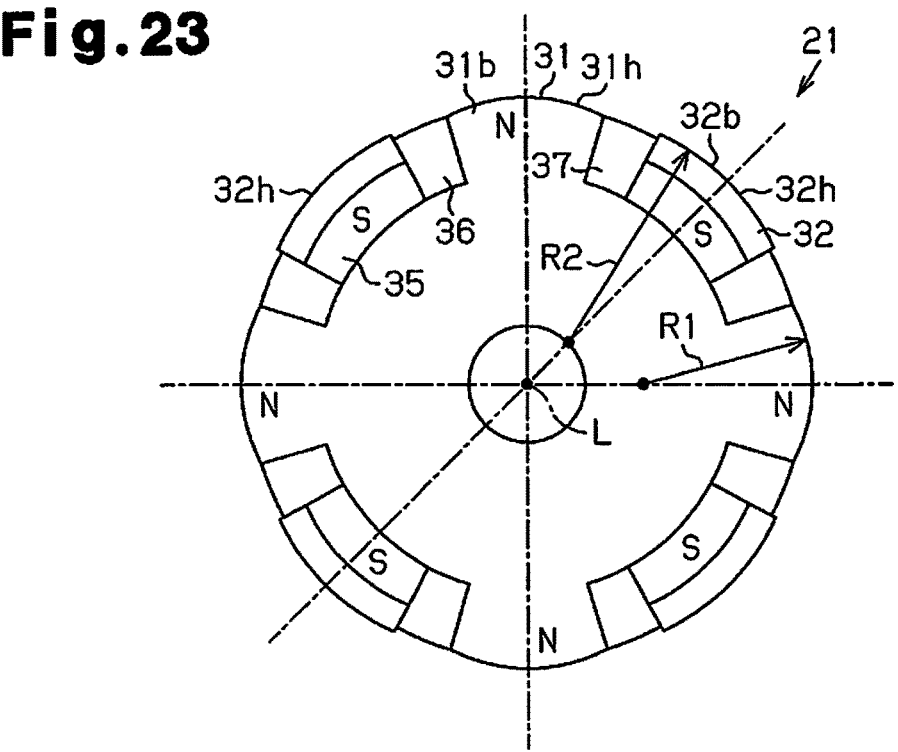
FIG. 23 is a plan view of a rotor according to a fifth embodiment of the present invention.
Figure 24:
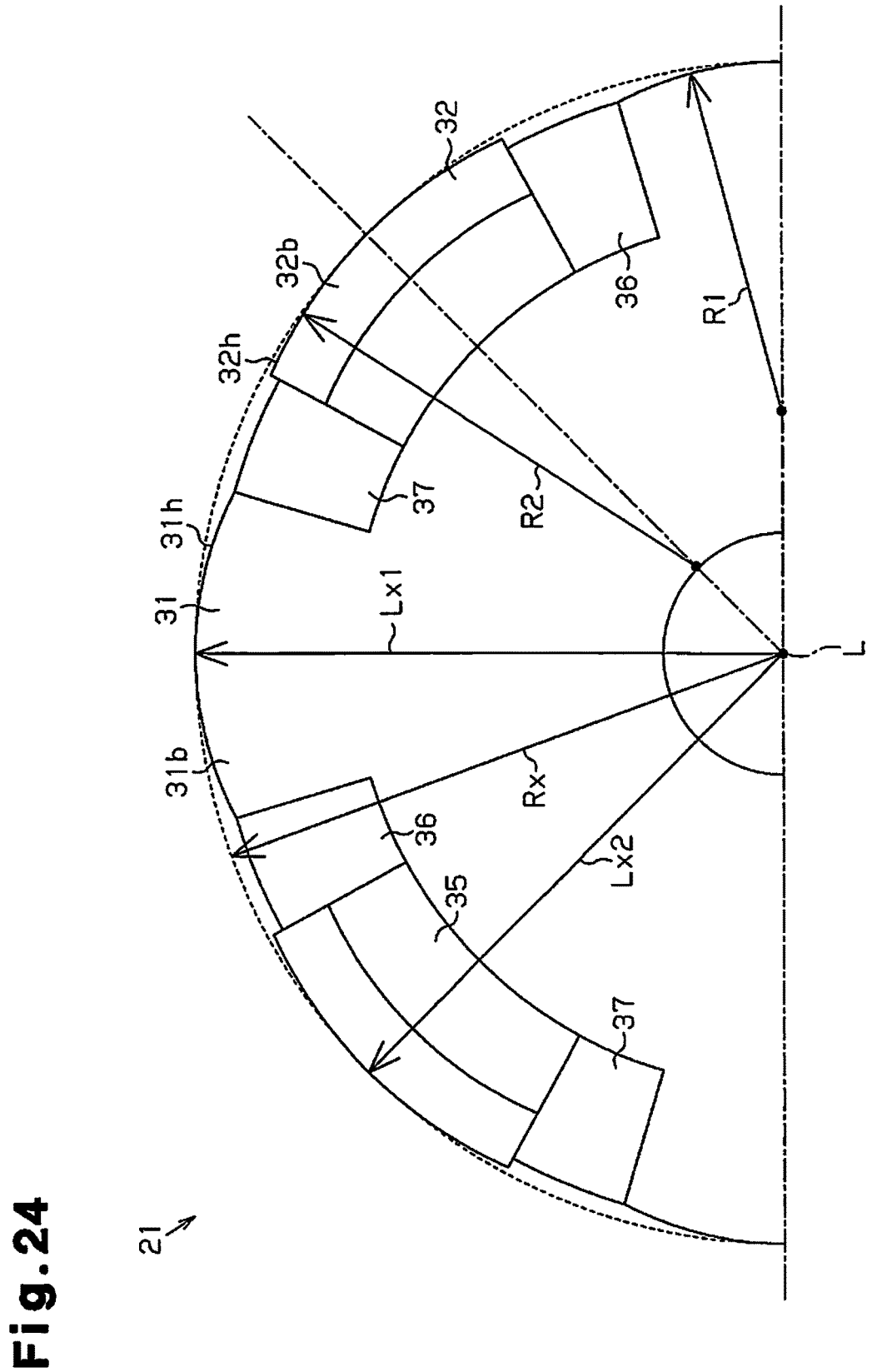
FIG. 24 is a partially enlarged plan view of the rotor shown in FIG. 23.

As shown in FIGS. 23 and 24, the radii of curvature R1 and R2 of outer circumferential surfaces 31h and 32h of first and second claw poles 31b and 32b are smaller than a radius of curvature Rx of the rotor 21. Here, the radius of curvature Rx of the rotor 21 is a length from a rotor center (axis L) to the farthest position in the rotor 21 in a radial direction of the motor. In the fifth embodiment, radially outermost portions (radially outer portions) of the first and second claw poles 31b and 32b are the farthest positions in the rotor 21.

The radius of curvature R1 of the outer circumferential surface 31h of the first claw pole 31b is smaller than the radius of curvature R2 of the outer circumferential surface 32h of the second claw pole 32b (R1>R2). Radial lengths between each of the outer circumferential surfaces 31h and 32h of the first and second claw poles 31b and 32b and the rotor center (axis L) is the longest at a substantially circumferential center of each of the outer circumferential surfaces 31h and 32h, and the lengths are Lx1 and Lx2, respectively. The lengths Lx1 and Lx2 are the same (Lx1=Lx2). Hence, the distance (first maximum gap) between a stator 16 and the first claw pole 31b having a small radius of curvature is longer than the distance (second maximum gap) between the stator 16 and the second claw pole 32b having a large radius of curvature.

The operation of the fifth embodiment will now be described.

In the rotor 21 of the fifth embodiment, the radii of curvature R1 and R2 of the outer circumferential surfaces 31h and 32h of the first and second claw poles 31b and 32b are smaller than the radius of curvature Rx of the rotor 21. When each of the first and second claw poles 31b and 32b is opposed to the teeth 17a of the stator 16, radial distances (gaps) between each of the outer circumferential surfaces 31h and 32h and the stator 16 (teeth 17a) are gradually changed in an order of "large", "small", "large" from one side to the other side in a circumferential direction of the motor. This smoothly changes the magnetic flux density.

Figure 25:
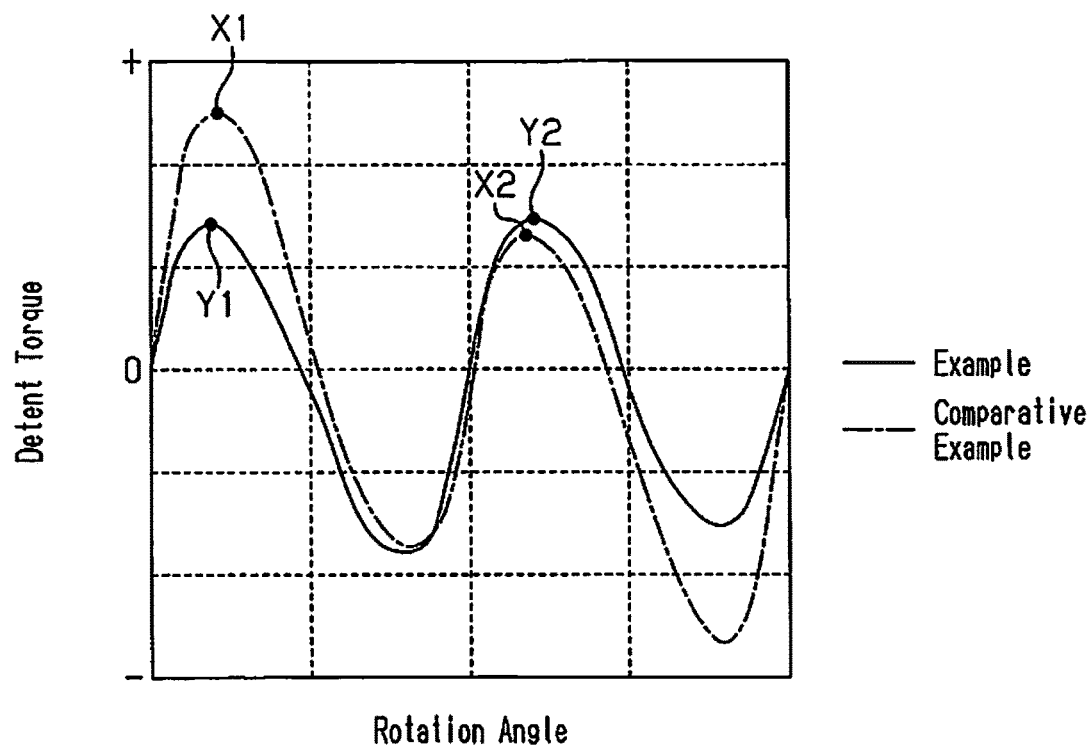
FIG. 25 is a graph illustrating the detent torque of the rotor shown in FIG. 23.
Figure 26:
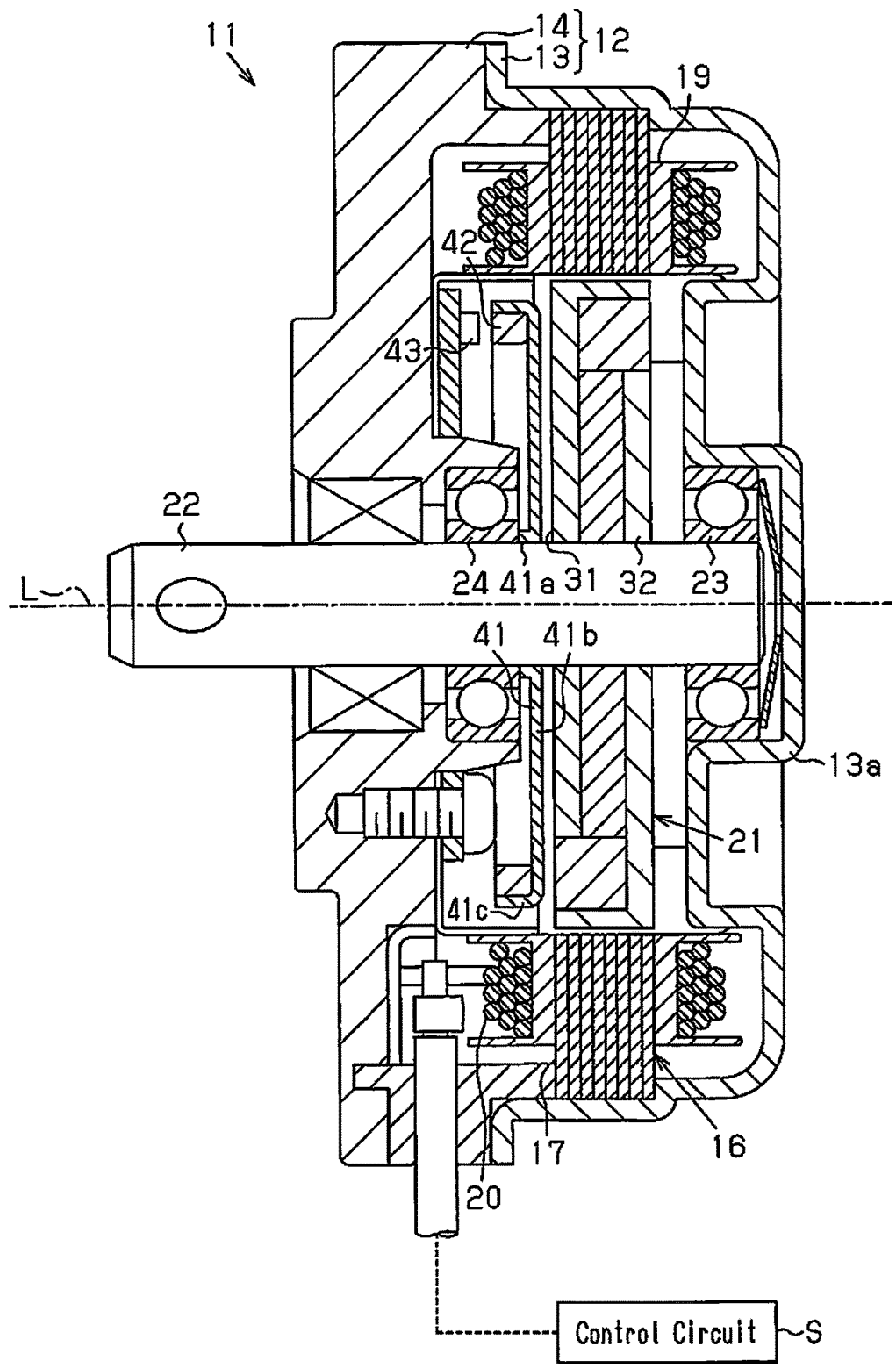
FIG. 26 is a cross-sectional view of a motor according to a sixth embodiment of the present invention.

When, for example, the distance of gaps between the stator 16 and each of the first and second claw poles 31b and 32b are not changed, the magnetic flux density acting on the gaps is high in the first rotor core 31, which is located at a position far from the yoke housing 13, and the detent torque has a tendency of becoming high as shown by X1 in FIG. 25. In the second rotor core 32 that is close to the yoke housing 13, the magnetic flux density acting on the gaps is low. Thus, the detent torque tends to become low as shown by X2 in FIG. 25. Hence, the detent torque is imbalanced.

Accordingly, the first claw pole 31b of the first rotor core 31, which is far from the yoke housing 13, is an eccentric curved surface and a radial distance between the first claw pole 31b and the stator 16 is varied in the circumferential direction as described above. This allows for reduction in the detent torque as shown by Y1 in FIG. 25. This reduces the difference between the detent torque of the second rotor core 32 and the detent torque of the first rotor core 31, and the detent torques are balanced.

The advantages of the fifth embodiment will now be described.

In the motor of the fifth embodiment, the advantage described below is obtained in addition to advantage (9) of the fourth embodiment.

(11) The first rotor core 31 and the second rotor core 32 have asymmetric shapes to balance the magnetic flux from the first rotor core 31 and the magnetic flux from the second rotor core 32. More specifically, the gap between the tooth 17a and an opposed surface (outer circumferential surface 31h) of the first claw pole 31b is gradually varied in the circumferential direction. This smoothly varies the magnetic flux density and reduces the detent torque. Thus, the detent torques at the first and second rotor cores 31 and 32 are balanced as shown in FIG. 25.

A sixth embodiment of the motor will now be described. Same reference numerals are given to those components that are the same as the corresponding components of the first embodiment. Such components will not be described in detail.

As shown in FIGS. 26 to 29, each of first claw poles 31b of a first rotor core 31 includes a first projection 31e, which projects toward the outer side in a radial direction from a circumferential portion of a first core base 31a, and a first claw 31f, which is located at a distal end of the first projection 31e and extended in an axial direction. The first projection 31e is sectoral-shaped as viewed from the axial direction. A cross-section of the first claw 31f in a direction perpendicular to the axis is sectoral-shaped.

As shown in FIGS. 26 to 29, each of the second claw poles 32b of the second rotor core 32 includes a second projection 32e, which projects toward the outer side in the radial direction from a circumferential portion of a second core base 32a, and a second claw 32f, which is located on a distal end of the second projection 32e and extended in the axial direction. The second projection 32e is sectoral-shaped as viewed from the axial direction like the first projection 31e of the first rotor core 31. A cross-section of the second claw 32f in a direction perpendicular to the axis is sectoral-shaped.

Figure 27:
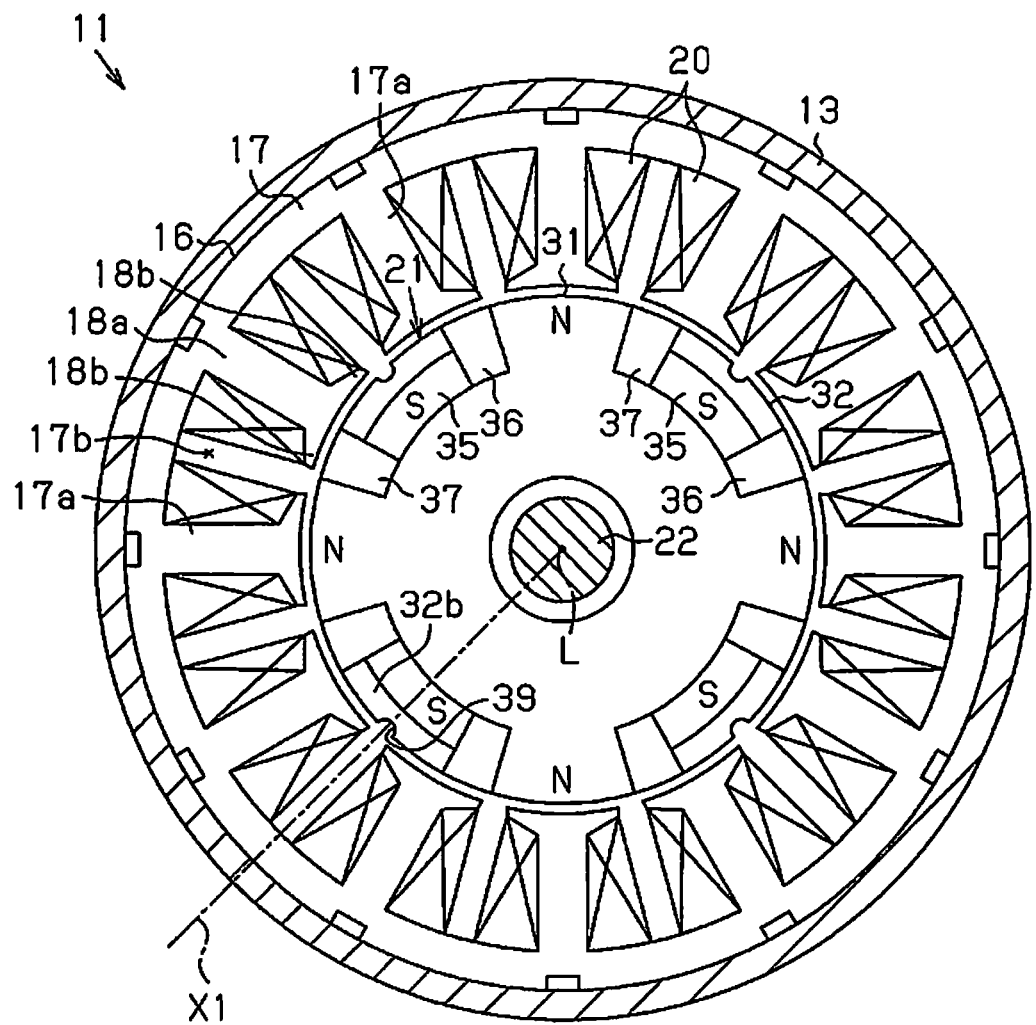
FIG. 27 is a plan view of the motor shown in FIG. 26.
Figure 28:
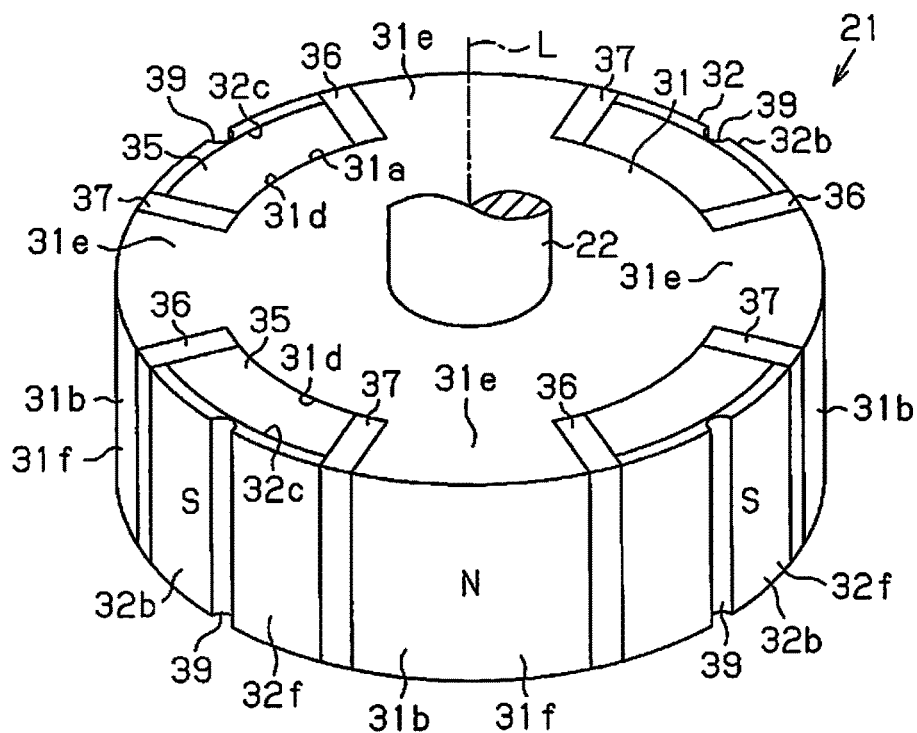
FIG. 28 is a perspective view of a rotor shown in FIG. 26.
Figure 29:
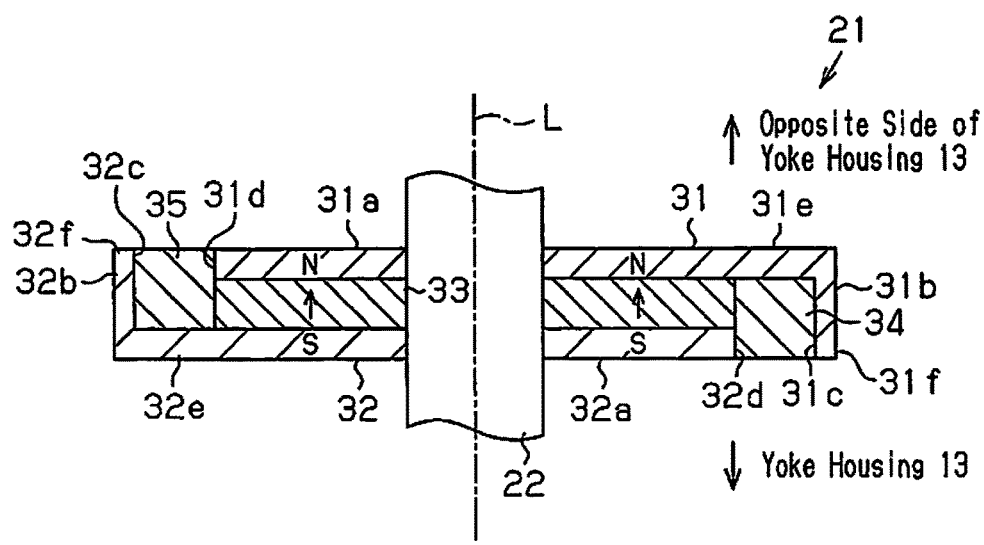
FIG. 29 is a cross-sectional view of the rotor shown in FIG. 28.

As shown in FIG. 27, the second claw 32f of the second claw pole 32b has a groove 39, which extends in the axial direction (axial direction L) and which is recessed toward the inner side in the radial direction. The groove 39 is located on a straight line X1, which connects the rotor center (axis L) and a substantially circumferential central portion of the second claw pole 32*b*.

In the rotor 21 having the above-described structure, the second core base 32*a* is located at a position (position close to closed end 13*a*) closer to a yoke housing 13 than the first core base 31*a* in the axial direction.

The operation of the brushless motor 11 in the sixth embodiment having the above-described structure will now be described.

The rotation of the rotor 21 cyclically generates cogging torque. In the sixth embodiment, the groove 39 is formed in the substantially circumferential central portion of the radially outer surface of the second claw 32*f* of the second claw pole 32*b*. The groove 39 extends in the axial direction (axial direction L) and is recessed toward the inner side in the radial direction. Thus, the cogging torque generated when the groove 39 exists differs from the cogging torque generated when there is no groove 39.

Figure 34:
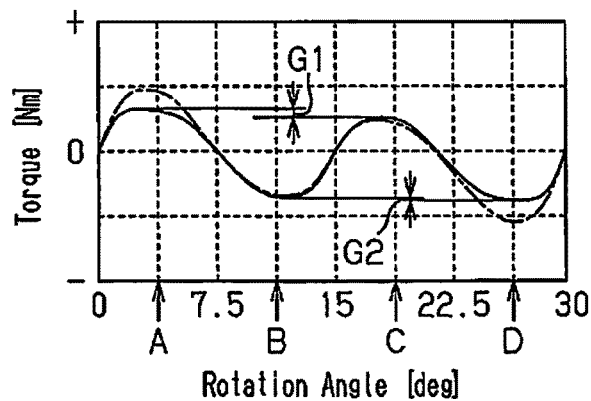
FIG. 34 is a graph illustrating the detent torque of the rotor shown in FIG. 27.

In FIG. 34, the solid line shows changes in the cogging torque when the groove 39 exists (example), and the single-dashed line shows changes in the cogging torque when there is no groove 39 (comparative example).

Figure 30:
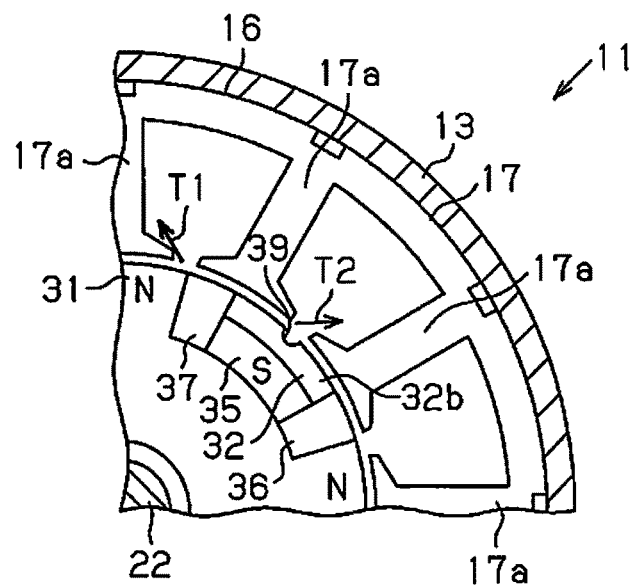
FIG. 30 is a partial plan showing the motor shown in FIG. 27.

For example, when the rotor 21 and the stator 16 are located at the relative positions shown in FIG. 30, cogging torque T1 acts in one circumferential direction between the first rotor core 31 and the teeth 17*a* that are located at the opposite side of the yoke housing 13 in the axial direction. At this position, cogging torque T2 in the circumferential direction opposite from the cogging torque T1 is generated by the groove 39 of the second rotor core 32 that is located close to the yoke housing 13. Here, the relationship of "cogging torque T1>cogging torque T2" is satisfied. Thus, the cogging torque that is actually generated is reduced by the cogging torque T2 as compared with when there is no groove 39 as shown by [A] in FIG. 34.

Figure 31:
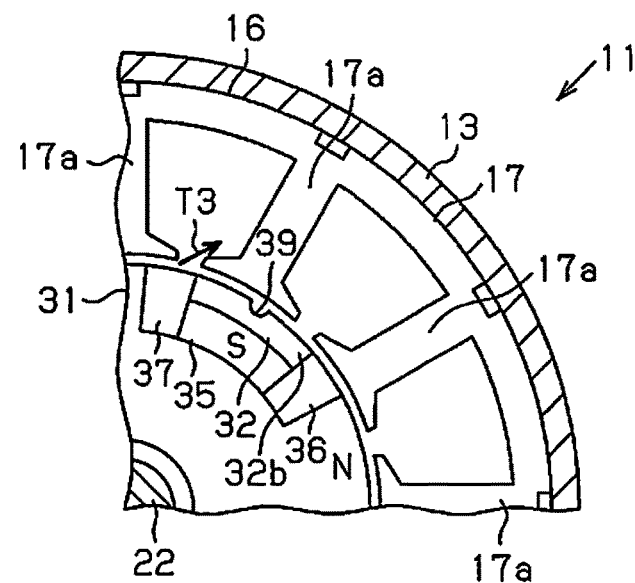
FIG. 31 is a partial plan showing the motor shown in FIG. 27.

Further, for example, when the rotor 21 and the stator 16 are located at the relative positions shown in FIG. 31, cogging torque T3 acting in the other circumferential direction is generated between the second rotor core 32 and the teeth 17*a*, which are located close to the yoke housing 13 in the axial direction. At this position, the cogging torque acting in the circumferential direction opposite from the cogging torque T3 is not generated. Hence, whether or not the groove 39 exists does not affect changes in the cogging torque as shown by [B] in FIG. 34.

Figure 32:
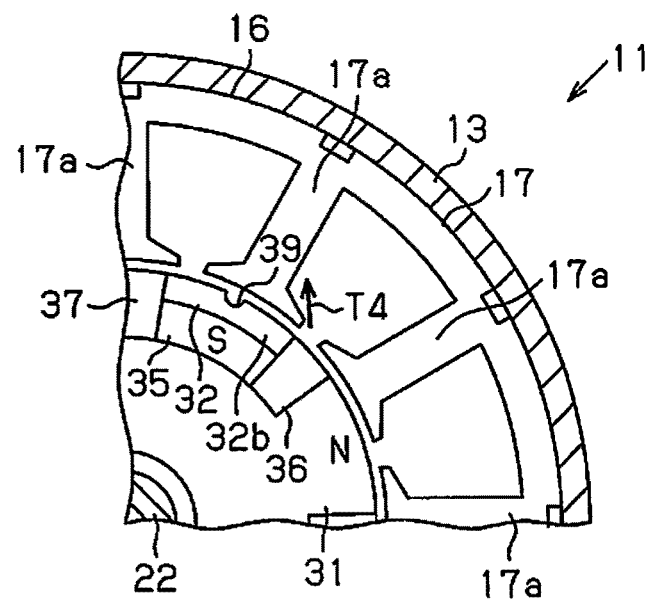
FIG. 32 is a partial plan showing the motor shown in FIG. 27.

When, for example, the rotor 21 and the stator 16 are located at the relative positions shown in FIG. 32, cogging torque T4 acting in one of the circumferential directions is generated between the second rotor core 32 and the teeth 17*a* located close to the yoke housing 13 in the axial direction. At this position, there is no cogging torque acting in the circumferential direction opposite from the cogging torque T4. Hence, whether or not the groove 39 exists does not affect changes in the cogging torque as shown by [C] in FIG. 34.

Figure 33:
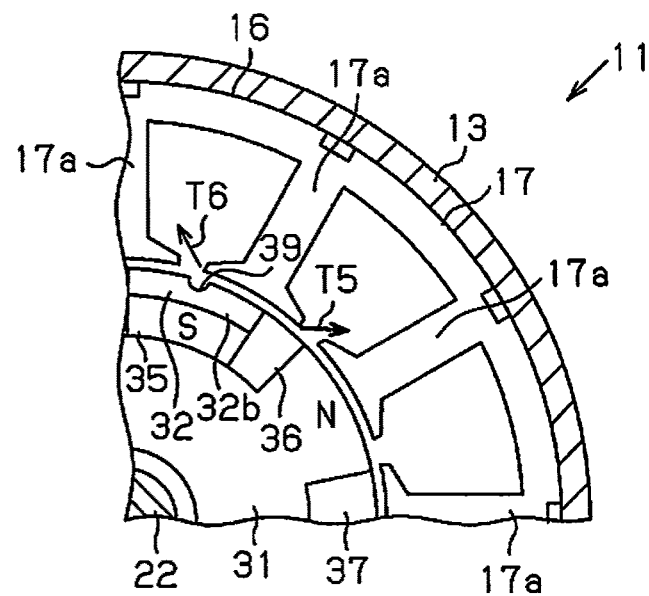
FIG. 33 is a partial plan showing the motor shown in FIG. 27.

Further, when, for example, the rotor 21 and the stator 16 are located at the relative positions shown in FIG. 33, cogging torque T5 acting in the other circumferential direction is generated between the first rotor core 31 and the teeth 17*a* that are located on the opposite side from the yoke housing 13 in the axial direction. At this position, cogging torque T6 acting in the circumferential direction opposite from the cogging torque T5 is generated by the groove 39 of the second rotor core 32 that is located close to the yoke housing 13. Here, the relationship "cogging torque T5>cogging torque T6" is satisfied. Thus, the cogging torque that is actually generated can be reduced by the cogging torque T6 as compared with when there is no groove 39 as shown by [D] in FIG. 34.

The cogging torque actually generated at [A] in FIG. 34 is reduced by the cogging torque T2, and a difference G1 between the cogging torque actually generated at [A] and the cogging torque generated at [C] in FIG. 34 becomes small.

The cogging torque actually generated at [D] in FIG. 34 is reduced by the cogging torque T6, and the difference G2 between the cogging torque actually generated at [D] and the cogging torque generated at [B] in FIG. 34 becomes small.

The advantages of the sixth embodiment will now be described.

(12) The second rotor core 32 located close to the yoke housing 13 in the axial direction includes the groove 39, which is located in the central portion of the second claw pole 32*b*. Thus, cogging torque may be generated acting in a direction (opposite direction in circumferential direction of rotor 21) opposite from large cogging torque generated between the teeth 17*a* and the first claw pole 31*b* of the first rotor core 31 located on the opposite side from the yoke housing 13. This allows for reduction in the cogging torque generated between the teeth 17*a* and the first claw pole 31*b* of the first rotor core 31. Hence, the cyclically generated cogging torques are balanced in a satisfactory manner.

(13) The groove 39 is formed only in the second rotor core 32. This simplifies the shape of the first rotor core 31.

A seventh embodiment of the motor will now be described.

In the seventh embodiment, the rotor 21 is shaped differently from that of the sixth embodiment, and the motor case 12 and the stator 16 have the same structure as the sixth embodiment. Hence, in the seventh embodiment, the description will focus on the differing points of the rotor 21. The same reference characters are used for the same components, and such components will not be described in detail.

The rotor 21 of the motor 11 of the seventh embodiment includes two first and second rotor cores 31 and 32. The seventh embodiment also arranges the second rotor core 32 (second core base 32*a*) close to a yoke housing 13 in the axial direction of the motor 11, and the first rotor core 31 (first core base 31*a*) is located at the opposite side of the yoke housing 13 in the axial direction.

Figure 35:
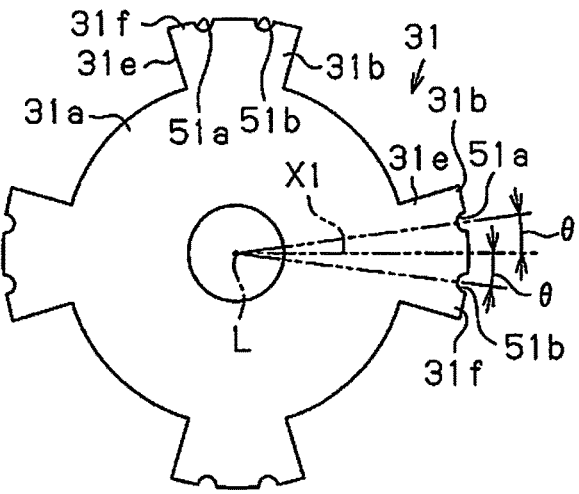
FIG. 35 is a plan view showing one of the rotor cores in a motor according to a seventh embodiment of the present invention.

As shown in FIG. 35, the first rotor core 31 includes two (even number) grooves 51*a* and 52*b* located in a surface of a first claw 31*f* of a first claw pole 31*b*. The grooves 51*a* and 52*b* are formed at positions deviated from a line X1, which connects a center (axis L) of the rotor 21 and a circumferential center of the first claw 31*f*, toward the two circumferential sides by an angle θ (=±7.5°).

Figure 36:
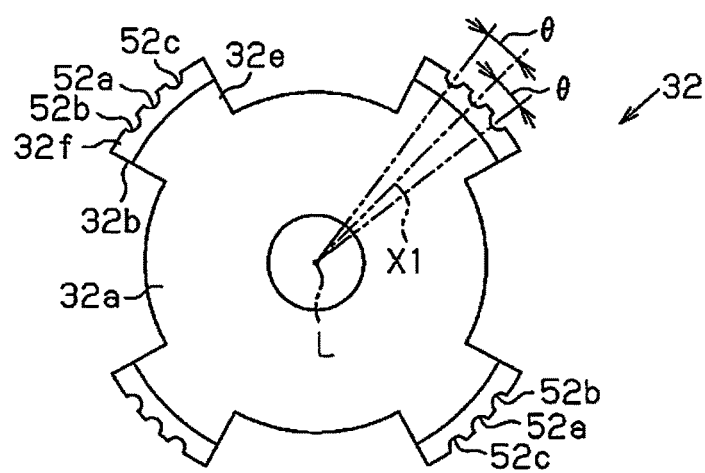
FIG. 36 is a plan view showing the other one of the rotor cores in the motor according to the seventh embodiment of the present invention.

As shown in FIG. 36, the second rotor core 32 includes three (odd number) grooves 52*a* to 52*c* located in a surface of a second claw 32*f* of a second claw pole 32*b*. The grooves 52*a* to 52*c* includes a central groove 52*a* formed on the line X1, which connects a center (axis L) of the rotor 21 and a circumferential center of the second claw 32*f*, and left and right grooves 52*b* and 52*c* formed at positions deviated from the line X1 toward the two circumferential sides by the angle θ (=±7.5°). All of the grooves 51*a*, 51*b*, 52*a*, 52*b* and 52*c* formed in the first and second claws 31*f* and 32*f* of the first and second rotor cores 31 and 32 have the same shapes.

The operation of the seventh embodiment will now be described.

In the seventh embodiment, the rotation of the rotor 21 also cyclically generates cogging torque. In the seventh embodiment, the grooves 51*a*, 51*b*, 52*a*, 52*b*, and 52*c* are formed in the radially outer surfaces of the first and second claws 31f and 32f of the first and second claw poles 31b and 32b. The grooves 51a, 51b, 52a, 52b, and 52c extend in the axial direction (axial direction L) and are recessed toward the inner side in the radial direction. Hence, the cogging torque generated when the grooves 51a, 51b, 52a, 52b and 52c exist differs from the cogging torque generated when the grooves do not exist.

Figure 41:
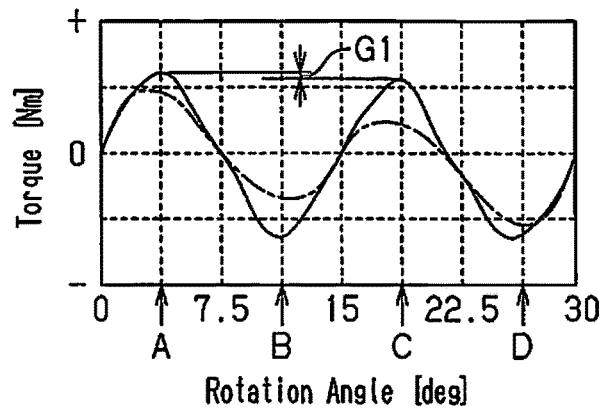
FIG. 41 is a graph illustrating the detent torque of a rotor shown in FIGS. 35 and 36.

In FIG. 41, the solid line shows changes in the cogging torque when the grooves 51a, 51b, 52a, 52b and 52c exist (example), and the single-dashed line shows changes in the cogging torque when there are no grooves (comparative example).

Figure 37:
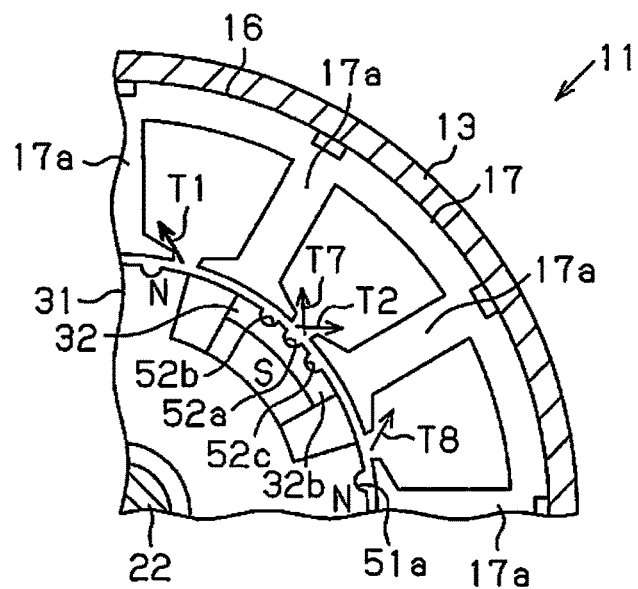
FIG. 37 is a partial plan showing the motor of the seventh embodiment.

For example, when the rotor 21 and the stator 16 are located at the relative positions shown in FIG. 37, cogging torque T1 acting in one circumferential direction is generated between the first rotor core 31 and the teeth 17a, which are located on the opposite side of the yoke housing 13 in the axial direction. At this position, the cogging torque T2 in the circumferential direction opposite from the cogging torque T1 is generated by the central groove 52a of the second rotor core 32, which is located close to the yoke housing 13. Further, the cogging torques T7 and T8 acting in one circumferential direction are generated by the left and right grooves 52b and 52c of the second rotor core 32 and the two grooves 51a and 51b of the first rotor core 31. As a result, as compared with when the grooves 51a, 51b, 52a, 52b and 52c do not exist, it is possible to increase cogging torque that is actually generated as shown by [A] in FIG. 41.

Figure 38:
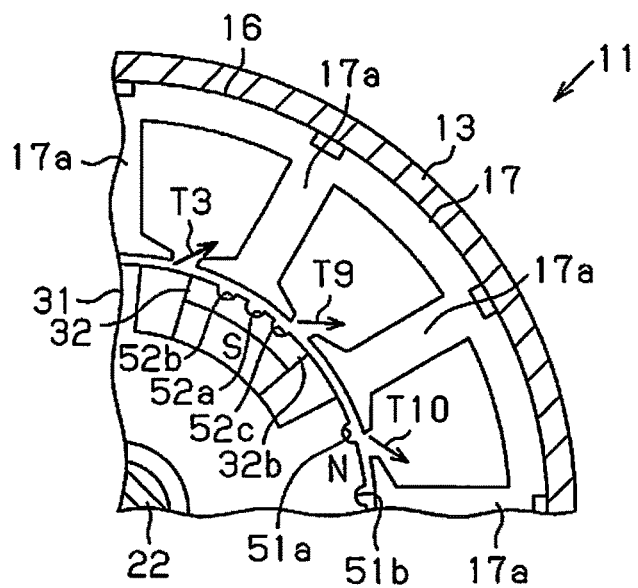
FIG. 38 is a partial plan showing the motor of the seventh embodiment.

Further, for example, when the rotor 21 and the stator 16 are located at the relative positions shown in FIG. 38, cogging torque T3 acting in the other circumferential direction is generated between the second rotor core 32 and the teeth 17a, which are located close to the yoke housing 13 in the axial direction. At this position, cogging torques T9 and T10 acting in the other circumferential direction are generated by the left and right grooves 52b and 52c of the second rotor core 32 and the two grooves 51a and 51b of the first rotor core 31. Hence, as compared with when the grooves 51a, 51b, 52a, 52b and 52c do not exist, cogging torque, which is actually generated as shown by [B] in FIG. 41, may be increased.

Figure 39:
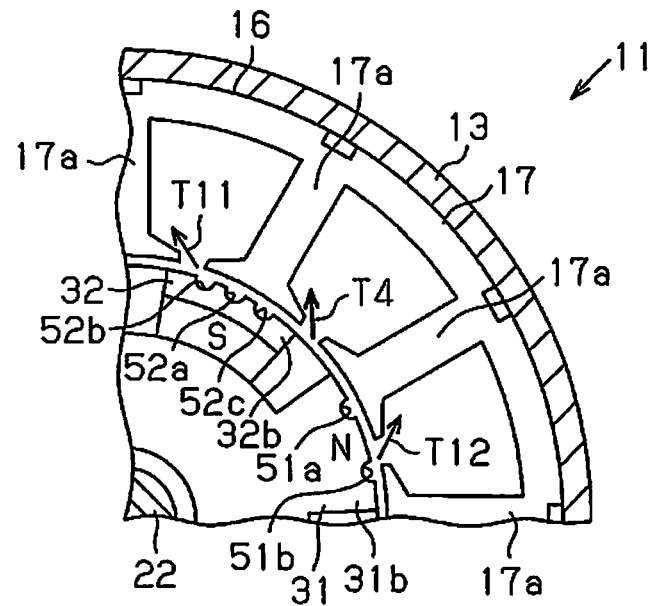
FIG. 39 is a partial plan showing the motor of the seventh embodiment.

When, for example, the rotor 21 and the stator 16 are located at the relative positions shown in FIG. 39, cogging torque T4 acting in one of the circumferential directions is generated between the second rotor core 32 and the teeth 17a located close to the yoke housing 13 in the axial direction. At this position, the cogging torques T11 and T12 acting in one of the circumferential directions are generated by the left and right grooves 52b and 52c of the second rotor core 32 and the two grooves 51a and 51b of the first rotor core 31. Hence, compared with when the grooves 51a, 51b, 52a, 52b and 52c do not exist, cogging torque, which is actually generated as shown by [C] in FIG. 41, may be increased.

Figure 40:
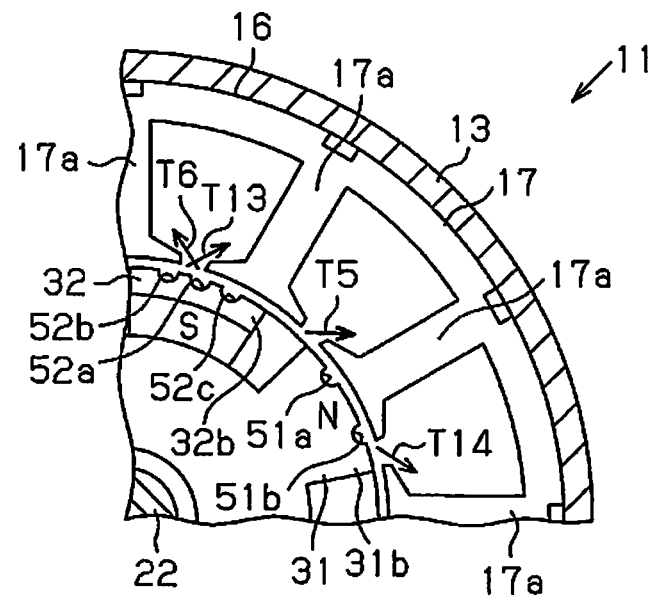
FIG. 40 is a partial plan showing the motor of the seventh embodiment.

Further, when, for example, the rotor 21 and the stator. 16 are located at the relative positions shown in FIG. 40, cogging torque T5 acting in the other circumferential direction is generated between the first rotor core 31 and the teeth 17a, which are located on the opposite side of the yoke housing 13 in the axial direction. At this position, cogging torque T6 acting in the circumferential direction opposite from the cogging torque T5 is generated by the groove 52a of the second rotor core 32 located close to the yoke housing 13. Further, cogging torques T13 and T14 acting in the other circumferential direction is generated by the left and right grooves 52b and 52c of the second rotor core 32 and the two grooves 51a and 51b of the first rotor core 31. As a result, as compared with when the grooves 51a, 51b, 52a, 52b and 52c do not exist, cogging torque, which is actually generated as shown by [D] in FIG. 41, may be increased.

The cogging torque, which is actually generated at [A] in FIG. 41, is increased by the cogging torques T2, T7, and T8, and a difference G1 between the cogging torque actually generated at [A] and the cogging torque generated at [C] in FIG. 41 becomes small. Further, the cogging torque, which is actually generated at [D] in FIG. 41, is increased by the cogging torques T6, T13 and T14, and the difference between the cogging torque actually generated at [D] and cogging torque generated at [B] in FIG. 41 becomes small.

The advantage of the seventh embodiment will now be described.

The motor of the seventh embodiment has the advantage described below in addition to advantage (12) of the sixth embodiment.

(14) The groove 52a formed in the central portion of the second claw pole 32b allows for the generation of cogging torque acting in a direction (opposite direction in circumferential direction of rotor 21) opposite from the large cogging torque generated between the teeth 17a and the first claw pole 31b of the first rotor core 31 located on the opposite side from the yoke housing 13. This allows for reduction in the cogging torque generated between the teeth 17a and the first claw pole 31b of the first rotor core 31. This balances the cyclically generated cogging torques in a satisfactory manner. Further, the grooves 51a, 51b, 52a, 52b and 52c are formed in the first claw pole 31b of the first rotor core 31 and the second claw pole 32b of the second rotor core 32. This allows for adjustment in the generating amount of the cogging torque.

An eighth embodiment of the motor will now be described.

In the eighth embodiment, the rotor 21 is shaped differently from the sixth embodiment, and the motor case 12 and the stator 16 have the same structure as the sixth embodiment. Hence, in the eighth embodiment, the description will focus on the differing points of the rotor 21. The same reference characters are used for the same components, and such components will not be described in detail.

The rotor 21 of the motor 11 of the eighth embodiment includes two first and second rotor cores 31 and 32. The eighth embodiment also arranges the second rotor core 32 (second core base 32a) close to the yoke housing 13 in the axial direction, and the first rotor core 31 (first core base 31a) is located on the opposite side of the yoke housing 13 in the axial direction.

Figure 42:
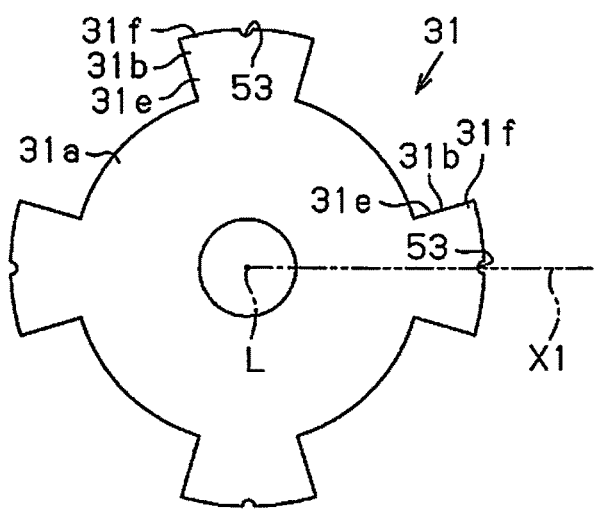
FIG. 42 is a plan view showing one of the rotor cores according to an eighth embodiment of the present invention.

As shown in FIG. 42, a first claw 31f of a first claw pole 31b includes a groove 53, which extends in the axial direction (axial direction L) and which is recessed toward the inner side in the radial direction. The groove 53 is located on a straight line X1, which connects a rotor center (axis L) and a substantially circumferential central portion of the first claw pole 31b.

Figure 43:
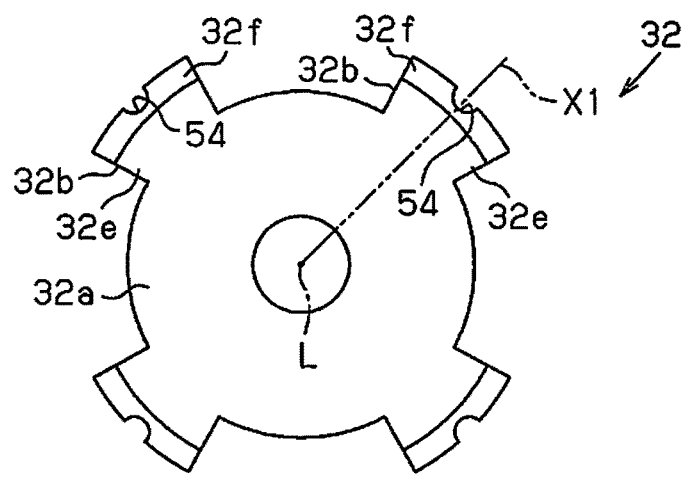
FIG. 43 is a plan view showing the other one of the rotor cores according to the eighth embodiment of the present invention.

As shown in FIG. 43, a second claw 32f of a second claw pole 32b includes a groove 54, which extends in the axial direction (axial direction L) and which is recessed toward the inner side in the radial direction. The groove 54 is located on a straight line X1, which connects a rotor center (axis L) and a substantially circumferential central portion of the second claw pole 32b.

The groove 54 formed in the second claw 32f is larger than the groove 53 formed in the first claw 31f.

The operation of the eighth embodiment will now be described.

In the eighth embodiment, the rotation of the rotor 21, cyclically generates cogging torque. In the eighth embodiment, grooves 53 and 54 are formed in substantially circumferential central portions of radially outer surfaces of the first and second claws 31*f* and 32*f* of the first and second claw poles 31*b* and 32*b*. The grooves 53 and 54 extend in the axial direction (axial direction L) and are recessed toward the inner side in the radial direction. Hence, the cogging torque generated when the grooves 53 and 54 exist differ from the cogging torque generated when the grooves do not exist.

Figure 48:
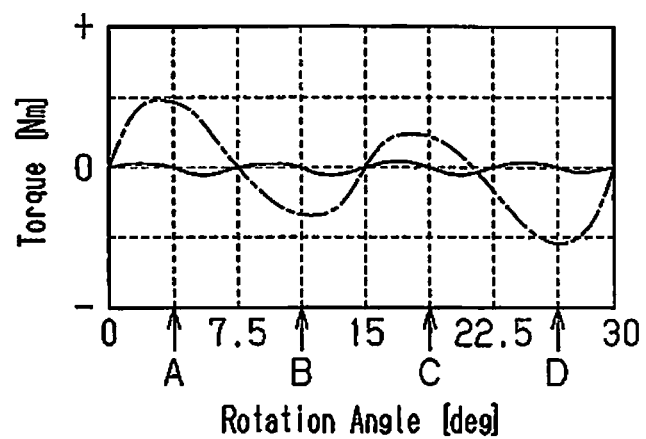
FIG. 48 is a graph illustrating the detent torque of a rotor shown in FIGS. 42 and 43.
Figure 49:
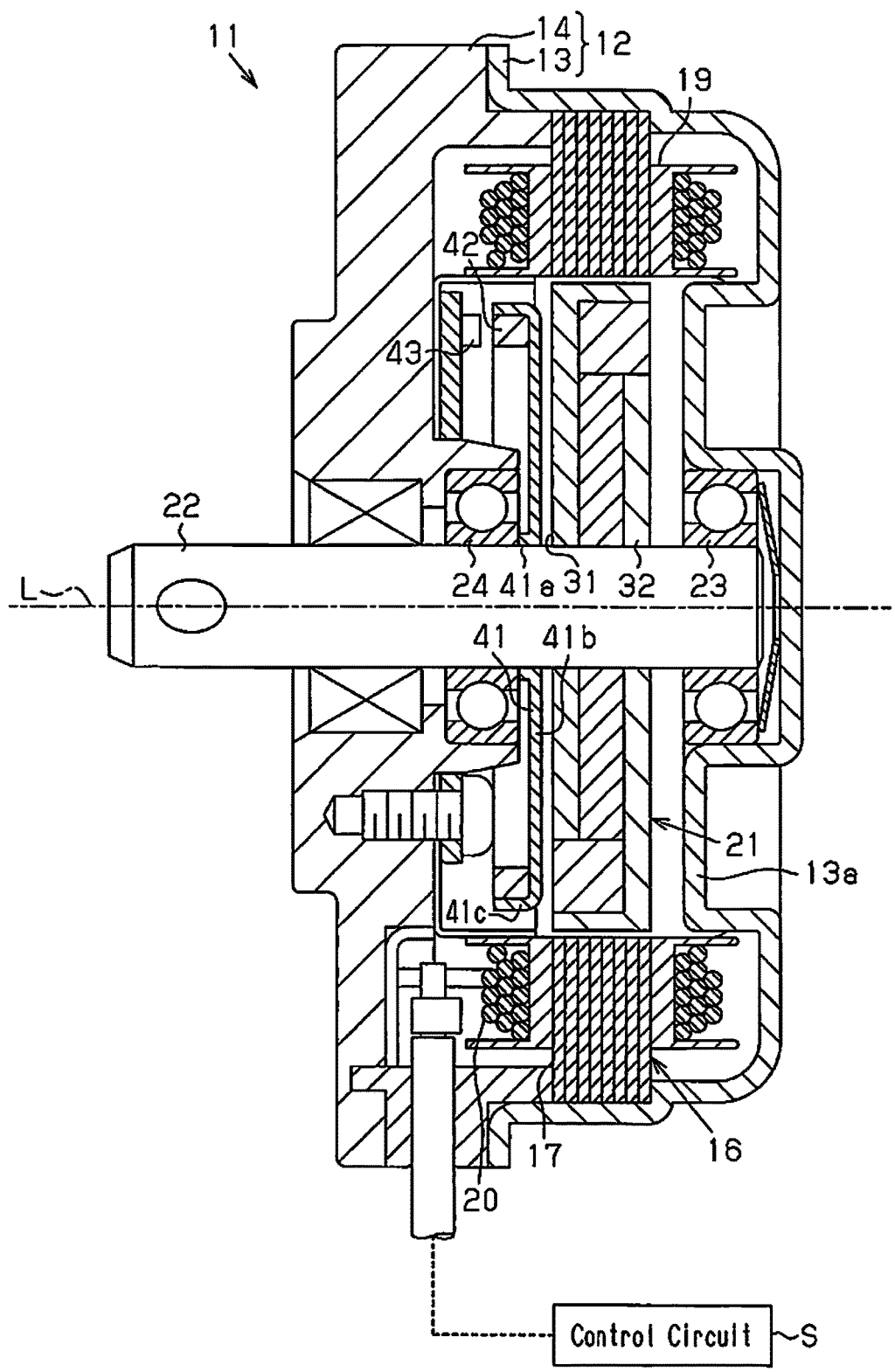
FIG. 49 is a cross-sectional view of a motor according to a ninth embodiment of the present invention.
Figure 50:
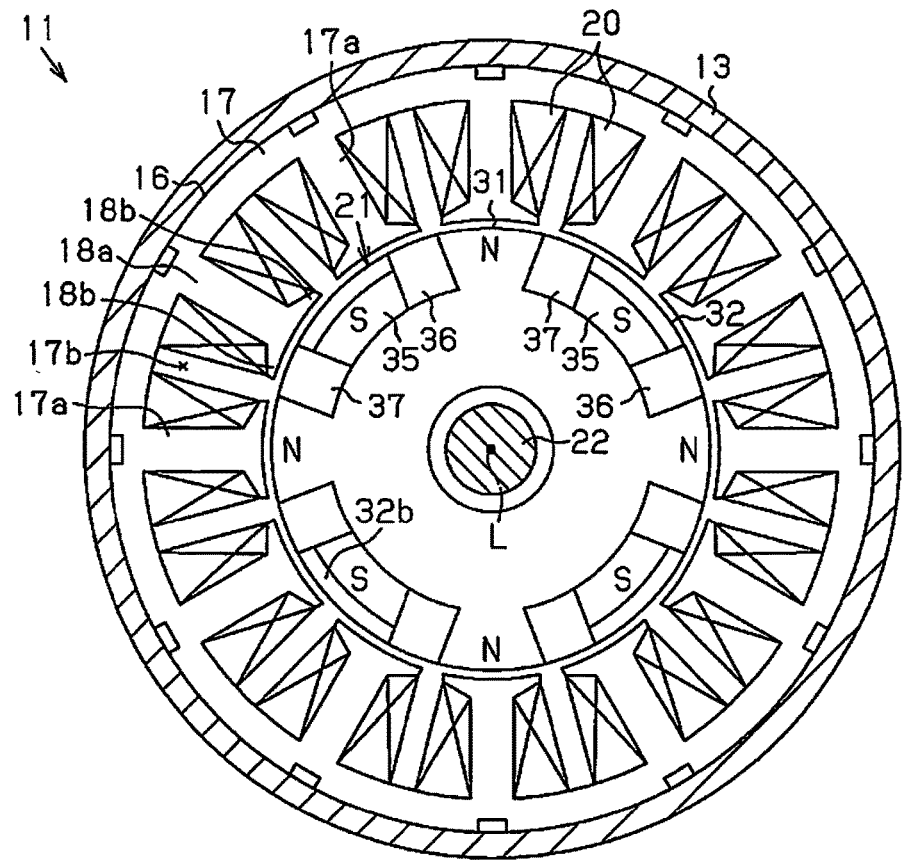
FIG. 50 is a plan view of the motor shown in FIG. 49.
Figure 51:
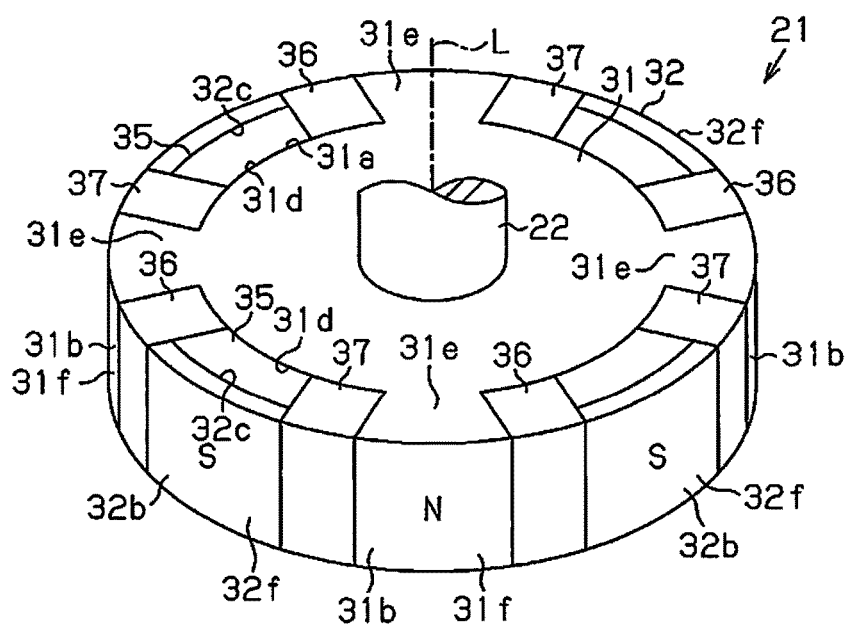
FIG. 51 is a perspective view of a rotor shown in FIG. 50.
Figure 52:
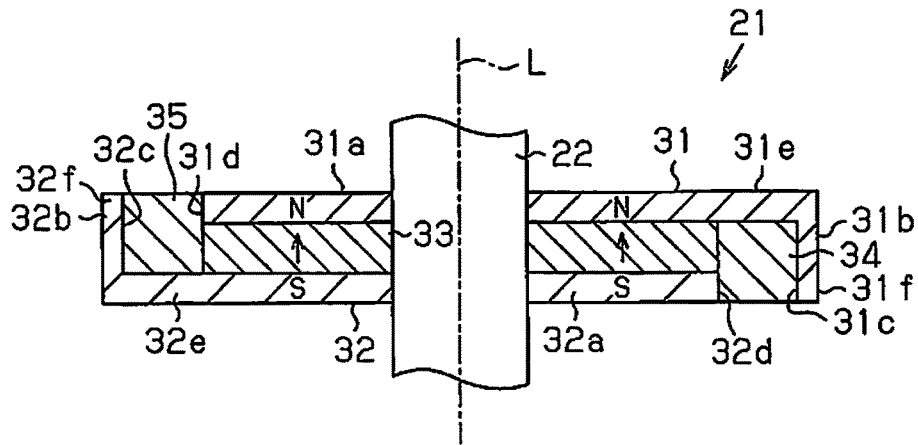
FIG. 52 is a cross-sectional view of the rotor shown in FIG. 51.

In FIG. 48, the solid line shows changes in the cogging torque when the grooves 53 and 54 exist (example), and the single-dashed line shows changes in the cogging torque when the grooves do not exist (comparative example).

Figure 44:
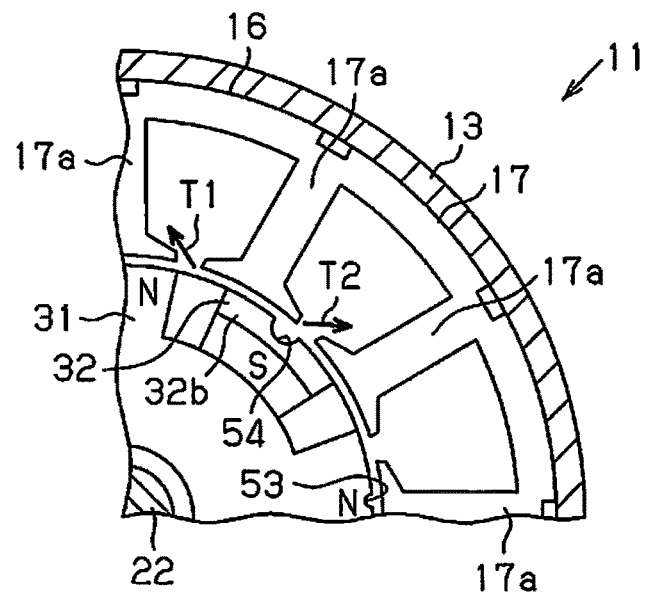
FIG. 44 is a partial plan showing the motor of the eighth embodiment.

For example, when the rotor 21 and the stator 16 are located at the relative positions shown in FIG. 44, cogging torque T1 acting in one circumferential direction is generated between the first rotor core 31 and the teeth 17*a*, which are located on an opposite side from the yoke housing 13 in the axial direction. At this position, the cogging torque T2 in the circumferential direction opposite from the cogging torque T1 is generated by the large groove 54 of the second rotor core 32, which is located close to the yoke housing 13. As a result, as compared with when the grooves 53 and 54 do not exist, it is possible to reduce cogging torque which is actually generated by the cogging torque T2 as shown by [A] in FIG. 48.

Figure 45:
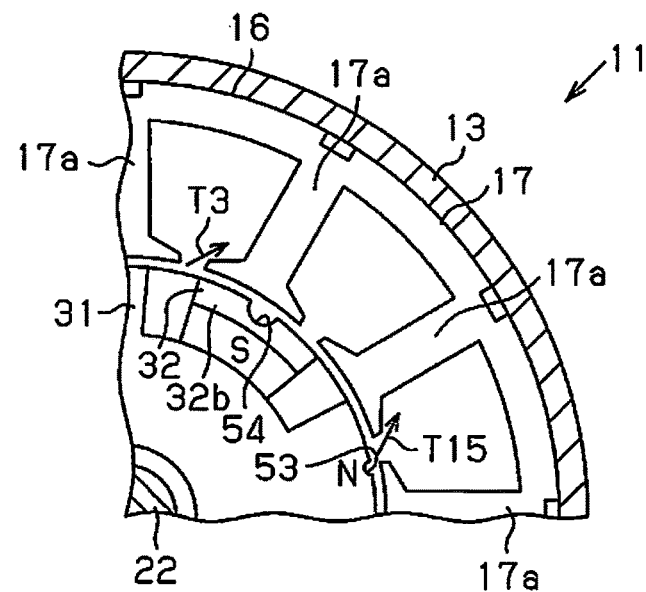
FIG. 45 is a partial plan showing the motor of the eighth embodiment.

Further, for example, when the rotor 21 and the stator 16 are located at the relative positions shown in FIG. 45, cogging torque T3 acting in the other circumferential direction is generated between the second rotor core 32 and the teeth 17*a*, which are located close to the yoke housing 13 in the axial direction. At this position, cogging torque T15 acting in the circumferential direction opposite from the cogging torque T3 is generated by the groove 53 of the first rotor core 31 located on the opposite side from the yoke housing 13. As a result, as compared with when the grooves 53 and 54 do not exist, cogging torque, which is actually generated by the cogging torque T15 as shown by [B] in FIG. 48, may be reduced.

Figure 46:
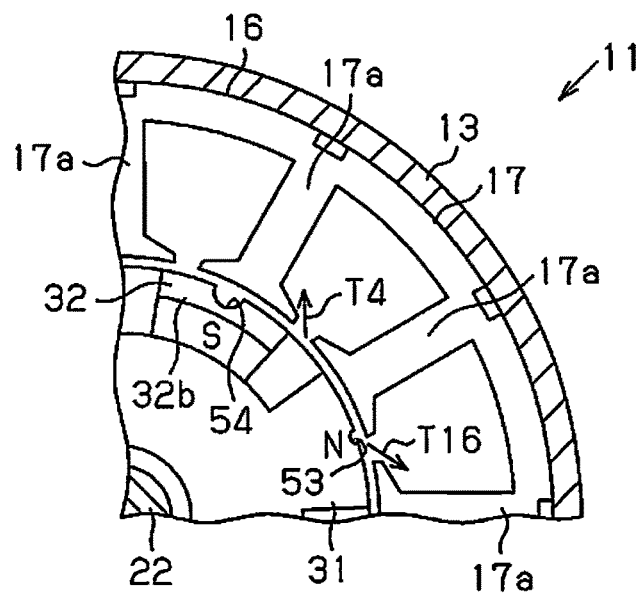
FIG. 46 is a partial plan showing the motor of the eighth embodiment.

Further, when, for example, the rotor 21 and the stator 16 are located at the relative positions shown in FIG. 46, cogging torque T4 acting in one of the circumferential directions is generated between the second rotor core 32 and the teeth 17*a* located close to the yoke housing 13 in the axial direction. At this position, cogging torque T16 acting in the circumferential direction opposite from the cogging torque T4 is generated by the groove 53 of the first rotor core 31 located on the opposite side from the yoke housing 13. As a result, as compared with when the grooves 53 and 54 do not exist, cogging torque, which is actually generated by the cogging torque T16 as shown by [C] in FIG. 48, may be reduced.

Figure 47:
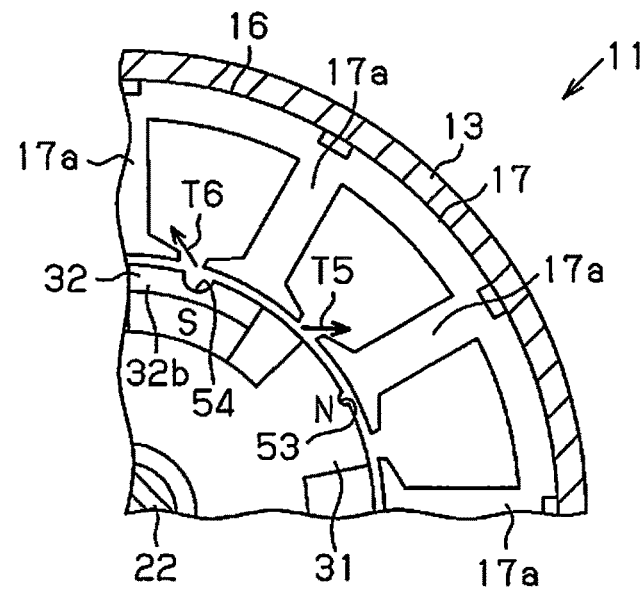
FIG. 47 is a partial plan showing the motor of the eighth embodiment.

Further, when, for example, the rotor 21 and the stator 16 are located at the relative positions shown in FIG. 47, cogging torque T5 acting in the other circumferential direction is generated between the first rotor core 31 and the teeth 17*a*, which are located on the opposite side from the yoke housing 13 in the axial direction. At this position, cogging torque T6 acting in the circumferential direction opposite from the cogging torque T5 is generated by the large groove 54 of the second rotor core 32 located close to the yoke housing 13. As a result, as compared with when the grooves 53 and 54 do not exist, cogging torque, which is actually generated by the cogging torque T2 as shown by [D] in FIG. 48, may be reduced.

The cogging torque, which is actually generated at [A] in FIG. 48 is reduced by the cogging torque T2, and the difference between the cogging torque actually generated at [A] and cogging torque generated at [C] in FIG. 48 becomes small. Further, the cogging torque, which is actually generated at [D] in FIG. 48, is reduced by the cogging torque T6, and the difference between the cogging torque actually generated at [D] and cogging torque generated at [B] in FIG. 48 becomes small.

The advantage of the eighth embodiment will now be described.

The motor of the eighth embodiment obtains the following advantage in addition to advantage (12) of the sixth embodiment.

(15) The grooves 53 and 54 are respectively formed in the first claw pole 31*b* and the second claw pole 32*b*, and the number of the groove 53 and the number of the groove 54 are the same. This allows for the cogging torques to be balanced by the size of the grooves 53 and 54.

A ninth embodiment of the motor will now be described. Same reference numerals are given to those components that are the same as the corresponding components of the first embodiment. Such components will not be described in detail.

Figure 53:
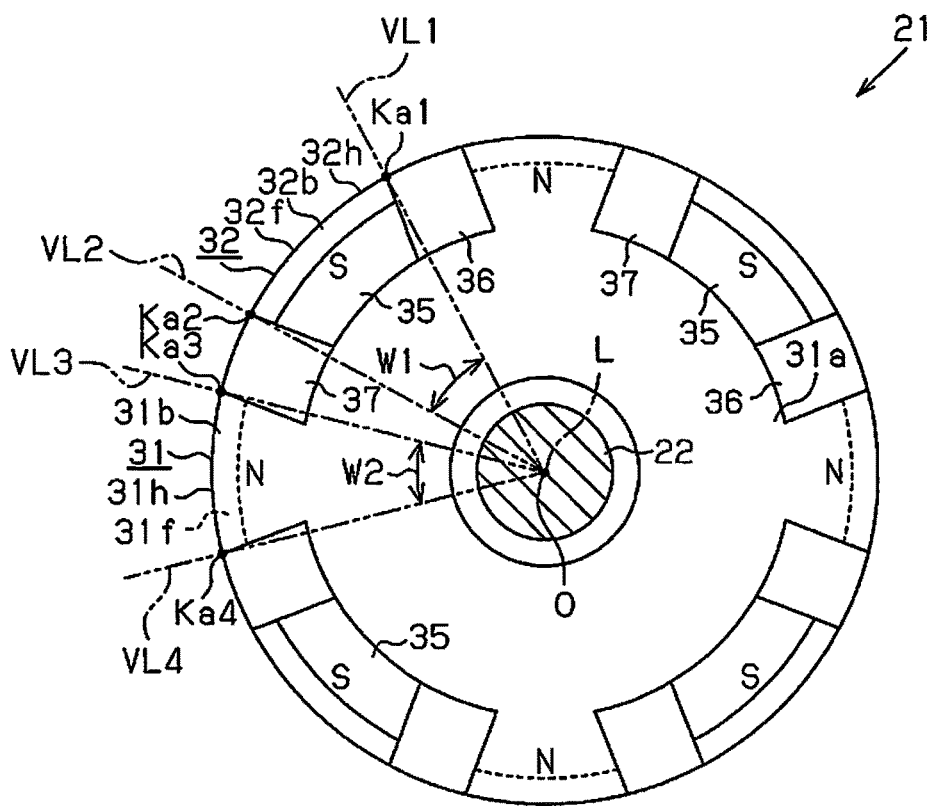
FIG. 53 is a plan view of the rotor shown in FIG. 51.

As shown in FIGS. 49 to 52, each of the claw poles (first claw poles) 31*b* of the rotor core (first rotor core) 31 includes a projection (first projection) 31*e* projecting toward the outer side in a radial direction from a circumferential portion of a core base (first core base) 31*a*, and a claw (first claw) 31*f* arranged on a distal end of the projection 31*e* and extended in an axial direction. The projection 31*e* is sectoral-shaped as viewed from the axial direction. A cross-section of the claw 31*f* in a direction perpendicular to the axis is sectoral-shaped. As shown in FIG. 53, a radially outer surface (outer circumferential surface) 31*h* of the claw pole 31*b* (claw 31*f*) is arcuate and extends along a circumference about a rotor center O as viewed from the axial direction.

As shown in FIGS. 49 to 52, each of claw poles (second claw poles) 32*b* of a rotor core (second rotor core) 32 includes a projection (second projection) 32*e*, which projects toward the outer side in the radial direction from a circumferential portion of a core base (second core base) 32*a*, and a claw (second claw) 32*f*, which is arranged on a distal end of the projection 32*e* and extended in the axial direction. The projection 32*e* is sectoral-shaped as viewed from the axial direction like the projection 31*e* of the rotor core 31. A cross-section of the claw 32*f* in a direction perpendicular to the axis is sectoral-shaped. As shown in FIG. 53, a radially outer surface 32*h* of the claw pole 32*b* (claw 32*f*) is arcuate and extends on a circumference about the rotor center O as viewed from the axial direction.

As shown in FIG. 53, a circumferential width W1 of a radial outer surface 32*h* of the claw pole 32*b* of the rotor core 32 is greater than a circumferential width W2 of a radial outer surface 31*h* of the claw pole 31*b* of the rotor core 31. The circumferential width W1 is the angular width between a virtual line VL1, which connects the rotor center O and one circumferential corner Ka1 of the radial outer surface 32*h* to each other, and a virtual line VL2, which connects the rotor center O and the other circumferential corner Ka2 of the radial outer surface 32*h* to each other. The circumferential width W2 is an angular width formed between a virtual line VL3, which connects the rotor center O and one circumferential corner Ka3 of the radial outer surface 31*h*, and a virtual line VL4, which connects the rotor center O and the other circumferential corner Ka4 of the radial outer surface 31*h*.

In the rotor 21 having the above-described structure, the core base 32a of the rotor core 32 is located at a position (position closer to closed end 13a) closer to the yoke housing 13 than the core base 31a in the axial direction.

The operation of the brushless motor 11 will now be described.

An example in which the circumferential widths of the radial outer surfaces 31h and 32h of the claw poles 31b and 32b of the rotor cores 31 and 32 are substantially equal to each other will be discussed. In this case, in the rotor core 31, which is far from the yoke housing 13 (closed end 13a) in the axial direction, there is almost no flux leakage between the yoke housing 13 and the rotor core 31. Thus, cogging torque tends to become high as shown by X1 in FIG. 54. In the rotor core 32, which is close to the yoke housing 13 (closed end 13a) in the axial direction, flux leaks between the yoke housing 13 and the rotor core 32. Thus, cogging torque tends to become low as shown by X2 in FIG. 54. This results in an imbalance in the cogging torques between the north pole and the south pole.

Figure 54:
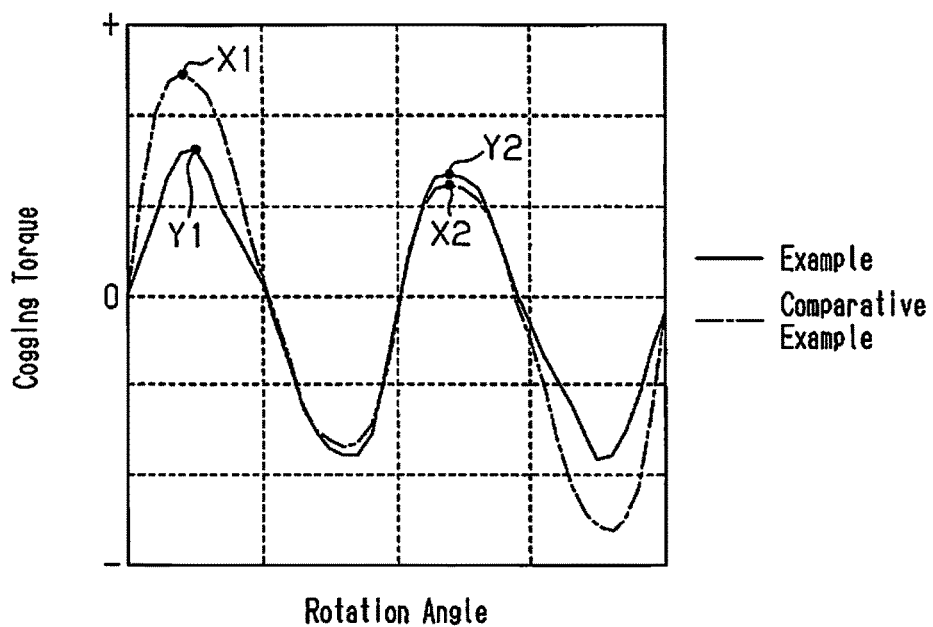
FIG. 54 is a graph illustrating the cogging torque of the rotor shown in FIG. 51.

As described above, the rotor core 32 located relatively close to the yoke housing 13 in the axial direction is formed so that the circumferential width W1 of the radial outer surface 32h of the claw pole 32b is greater than the circumferential width W2 of the radial outer surface 31h of the rotor core 31 (W1>W2). Thus, the circumferential width of the claw pole 31b of the rotor core 31, of which flux leakage is small, is less than the circumferential width of the claw pole 32b of the rotor core 32. This reduces the magnetic fluxes acting between the rotor core 31 and the stator 16. Hence, the cogging torque may be reduced as shown by Y1 in FIG. 54. As a result, the difference from the cogging torque of the other pole shown by Y2 in FIG. 54 is reduced. This balances the cogging torque.

The amount of flux leakage from the rotor core 31, which is relatively far from the yoke housing 13, toward the yoke housing 13 is small. Hence, the rotor core 31 obtains a sufficient amount of magnetic flux even when the circumferential width W2 of the radial outer surface 31h of the claw pole 31b is decreased.

The advantage of the ninth embodiment will now be described.

(16) The circumferential width W1 of the radial outer surface 32h, serving as the outermost portion of the claw pole 32b of the rotor core 32, is greater than the circumferential width W2 of the radial outer surface 31h, serving as the outermost portion of the claw pole 31b of the rotor core 31. This allows for reduction in the torque component (cogging torque) of the rotor core 31 located at a position that is far from the yoke housing 13 in the axial direction. Thus, even if flux leaks from the rotor core 32, located at the position close to the yoke housing 13 in the axial direction, toward the yoke housing 13, cogging torques are balanced in a satisfactory manner.

A tenth embodiment of the motor will now be described. Same reference numerals are given to those components that are the same as the corresponding components of the first embodiment. Such components will not be described in detail.

As shown in FIGS. 56 to 59, a claw pole 31b of a rotor core 31 includes a projection 31e, which projects toward the outer side in a radial direction from a circumferential portion of a core base 31a, and a claw 31f, which is arranged on a distal end of the projection 31e and is extended in an axial direction. The projection 31e is sectoral-shaped as viewed from the axial direction. A cross-section of the claw 31f in a direction perpendicular to the axis is sectoral-shaped.

Figure 56:
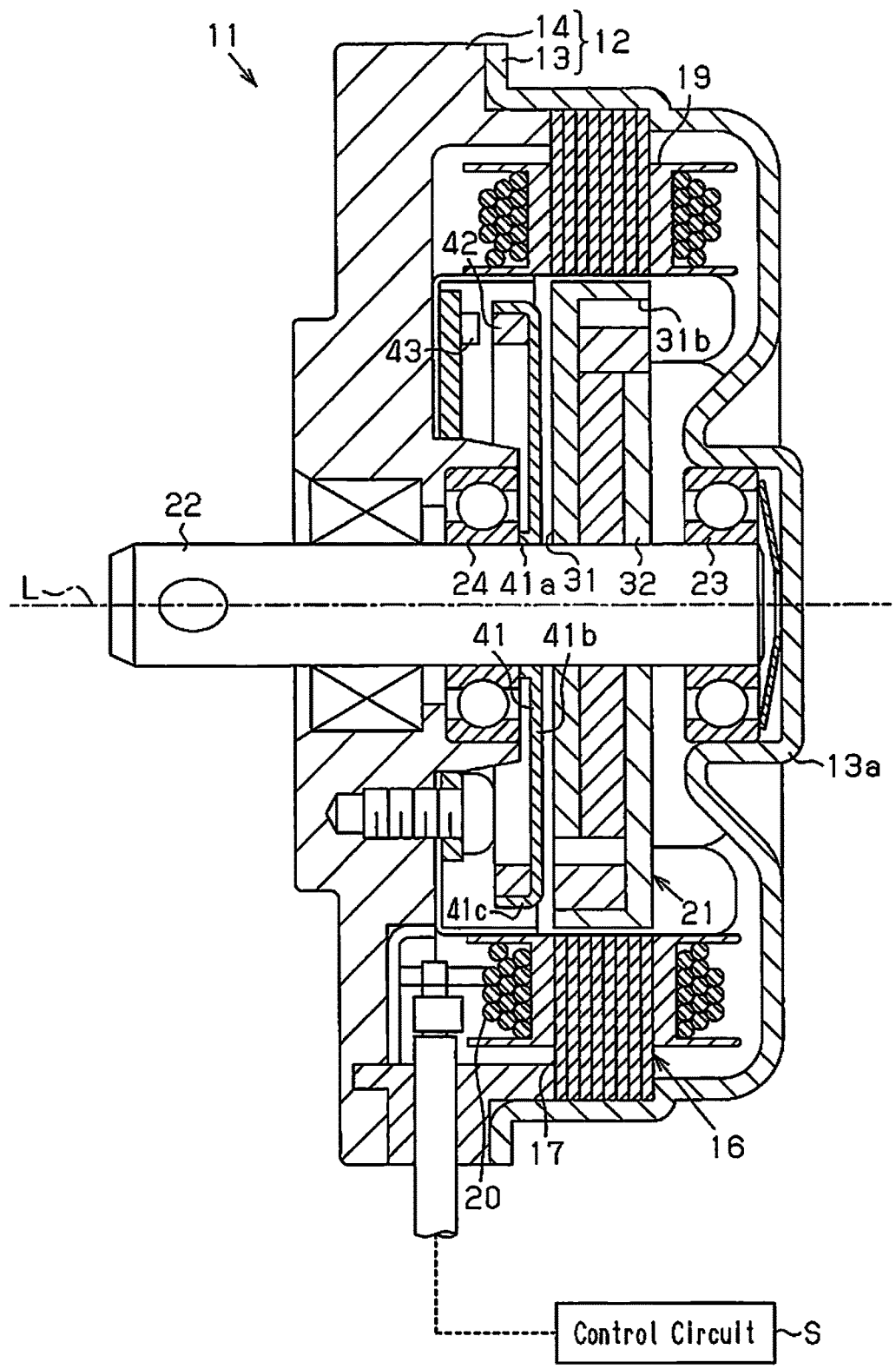
FIG. 56 is a cross-sectional view of a motor according to a tenth embodiment of the present invention.
Figure 59:
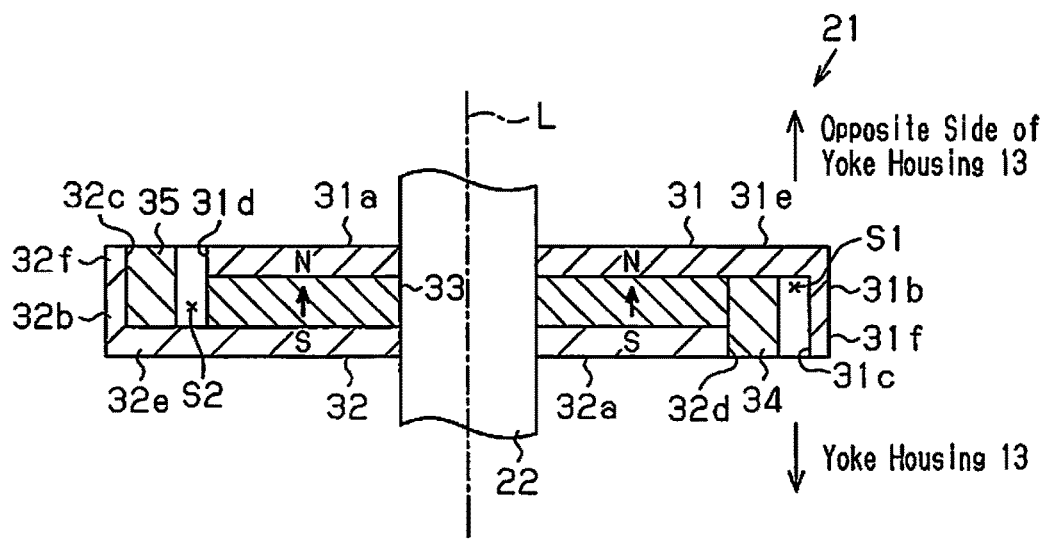
FIG. 59 is a cross-sectional view of the rotor shown in FIG. 58.

As shown in FIGS. 56 and 59, a claw pole 32b of a rotor core 32 includes a projection 32e, which projects toward the outer side in the radial direction from a circumferential portion of a core base 32a, and a claw 32f, which is arranged on a distal end of the projection 32e and is extended in the axial direction. The projection 32e is sectoral-shaped as viewed from the axial direction like the projection 31e of the rotor core 31. A cross-section of the claw 32f in a direction perpendicular to the axis is sectoral-shaped. The claw 32f of the rotor core 32 is longer in the axial direction than the claw 31f of the rotor core 31.

Figure 58:
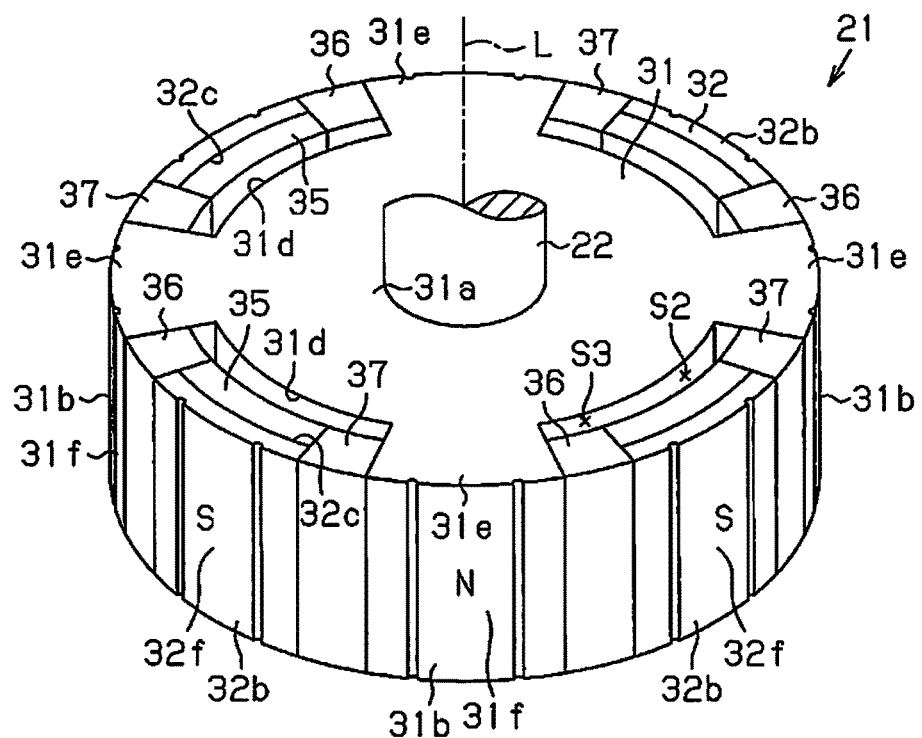
FIG. 58 is a perspective view of a rotor shown in FIG. 57.

As shown in FIGS. 58 and 59, a gap S1 is formed between a back surface 31c (radially inner surface) of each of the claw poles 31b of the rotor core 31 and an outer circumferential surface 32d of the core base 32a of the rotor core 32. A back surface auxiliary magnet 34 having a smaller radial length than the gap S1 is located in the gap S1. The back surface auxiliary magnet 34 abuts against the outer circumferential surface 32d of the rotor core 32 in the radial direction so that the back surface auxiliary magnet 34 is separated from the claw pole 31b. This separates the back surface auxiliary magnet 34 from the back surface 31c of the rotor core 31 in the radial direction. A cross-section of the back surface auxiliary magnet 34 in a direction perpendicular to the axis is substantially sectoral-shaped. The back surface auxiliary magnet 34 is magnetized so that a portion opposed to the back surface 31c of the claw pole 31b becomes the north pole, the polarity of which is the same as the claw pole 31b, and a portion of the back surface auxiliary magnet 34 that abuts against the outer circumferential surface 32d of the core base 32a of the rotor core 32 becomes the south pole, the polarity of which is the same as the core base 32a.

As shown in FIGS. 58 and 59, a gap S2 is formed between a back surface 32c of each of the claw poles 32b of the rotor core 32 and an outer circumferential surface 31d of the core base 31a of the rotor core 31. A back surface auxiliary magnet 35 having a smaller radial length than the gap S2 is located in the gap S2. The back surface auxiliary magnet 35 abuts against the back surface 32c in the radial direction so that the back surface auxiliary magnet 35 is adjacent to the claw pole 32b, and the back surface auxiliary magnet 35 is separated from the outer circumferential surface 31d of the rotor core 31 in the radial direction. A cross-section of the back surface auxiliary magnet 35 in a direction perpendicular to the axis is substantially sectoral-shaped. The back surface auxiliary magnet 35 is magnetized so that a portion abut against the back surface 32c of the claw pole 32b becomes the south pole, and a portion of the back surface auxiliary magnet 35 opposed to the outer circumferential surface 31d of the core base 31a of the rotor core 31 becomes the north pole. Ferrite magnets, for example, may be used as the back surface auxiliary magnets 34 and 35.

Figure 57:
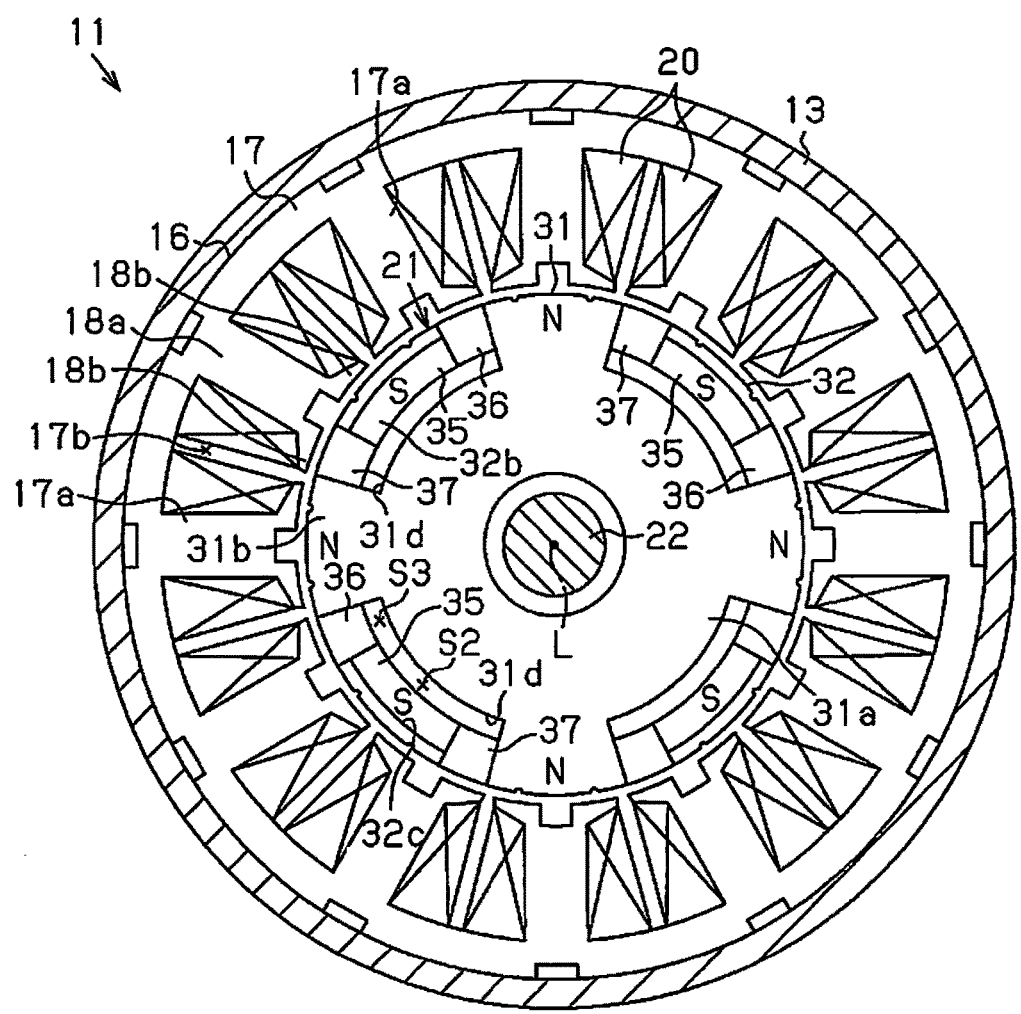
FIG. 57 is a plan view of the motor shown in FIG. 56.

As shown in FIGS. 57 and 58, interpole magnets 36 and 37 are located between the claw pole 31b and the claw pole 32b in the circumferential direction. The interpole magnets 36 and 37 are located at an outer side in the radial direction to be separated from the outer circumferential surfaces 31d and 32d of the rotor cores 31 and 32 in the radial direction. The interpole magnets 36 and 37 have smaller radial lengths than a gap S3 (which is substantially equal to length from outer circumferential surfaces 31d and 32d of rotor core 31 to distal ends of claw poles 31b and 32b) between the claw pole 31b and the claw pole 32b.

In the rotor 21 having the above-described structure, the core base 32a of the second rotor core 32 is located at a position (position close to closed end 13a) closer to the yoke housing 13 than the core base 31a of the first rotor core 31 in the axial direction.

The operation of the brushless motor 11 of the tenth embodiment having the above-described structure will be described.

According to the rotor 21 of the tenth embodiment, the back surface auxiliary magnet 35 is located in the gap S2 so that the back surface auxiliary magnet 35 is adjacent to the claw pole 32b of the rotor core 32 located close to the yoke housing 13 in the axial direction. The back surface auxiliary magnet 34 is located in the gap S1 so that the back surface auxiliary magnet 34 is separated from the claw pole 31b of the rotor core 31 located on the opposite side from the yoke housing 13 in the axial direction.

The difference in detent torques resulting from changes in the layout of the back surface auxiliary magnets 34 and 35 will be described using FIG. 60.

Figure 60:
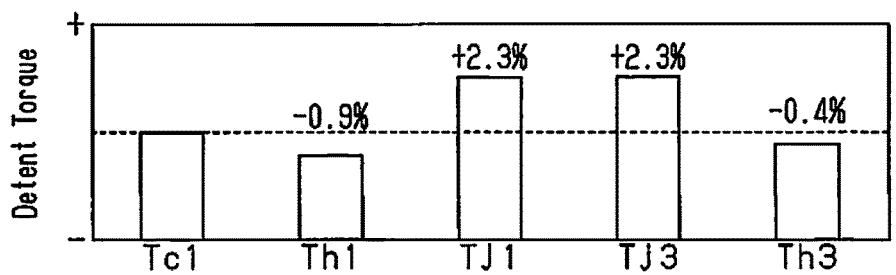
FIG. 60 is a graph illustrating differences in the detent torque caused by changes in the layout of back surface auxiliary magnets.

FIG. 60 shows changes in the detent torque. In FIG. 60, a value of detent torque when the back surface auxiliary magnets 34 and 35 fill the gaps S1 and S2 between the back surfaces 31c and 32c of the claw poles 31b and 32b and the outer circumferential surfaces 32d and 31d of the second and first core bases 32a and 31a is shown as a reference Tc1.

For example, in FIG. 60, in an example shown as "Th1", the back surface auxiliary magnet 34 is located in the gap S1 so that the back surface auxiliary magnet 34 is adjacent to the claw pole 31b of the rotor core 31, and the back surface auxiliary magnet 35 is located in the gap S2 so that the back surface auxiliary magnet 35 is separated from the claw pole 32b of the rotor core 32. In this structure, detent torque is reduced by about 0.9% as compared with the detent torque of reference Tc1.

In FIG. 60, in an example shown as "Tj1", the back surface auxiliary magnet 35 is located in the gap S2 so that the back surface auxiliary magnet 35 is adjacent to the claw pole 32b of the rotor core 32, and the back surface auxiliary magnet 34 is located in the gap S1 so that the back surface auxiliary magnet 34 is separated from the claw pole 31b of the rotor core 31. That is, the example shown as "Tj1" is the structure of the tenth embodiment. According to this structure, the detent torque is increased by about 2.3% as compared with the detent torque of reference Tc1.

That is, when the back surface auxiliary magnet 35 is located so that it is adjacent to the claw pole 32b of the rotor core 32 and the back surface auxiliary magnet 34 is located so that it is separated from the claw pole 31b of the rotor core 31 like in the tenth embodiment, the detent torque is increased.

In the rotor 21 of the tenth embodiment, the interpole magnets 36 and 37 are located on the radially outer side to be separated from the outer circumferential surfaces 31d and 32d of the rotor cores 31 and 32 in the radial direction.

The difference in detent torques caused by a change in the layout of the interpole magnets 36 and 37 will be described with reference to FIG. 61.

Figure 61:
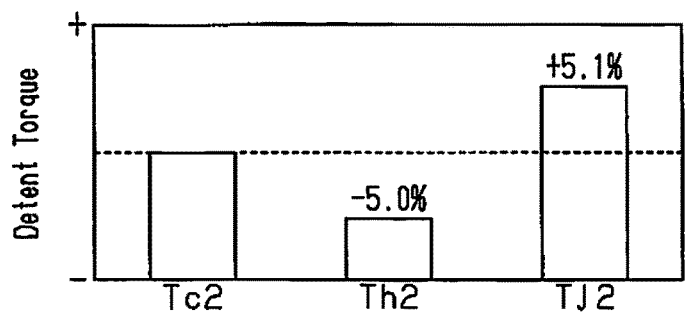
FIG. 61 is a schematic diagram illustrating differences in the detent torque caused by changes in the arrangement of an interpole magnet.

FIG. 61 shows changes in the detent torque using the value of the detent torque when the interpole magnets 36 and 37 fill the circumferential gap S3 between the claw poles 31b and 32b in the circumferential direction is shown as reference Tc2. That is, reference Tc2 is a situation in which the radial lengths of the interpole magnets 36 and 37 are substantially equal to a radial length of the circumferential gap S3 and the outer circumferential surfaces 31d and 32d of the rotor cores 31 and 32 and the interpole magnets 36 and 37 abut against each other in the radial direction.

In the example shown as "Th2" in FIG. 61, the interpole magnets 36 and 37 have smaller radial lengths than the circumferential gap S3. The interpole magnets 36 and 37 are located on a radially inner side so that the outer circumferential surfaces 31d and 32d of the rotor cores 31 and 32 and the interpole magnets 36 and 37 abut against each other in the radial direction. In this case, gaps are formed between radially outer sides of the interpole magnets 36 and 37 and the claw poles 31b and 32b. In this structure, the detent torque is reduced by about 5.0% as compared with the detent torque of reference Tc2.

In the example shown as "Tj2" in FIG. 61, the interpole magnets 36 and 37 have smaller radial lengths than the radial length of the circumferential gap S3. The interpole magnets 36 and 37 are located on the radially outer side to be separated from the outer circumferential surfaces 31d and 32d of the rotor cores 31 and 32 in the radial direction. The example shown as "Tj2" is the structure of the tenth embodiment. In this structure, detent torque is increased by about 5.1% as compared with the detent torque of reference Tc2.

In this manner, in the tenth embodiment, the interpole magnets 36 and 37 are located at the radially outer side so that they are separated from the outer circumferential surfaces 31d and 32d of the rotor cores 31 and 32 in the radial direction. This reduces the flux leakage at the radially inner side between the claw poles which adversely affect detent torque and increases the magnetic flux that raises the torque. Thus, detent torque is improved.

The advantages of the tenth embodiment will now be described.

(17) The motor 11 further includes the back surface auxiliary magnets 34 and 35 located at the predetermined positions to balance the magnetic flux from the first rotor core 31 and the magnetic flux from the second rotor core 32. More specifically, the back surface auxiliary magnet 35 is arranged to be adjacent to the claw pole 32b of the rotor core 32, and the back surface auxiliary magnet 34 is arranged to be separated from the claw pole 31b of the rotor core 31. In this structure, magnetic resistance in the rotor core 32 (core base 32a), which is located close to the yoke housing 13 in the axial direction, is reduced. As a result, detent torque may be improved as shown in FIG. 60.

(18) Flux leakage is reduced at the radially inner side between the claw poles that adversely affect the detent torque. Hence, detent torque is increased as shown in FIG. 61.

Next, an eleventh embodiment of the motor will be described.

In the eleventh embodiment, a rotor 21 has a structure that differs from the tenth embodiment, and a motor case 12 and a stator 16 have the same structures as the tenth embodiment. Hence, in the tenth embodiment, the description will focus on the differing points of the rotor 21. The same reference characters are used for the same components, and such components will not be described in detail.

The rotor 21 of the motor 11 of the eleventh embodiment includes two rotor cores 31 and 32. The eleventh embodiment also arranges a rotor core 32 (core base 32a) close to a yoke housing 13 in an axial direction of the motor 11, and a rotor core 31 (core base 31a) at the opposite side of the yoke housing 13 in the axial direction.

Figure 62:
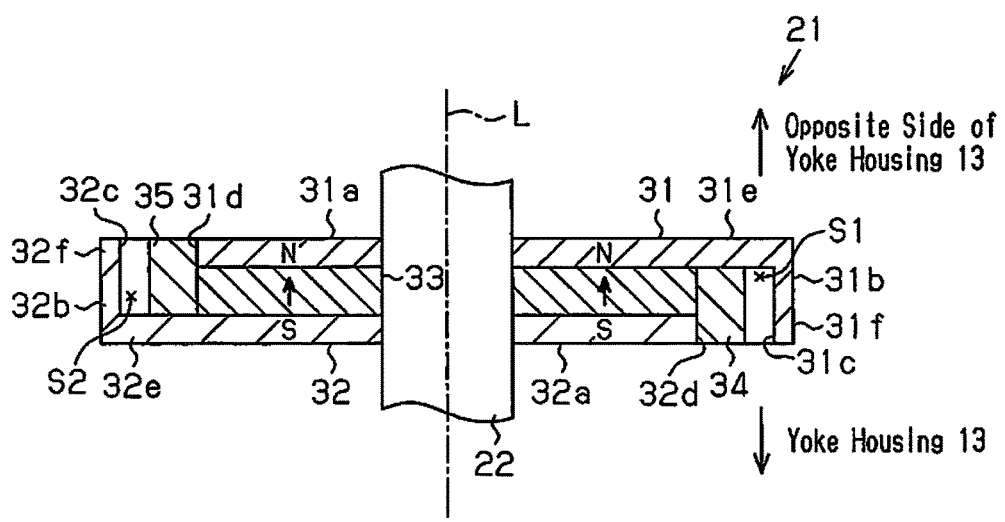
FIG. 62 is a cross-sectional view of a rotor according to an eleventh embodiment of the present invention.
Figure 63:
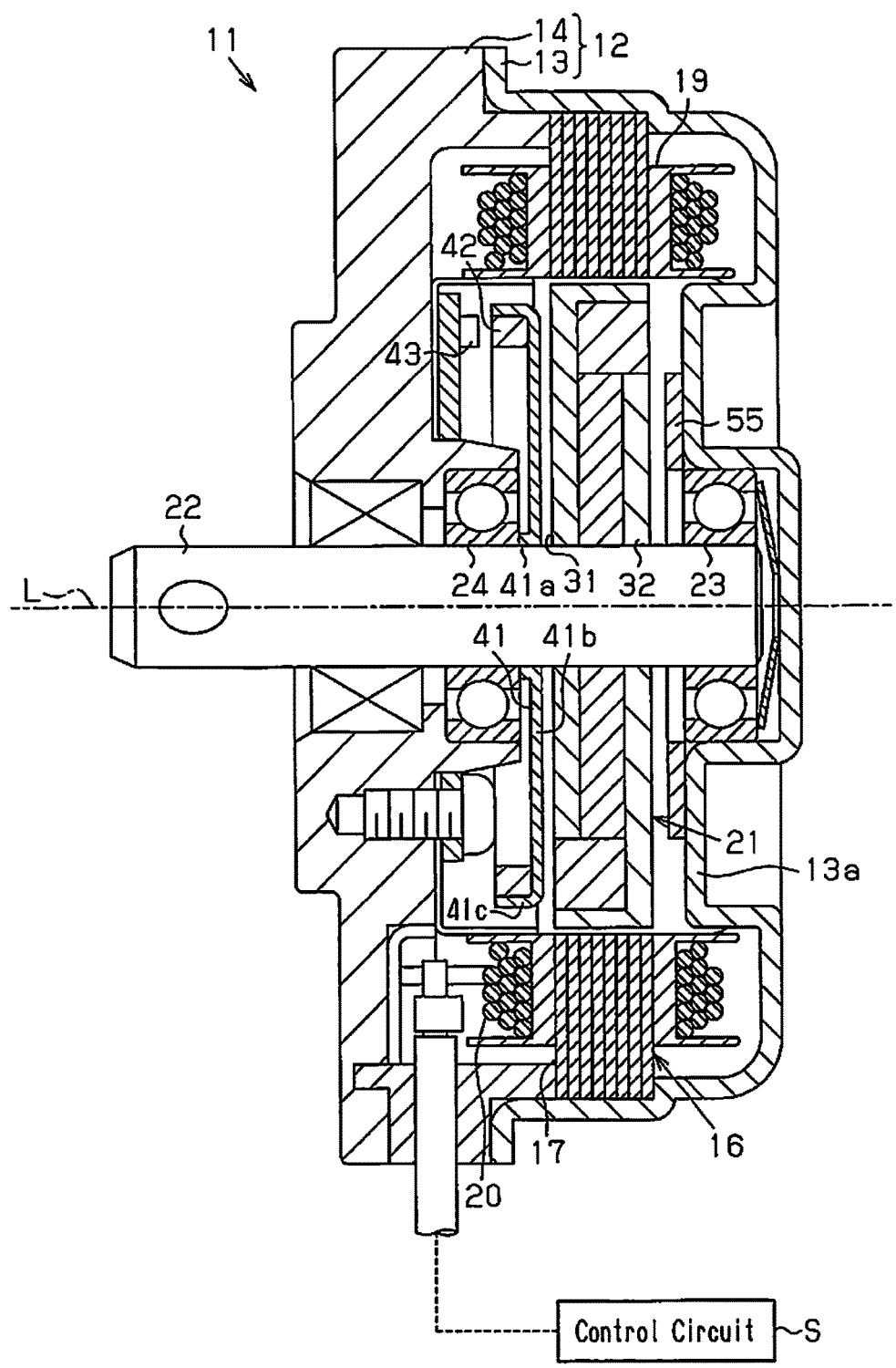
FIG. 63 is a cross-sectional view of a motor according to a twelfth embodiment of the present invention.

As show in FIG. 62, a gap S1 is formed between a back surface 31c (radially inner surface) of each of the claw poles 31b and an outer circumferential surface 32d of a core base 32a of the rotor core 32. A back surface auxiliary magnet 34 having a smaller radial length than the gap S1 is arranged in the gap S1. The back surface auxiliary magnet 34 is separated from a back surface 31c of the claw pole 31b in a radial direction of the motor 11 so that the back surface auxiliary magnet 34 is separated from the claw pole 31b, and the back surface auxiliary magnet 34 abuts against the outer circumferential surface 32d of the rotor core 32. A cross-section of the back surface auxiliary magnet 34 in a direction perpendicular to the axis is sectoral-shaped. The back surface auxiliary magnet 34 is magnetized so that a portion opposed to the back surface 31c of the claw pole 31b becomes the north pole and a portion of the back surface auxiliary magnet 34 abutting against the outer circumferential surface 31d of the core base 31a of the rotor core 31 becomes the south pole.

A gap S2 is formed between the back surface 32c of each of the claw poles 32b of the rotor core 32 and the outer circumferential surface 31d of the core base 31a of the rotor core 31. A back surface auxiliary magnet 35 having a smaller radial length than the gap S2 is located in the gap S2. The back surface auxiliary magnet 35 abuts against the outer circumferential surface 31d of the rotor core 31 in the radial direction so that the back surface auxiliary magnet 35 is separated from the claw pole 32b, and the back surface auxiliary magnet 35 is separated from the back surface 32c of the rotor core 32 in the radial direction. A cross-section of the back surface auxiliary magnet 35 in a direction perpendicular to the axis is sectoral-shaped. The back surface auxiliary magnet 35 is magnetized so that a portion opposed to the back surface 32c of the claw pole 32b becomes the south pole and a portion of the back surface auxiliary magnet 35 abutting against the outer circumferential surface 31d of the core base 31a of the rotor core 31 becomes the north pole.

The operation of the eleventh embodiment will now be described.

In the rotor 21 of the eleventh embodiment, the back surface auxiliary magnet 35 is located in the gap S2 so that the back surface auxiliary magnet 35 is separated from the claw pole 32b of the rotor core 32, which is located close to the yoke housing 13 in the axial direction. The back surface auxiliary magnet 34 is located in the gap S1 so that the back surface auxiliary magnet 34 is separated from the claw pole 31b of the rotor core 31, which is located at the opposite side from the yoke housing 13 in the axial direction.

The difference in detent torques resulting from changes in the layout of the back surface auxiliary magnets 34 and 35 will now be described with reference to FIG. 60.

FIG. 60 shows changes in the detent torque. In FIG. 60, a value of the detent torque when the back surface auxiliary magnets 34 and 35 fill the gaps S1 and S2 between the back surfaces 31c and 32c of the claw poles 31b and 32b and the outer circumferential surfaces 32d and 31d is shown as a reference Tc1.

In the example shown as "Th3" in FIG. 60, the back surface auxiliary magnet 34 is located in the gap S1 so that the back surface auxiliary magnet 34 is adjacent to the claw pole 31b of the rotor core 31, and the back surface auxiliary magnet 35 is located in the gap S2 so that the back surface auxiliary magnet 35 is adjacent to the claw pole 32b of the rotor core 32. In this structure, the detent torque is reduced by about 0.4% as compared with the detent torque of reference Tc1.

In the example shown as "Tj3" in FIG. 60, the back surface auxiliary magnet 34 is located in the gap S1 so that the back surface auxiliary magnet 34 is separated from the claw pole 31b of the rotor core 31, and the back surface auxiliary magnet 35 is located in the gap S2 so that the back surface auxiliary magnet 35 is separated from the claw pole 32b of the rotor core 32. The example shown as "Tj3" is the structure of the eleventh embodiment. In this structure, the detent torque is increased by about 2.3% as compared with the detent torque of reference Tc1.

That is, when the back surface auxiliary magnet 34 is arranged to be separated from the claw pole 31b of the rotor core 31 and the back surface auxiliary magnet 35 is arranged to be separated from the claw pole 32b of the rotor core 32 as in the eleventh embodiment, detent torque is increased.

The advantage of the eleventh embodiment will now be described.

(19) The back surface auxiliary magnet 35 is arranged to be separated from the claw pole 32b of the rotor core 32, and the back surface auxiliary magnet 34 is arranged to be separated from the claw pole 31b of the rotor core 31. This reduces the magnetic resistance in the rotor core 32 (core base 32a) located close to the yoke housing 13 in the axial direction. As a result, the detent torque may be increased as shown in FIG. 60.

A twelfth embodiment of the motor will now be described. Same reference numerals are given to those components that are the same as the corresponding components of the first embodiment. Such components will not be described in detail.

As shown in FIGS. 63 to 66, each of claw poles 31b of a rotor core 31 includes a projection 31e, which projects toward the outer side in a radial direction from a circumferential portion of a core base 31a, and a claw 31f, which is arranged on a distal end of the projection 31e and extended in the axial direction L. The projection 31e is sectoral-shaped as viewed from the axial direction L. A cross-section of the claw 31f in a direction perpendicular to the axis is sectoral-shaped.

As shown in FIGS. 63 to 66, each of claw poles 32b of a rotor core 32 includes a projection 32e, which projects toward the outer side in the radial direction from a circumferential portion of a core base 32a, and a claw 32f, which is arranged on a distal end of the projection 32e and extends in the axial direction L. The projection 32e is sectoral-shaped as viewed from the axial direction L like the projection 31e of the rotor core 31. A cross-section of the claw 32f in a direction perpendicular to the axis is sectoral-shaped.

A back surface auxiliary magnet 34 is located between a back surface 31c (radially inner surface) of each of the claw poles 31b of the rotor core 31 and an outer circumferential surface 32d of the core base 32a of the rotor core 32. A cross-section of the back surface auxiliary magnet 34 in a direction perpendicular to the axis is substantially sectoral-shaped. The back surface auxiliary magnet 34 is magnetized so that a portion abutting against the back surface 31c of the claw pole 31b becomes the north pole, which is the same polarity as the claw pole 31b, and a portion of the back surface auxiliary magnet 34 abutting against the outer circumferential surface 32d of the core base 32a of the rotor core 32 becomes the south pole, which has the same polarity as the core base 32a.

A back surface auxiliary magnet 35 is located between a back surface 32c of each of the claw poles 32b of the rotor core 32 and an outer circumferential surface 31d of the core base 31a of the rotor core 31. A cross-section of the back surface auxiliary magnet 35 in a direction perpendicular to the axis is sectoral-shaped. The back surface auxiliary magnet 35 is magnetized so that a portion abutting against the back surface 32c of the claw pole 32b becomes the south pole and a portion of the back surface auxiliary magnet 35 abutting against the outer circumferential surface 31d of the core base 31*a* of the rotor core 31 becomes the north pole. Ferrite magnets may be used as the back surface auxiliary magnets 34 and 35, for example.

Figure 64:
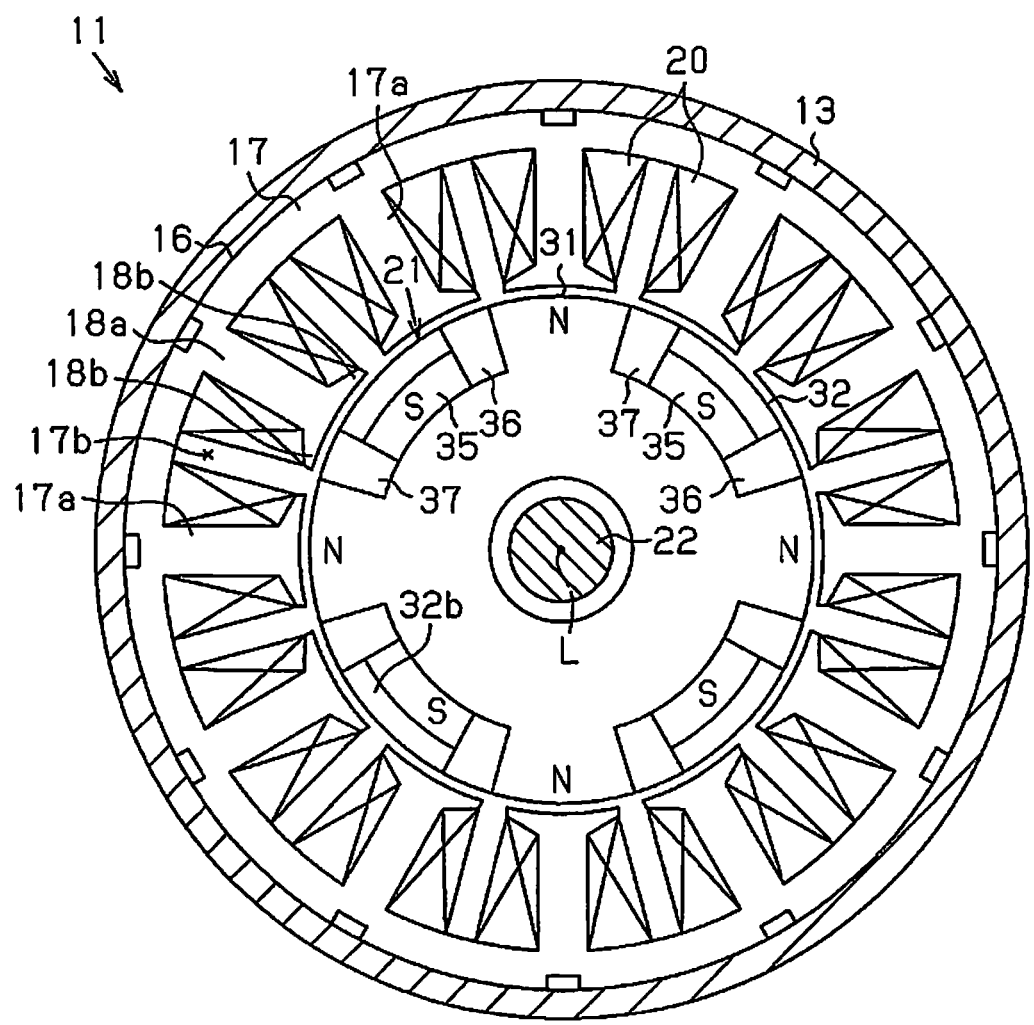
FIG. 64 is a plan view of the motor shown in FIG. 63.
Figure 65:
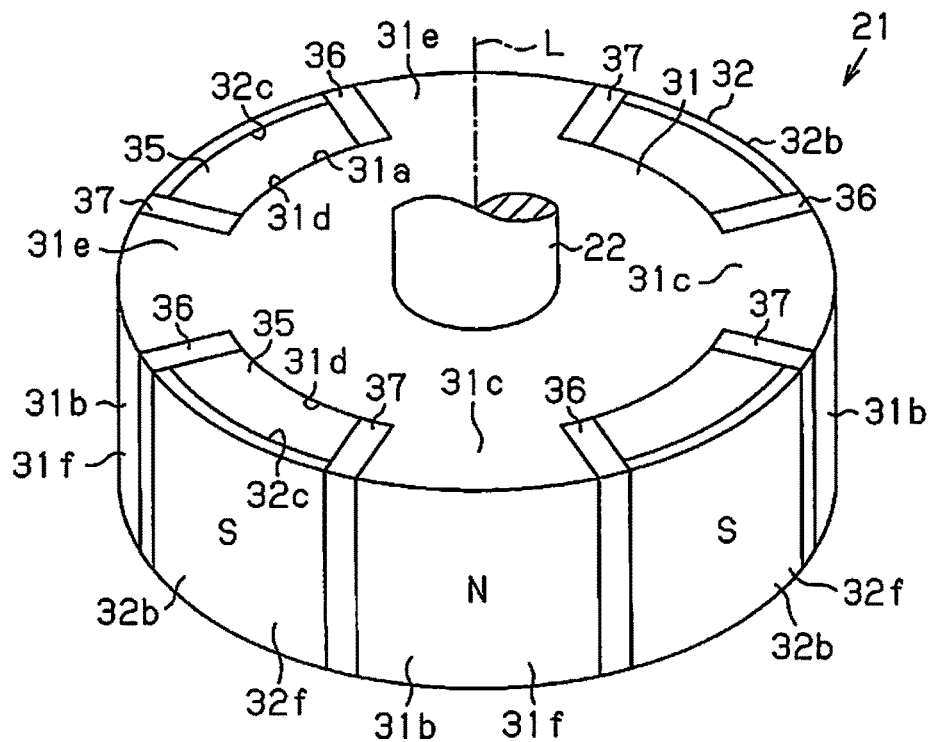
FIG. 65 is a perspective view of a rotor shown in FIG. 64.

As shown in FIGS. 64 and 65, interpole magnets 36 and 37 are located between the claw pole 31*b* and the claw pole 32*b* in the circumferential direction.

In the rotor 21 having the above-described structure, the core base 32*a* of the rotor core 32 is located at a position (position close to closed end 13*a*) closer to a yoke housing 13 in the axial direction L than the core base 31*a* of the rotor core 31.

An auxiliary magnet 55, which is opposed to the rotor 21 in the axial direction L, is accommodated in the yoke housing 13 of the motor 11 of the twelfth embodiment.

Figure 66:
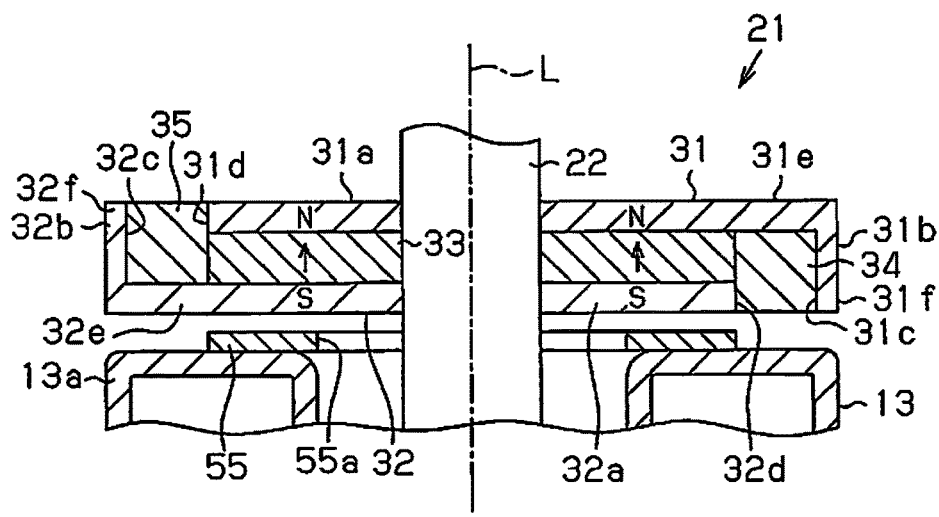
FIG. 66 is a partially enlarged cross-sectional view of the motor shown in FIG. 63.

As shown in FIG. 66, the auxiliary magnet 55 is annular plate and includes a through hole 55*a* extending through the central portion. The auxiliary magnet 55 is magnetized in the thickness direction (axial direction L) and in a direction repelling the annular magnet 33. The auxiliary magnet 55 has a diameter substantially equal to that of the annular magnet 33, and is located on the closed end 13*a* of the yoke housing 13 so that the auxiliary magnet 55 is coaxial with the rotor 21. Here, the auxiliary magnet 55 is arranged so that a gap is formed between the auxiliary magnet 55 and the rotor core 32 in the axial direction L so that the auxiliary magnet 55 does not interfere with the rotor core 32 when the rotor 21 rotates.

The operation of the brushless motor 11 of the twelfth embodiment having the above-described structure will now be described.

In the rotor 21 of the twelfth embodiment, the core base 32*a* of the rotor core 32 is opposed to the auxiliary magnet 55 in the axial direction L. The auxiliary magnet 55 is magnetized in an axial direction L1 and in the direction repelling the magnetic flux of the annular magnet 33. Thus, flux leakage in the axial direction between the yoke housing 13 and the rotor 21 may be offset (reduced).

The advantages of the twelfth embodiment will now be described.

(20) The motor 11 further includes the auxiliary magnet 55 located at the predetermined position to balance the magnetic flux from the first rotor core 31 and the magnetic flux from the second rotor core 32. More specifically, the motor 11 includes the auxiliary magnet 55 that offsets the flux leakage of the rotor 21. This allows for reduction in flux leakage toward the axial direction L of the rotor 21 and improves the output characteristics.

(21) The auxiliary magnet 55 is magnetized in the axial direction L of the rotor 21 and opposed to the rotor 21 in the axial direction L. This allows for further reduction in the flux leakage toward the axial direction L of the rotor 21 and improves the output characteristics.

(22) The auxiliary magnet 55 is magnetized in the direction repelling the magnetic flux of the annular magnet 33 that which acts as a main magnetic flux. This allows for further reduction in the flux leakage in the axial direction L of the rotor 21 and improves the output characteristics.

The first to twelfth embodiments may be modified as described below.

In the first embodiment, the separated distance B (B1, B2) in the axial direction between the rotor cores 31 and 32 and the yoke housing 13 (closed end 13*a*) differs between the radially inner side position and the radially outer side position. However, there is no limit to such a structure.

Figure 9:
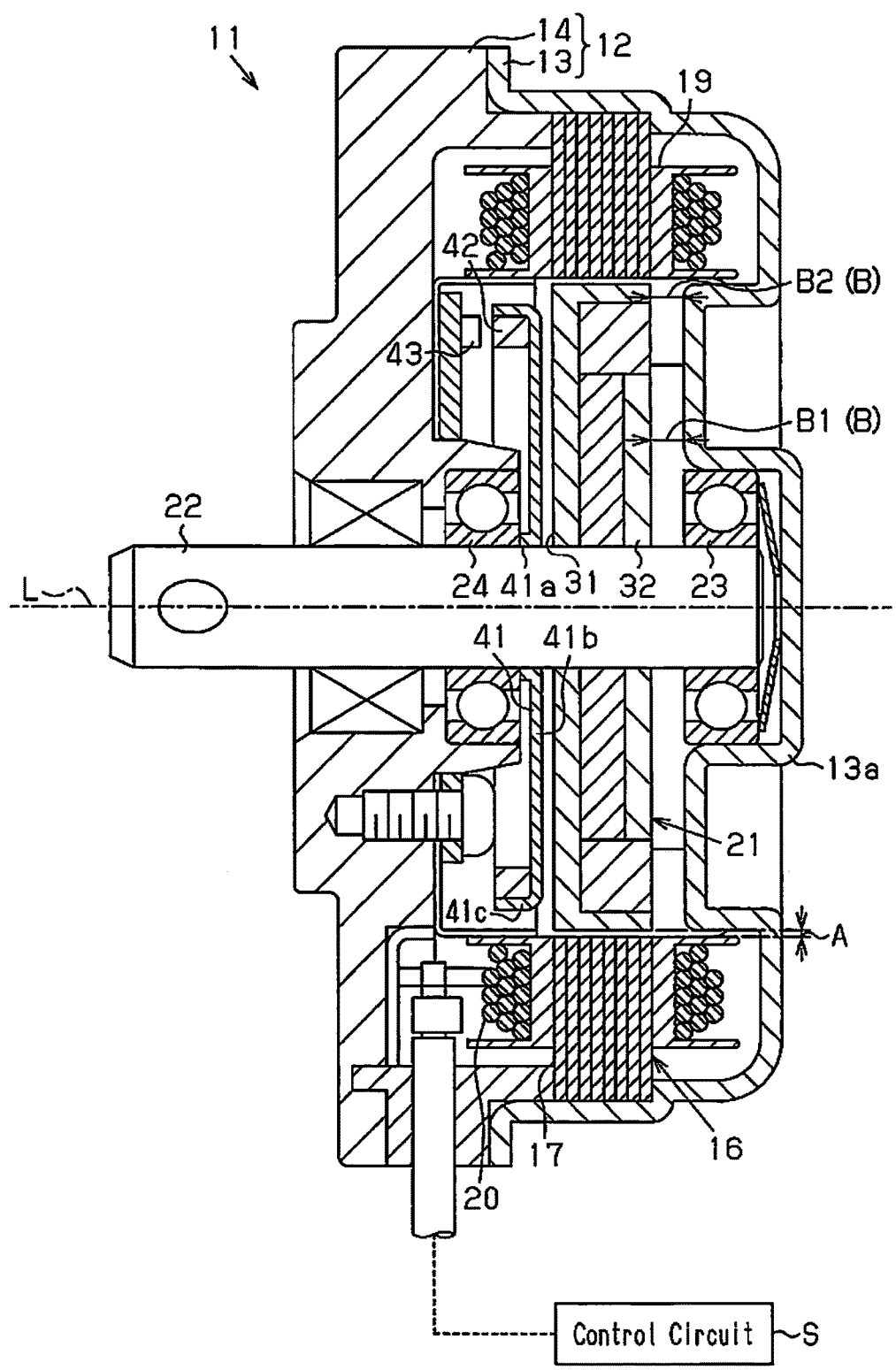
FIG. 9 is a cross-sectional view of a brushless motor in another example of the first embodiment.

For example, as shown in FIG. 9, the separated distance B (B1=B2) may be constant at the radially inner side position and the radially outer side position. The radially inner separated distance B1 may be greater than the radially outer separated distance B2 (B1>B2).

Although the upper limit of B/A is "9" in the first embodiment, the upper limit may be greater than "9".

In the first to twelfth embodiments, the present invention is embodied in the brushless motor in which the number of poles of the rotor 21 is set to "eight" and the number of teeth 17*a* of the stator 16 is set to "twelve". However, the number of poles of the rotor 21 and the number of teeth 17*a* may be changed. For example, the present invention may be embodied in a brushless motor in which the number of poles of the rotor 21 is set to "ten" and the number of teeth 17*a* of the stator 16 is set to "twelve".

In the first to twelfth embodiments, the rotor 21 includes the back surface auxiliary magnets 34 and 35 and the interpole magnets 36 and 37. However, there is no limit to such a structure. For example, the rotor 21 may include only one of the back surface auxiliary magnet and the interpole magnet. Alternatively, the back surface auxiliary magnet and interpole magnet may both be excluded.

In the third to twelfth embodiments, the stator 16 includes the teeth 17*a* and windings 20 wound around the teeth 17*a* the present invention. However, there is no limit to such a structure. For example, the stator may include two stator cores respectively having a plurality of claw poles arranged along the circumferential direction. The two stator cores are combined together so that a winding is arranged in between. In such a stator, the claw poles alternately function as different magnetic poles.

Figure 22:
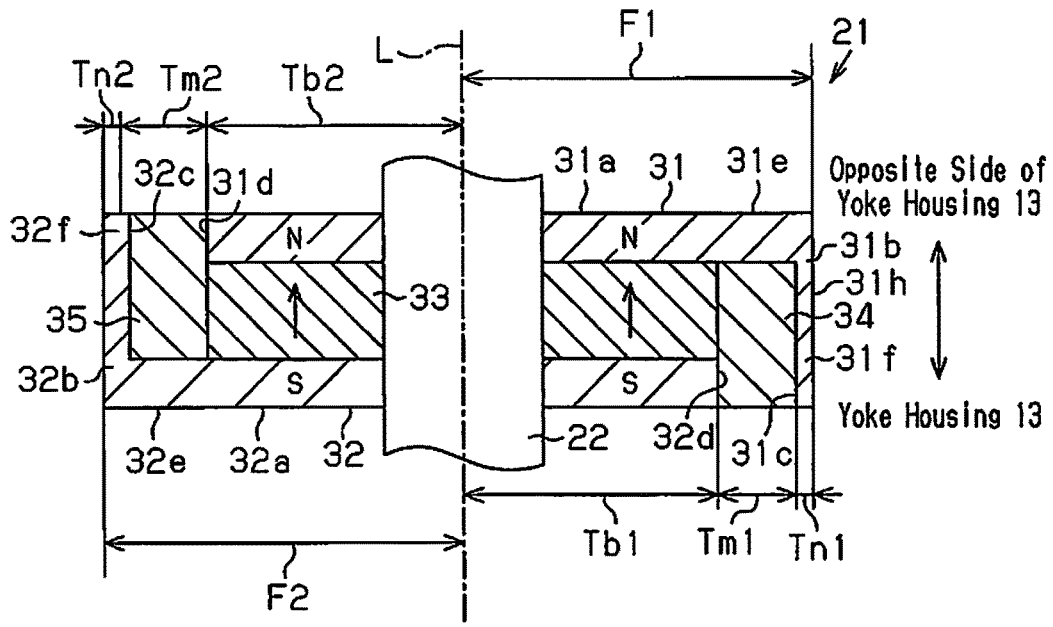
FIG. 22 is a cross-sectional view of a rotor in another example of the fourth embodiment.

In the fourth embodiment, the second projection 32*e* of the second claw pole 32*b* radially extends longer than the first projection 31*e* of the first claw pole 31*b*, and the length Tm2 is greater than the length Tm1. Thus, the length F2 of the second rotor core 32 is longer than the length F1 of the first rotor core 31. However, there is no limit to such a structure. For example, as shown in FIG. 22, the radial lengths Tm1 and Tm2 of the first and second projections 31*e* and 32*e* may be substantially equal to each other (Tm1=Tm2), the radial lengths Tb1 and Tb2 of the first and second core bases 31*a* and 32*a* may be substantially equal to each other (Tb1=Tb2), and the radial length Tn2 of the second claw 32*f* may be longer than the radial length Tn1 of the first claw 31*f*. Thus, the radial length F2 from the radial center (axis L) of the second rotor core 32 to the outer circumferential surface 32*h* of the second claw pole 32*b* becomes greater than the radial length F1 from the radial center (axis L) of the first rotor core 31 to the outer circumferential surface 31*h* of the first claw pole 31*b* (F2>F1).

The radial lengths Tm1 and Tm2 of the first and second projections 31*e* and 32*e* may be substantially equal to each other (Tm1=Tm2), the radial lengths Tn1 and Tn2 of the first and second claws 31*f* and 32*f* may be substantially equal to each other (Tn1=Tn2), and the radial length Tb2 of the second core base 32*a* may be greater than the radial length Tb1 of the first core base 31*a*. In this case also, the radial length F2 from the radial center (axis L) of the second rotor core 32 to the outer circumferential surface 32*h* of the second claw pole 32*b* is greater than the radial length F1 from the radial center (axis L) of the first rotor core 31 to the outer circumferential surface 31*h* of the first claw pole 31*b* (F2>F1).

In the fifth embodiment, the radius of curvature of the second claw pole 32*b* of the second rotor core 32, which is located at a position close to the yoke housing 13 in the axial direction, is the radius of curvature R2, which is shorter than the radius of curvature Rx of the rotor 21. However, there is no limit to such a structure. The radius of curvature of the second claw pole 32b may be equal to the radius of curvature Rx of the rotor 21.

The structure of the sixth embodiment satisfies the condition that the number of poles of the rotor 21 is 2n and the number of slots 17b of the stator 16 is 3n (n is natural number). The position where the groove 39 is formed may be changed within a range of −15/n to 15/n [deg]. It is further preferable that the groove 39 be formed at a substantially central portion in the circumferential direction like the sixth embodiment.

The structure of the seventh embodiment satisfies the condition that the number of poles of the rotor 21 is 2n and the number of slots 17b of the stator 16 is 3n (n is natural number). The grooves of the seventh embodiment may be modified as follows.

It is preferable that the groove 51a formed in the first claw pole 31b (first claw 31f) of the first rotor core 31 is formed be in a range of 15/n to 45/n [deg], and it is further preferable to form the groove 51a at a position of 30/n [deg] like the seventh embodiment.

It is preferable that the groove 51b formed in the first claw pole 31b (first claw 31f) of the first rotor core 31 be in a range of −15/n to −45/n [deg], and it is further preferable to form the groove 51b at a position of −30/n [deg] like the seventh embodiment.

It is preferable that the central groove 52a formed in the second claw pole 32b (second claw 32f) of the second rotor core 32 be formed in a range of −15/n to 15/n [deg], and it is further preferable to form the central groove 52a at a central position in the circumferential direction like the sixth embodiment.

It is preferable that the left groove 52b formed in the second claw pole 32b (second claw 32f) of the second rotor core 32 be formed in a range of 15/n to 45/n [deg], and it is further preferable to form the left groove 52b at a position of 30/n [deg] like the seventh embodiment.

It is preferable that the right groove 52c formed in the second claw pole 32b (second claw 32f) of the second rotor core 32 be formed in a range of −15/n to −45/n [deg], and it is further preferable to form the right groove 52c at a position of −30/n [deg] like the seventh embodiment.

The structure of the eighth embodiment satisfies the condition that the number of poles of the rotor 21 is 2n and the number of slots 17b of the stator 16 is 3n (n is natural number). Positions where the grooves 53 and 54 are formed may be changed in a range of −15/n to 15/n [deg]. It is further preferable to form the grooves 53 and 54 at central positions in the circumferential direction like the eighth embodiment.

The end plate 14 is made of resin in the sixth to twelfth embodiments. However, there is no limit to such a structure. For example, the end plate 14 may be made of a non-magnetic material such as aluminum or stainless steel (SUS). Magnetic material may be used as the end plate 14 under the condition that an axial distance between the end plate 14 and the rotor 21 is longer than an axial distance between the yoke housing 13 (closed end 13a) and the rotor 21.

Although not particularly mentioned in the ninth embodiment, the circumferential widths W1 and W2 of the radial outer surfaces 31h and 32h of the claw poles 31b and 32b may be differ from each other like in the following structure.

Figure 55:
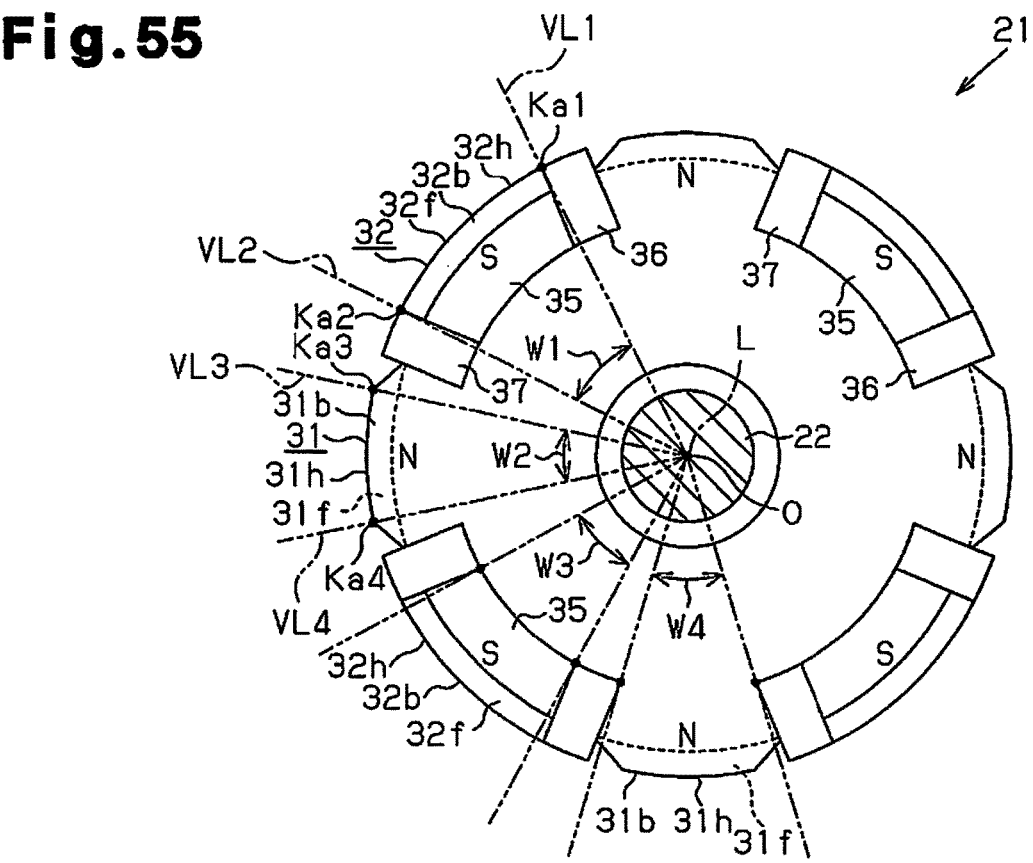
FIG. 55 is a plan view of a rotor in another example of the ninth embodiment.

As shown in FIG. 55, the two circumferential sides of radially outer sides of the claw pole 31b (claw 31f) of the rotor core 31 are chamfered so that the circumferential width W2 of the radial outer surface 31h is smaller than the circumferential width W1 of the radial outer surface 32h of the rotor core 32 (W1>W2). The rotor core 31 is located at a position relatively far from the yoke housing 13 (closed end 13a) in the axial direction like the rotor core 31 of the ninth embodiment. This structure equalize the circumferential widths W3 and W4 of base portions (boundaries between the claw poles 31b and 32b and the core bases 31a and 32a) that are the radially inner sides of the claw poles 31b and 32b. This obtains a well-balanced magnetic path area.

The circumferential width W2 of the radial outer surface 31h may be smaller than the circumferential width W1 of the radial outer surface 32h of the rotor core 32 (W1>W2) by forming the two circumferential sides into roundly curved surfaces.

The auxiliary magnet 55 is arranged on the closed end 13a of the yoke housing 13 in the twelfth embodiment. However, there is no limit to such a structure.

Figure 67:
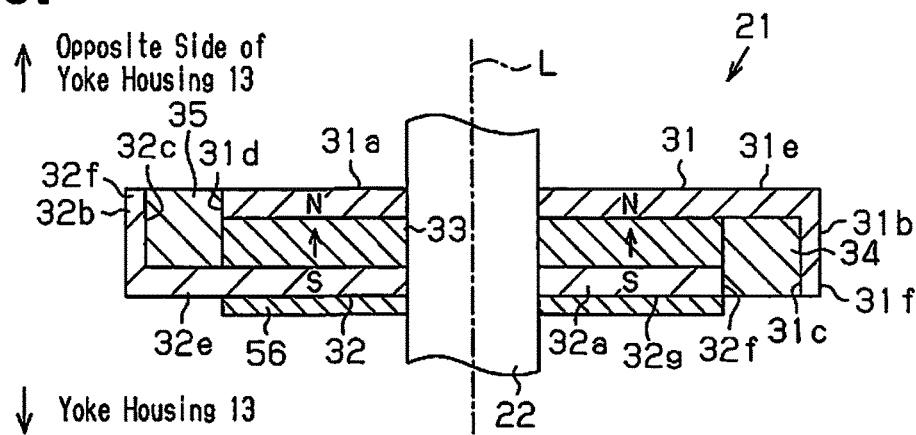
FIG. 67 is a cross-sectional view of a rotor in another example of the twelfth embodiment.

For example, as shown in FIG. 67, the auxiliary magnet 55 may be located adjacent to the rotor 21. In the example shown in FIG. 67, an auxiliary magnet 56 is arranged on the axial end surface 32g in the axial direction L of the core base 32a of the rotor core 32, which is located closer to the closed end 13a of the yoke housing 13 than the core base 31a of the rotor core 31.

In the twelfth embodiment, the auxiliary magnet 55 is opposed to the core base 32a. In addition, the auxiliary magnet may be opposed to the claw pole. In such a structure, the following examples may be employed.

EXAMPLE A

Figure 68:
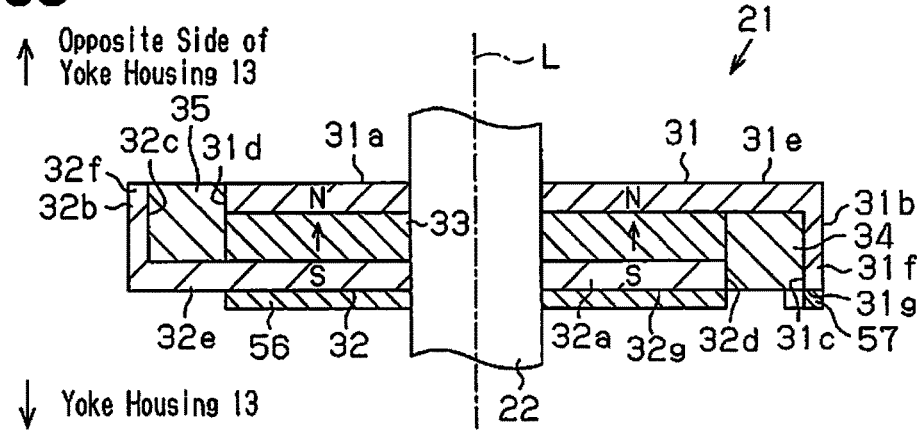
FIG. 68 is a cross-sectional view of a rotor in another example of the twelfth embodiment.

As shown in FIG. 68, in the claw poles 31b and 32b of the rotor cores 31 and 32, an auxiliary magnet 57 is arranged on the distal end surface 31g of the claw pole 31b (claw 31f), which extends toward the yoke housing 13 (closed end 13a). The auxiliary magnet 57 has the same shape (arc shape) as the distal end surface 31g of the claw pole 31b as viewed from the axial direction L. The auxiliary magnet 57 is magnetized in the axial direction L and in a direction repelling the claw pole 31b. In this case, the auxiliary magnet 56 corresponds to a first auxiliary magnet, and the auxiliary magnet 57 corresponds to a second auxiliary magnet.

By employing this structure, flux leakage may be reduced between the claw pole 31b and the yoke housing 13. This allows for the output characteristics of the motor to be improved.

EXAMPLE B

Figure 69:
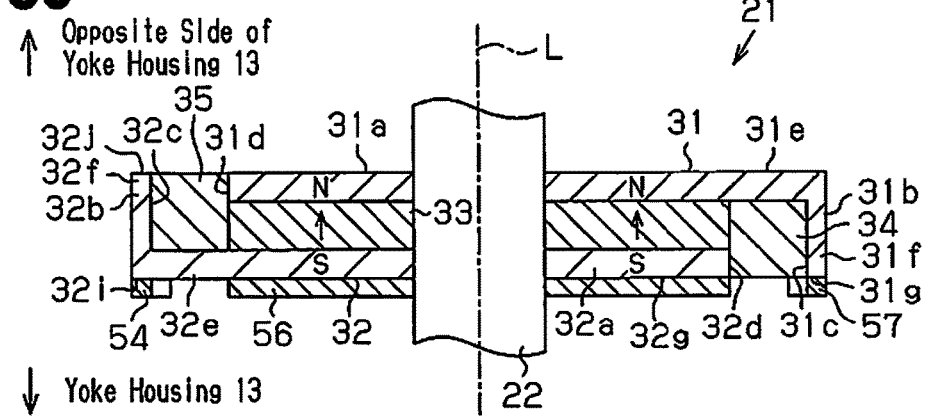
FIG. 69 is a cross-sectional view of a rotor in another example of the twelfth embodiment.

As shown in FIG. 69, auxiliary magnets 57 and 58 magnetized in directions repelling the claw poles 31b and 32b are respectively provided on the claw poles 31b and 32b of the rotor cores 31 and 32.

The auxiliary magnet 57 has the same structure as that in example A and is arranged on the distal end surface 31g of the claw pole 31b (claw 31f), which extends toward the yoke housing 13 (closed end 13a). The auxiliary magnet 57 has the same shape (arc shape) as the distal end surface 31g. The auxiliary magnet 57 is magnetized in the axial direction L and in the direction repelling the claw pole 31b.

The auxiliary magnet 58 is arranged on a surface 32i opposite from distal end surface 32j of the claw pole 32b (claw 32f), which extends toward the opposite side from the yoke housing 13 (closed end 13a) in the axial direction L1. The auxiliary magnet 58 has the same shape (arc shape) as that of the distal end surface 32j of the claw pole 32b as viewed from the axial direction. The auxiliary magnet 58 is magnetized in the axial direction L and in a direction repelling the claw pole 32*b*. In this case, the auxiliary magnet 56 corresponds to a first auxiliary magnet, and the auxiliary magnets 57 and 58 correspond to second auxiliary magnets.

As described above, the auxiliary magnets 56 and 57 are arranged at positions close to the yoke housing 13 and are opposed to the claw poles 31*b* and 32*b* in the axial direction L. This allows for flux leakage to be reduced between the claw poles 31*b* and 32*b* and the yoke housing 13. Hence, the output characteristics of the motor may be improved.

The above embodiments and modifications may be combined with one another.

The invention claimed is:

1. A motor comprising:
a stator including a stator core and a winding, wherein the stator core includes a plurality of teeth arranged in a circumferential direction, the winding is wound around the teeth, and each of the teeth extends in a radial direction;
a rotor including a first rotor core, a second rotor core, and a field magnet, wherein
each of the first rotor core and the second rotor core includes a substantially disk-shaped core base, and a plurality of claw poles arranged in equal intervals on a circumferential portion of the core base,
each of the claw poles projects toward an outer side in the radial direction and extends in an axial direction,
the core bases are opposed to each other, and the claw poles are alternately arranged in the circumferential direction,
the field magnet is located between the core bases in the axial direction, the field magnet is magnetized in the axial direction so that the claw poles of the first rotor core function as first magnetic poles and the claw poles of the second rotor core function as second magnetic poles; and
a case that accommodates the stator and the rotor, wherein the case includes a cylindrical yoke housing, which has a closed end, and a lid, which closes an opening of the yoke housing, and the yoke housing is formed by a magnetic body,
wherein to balance magnetic flux from the first rotor core with magnetic flux from the second rotor core, the distance between the rotor and the stator differs from the distance between the rotor and the yoke housing or the teeth of the stator are shaped to enable magnetic saturation, and
wherein when a separated distance between the stator and the claw pole in the radial direction is expressed by A, a separated distance in the longitudinal direction from the yoke housing to the core base of one of the first and second rotor cores that is located closer to the yoke housing is expressed by B1, and a separated distance from the yoke housing to an end of the claw poles that is located closer to the yoke housing is expressed by B2,
B1<B2, and
5.0<B1/A<9.0 and 5.0<B2/A<9.0 are satisfied.

2. The motor according to claim 1, wherein a separated distance between a radially outer portion of the rotor core and the yoke housing in the axial direction is longer than a separated distance between a radially inner portion of the rotor core and the yoke housing in the axial direction.

3. The motor according to claim 1, wherein a groove is formed in a substantially circumferential center of a distal end surface of each of the teeth to magnetically saturate the corresponding tooth.

4. The motor according to claim 3, wherein
each of the teeth includes a winding portion, around which a winding is wound, and a projection located at an end of the winding portion that is closer to the rotor and projected toward two sides in the circumferential direction, and
when a radial length of the groove is expressed by c and a radial length of the projection of the tooth is expressed by H, the groove is formed to satisfy 0.6<c/H≤1.2.

5. The motor according to claim 3, wherein when a circumferential width of the groove is expressed by b and an opening width of a slot formed between the teeth of the stator is expressed by W, the groove satisfies 0.6≤b/W≤1.3.

6. The motor according to claim 3, wherein a ratio between a number of poles of the rotor and a number of slots of stator is 2:3.

* * * * *